(12) United States Patent
Ishihara

(10) Patent No.: US 7,554,710 B2
(45) Date of Patent: Jun. 30, 2009

(54) TWO-DIMENSIONAL SCANNING APPARATUS, AND IMAGE DISPLAYING APPARATUS

(75) Inventor: Keiichiro Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/686,396

(22) Filed: Oct. 14, 2003

(65) Prior Publication Data
US 2004/0080799 A1 Apr. 29, 2004

(30) Foreign Application Priority Data
Oct. 16, 2002 (JP) .............................. 2002-301869
Oct. 16, 2002 (JP) .............................. 2002-302385

(51) Int. Cl.
*G02B 26/08* (2006.01)
*G02B 3/00* (2006.01)
*G02B 9/00* (2006.01)

(52) U.S. Cl. ................... 359/212; 359/201; 359/206; 359/221; 359/662

(58) Field of Classification Search ............... 358/2.99, 358/2.1, 3.24, 3.26, 474; 359/202, 220, 210, 359/206, 212, 364, 714, 649, 14, 234, 201, 359/205, 619, 819, 207, 254, 726, 783, 744, 359/221, 662, 631; 250/235; 73/620; 353/7, 353/98, 74, 82; 356/630; 345/9; 600/178; 349/113
See application file for complete search history.

(56) References Cited

U.S. PATENT DOCUMENTS

| | | | | |
|---|---|---|---|---|
| 4,180,307 A | * | 12/1979 | Tateoka et al. .............. 359/202 |
| 4,256,364 A | * | 3/1981 | Minoura et al. ............. 359/220 |
| 4,314,154 A | * | 2/1982 | Minoura et al. ............. 250/235 |
| 4,318,582 A | * | 3/1982 | Minoura et al. ............. 359/202 |
| 4,327,959 A | * | 5/1982 | Minoura et al. ............. 359/210 |
| 4,329,012 A | * | 5/1982 | Minoura et al. ............. 359/202 |
| 4,434,659 A | * | 3/1984 | Kurtz et al. ................... 73/620 |
| 4,872,750 A | * | 10/1989 | Morishita ....................... 353/7 |
| 5,046,795 A | * | 9/1991 | Morimoto et al. ........... 359/206 |
| 5,067,782 A | * | 11/1991 | Morimoto et al. ........... 359/202 |
| 5,107,364 A | * | 4/1992 | Morimoto et al. ........... 359/212 |
| 5,515,122 A | * | 5/1996 | Morishima et al. ............ 353/98 |
| 5,764,365 A | * | 6/1998 | Finarov ....................... 356/630 |
| 5,820,240 A | | 10/1998 | Ohzawa |
| 5,826,961 A | * | 10/1998 | Kim et al. ...................... 353/74 |
| 5,844,713 A | * | 12/1998 | Nanba et al. ................. 359/364 |
| 5,933,280 A | * | 8/1999 | Osawa et al. ................. 359/714 |

(Continued)

FOREIGN PATENT DOCUMENTS

| | | |
|---|---|---|
| JP | H10-253915 | 9/1998 |
| JP | H11-084291 | 3/1999 |
| JP | 2001-004955 | 1/2001 |

*Primary Examiner*—Twyler L Haskins
*Assistant Examiner*—Jonathan R Beckley
(74) *Attorney, Agent, or Firm*—Rossi, Kimms & McDowell, LLP

(57) ABSTRACT

Disclosed is a two-dimensional scanning apparatus which includes a deflecting unit for deflecting a light beam from a light source two-dimensionally, and a scanning optical system for directing the light beam deflected by the deflecting unit onto a surface to be scanned. The scanning optical system includes an optical surface which is tilted at an angle larger than a maximum angle of view relative to a central axis of a two-dimensional deflection range of the light beam deflected by the deflecting unit. The two-dimensional scanning apparatus is capable of preferably and readily correcting distortion including TV distortion which is likely to appear when a light beam is two-dimensionally deflected and scanned to from a two-dimensional image.

15 Claims, 44 Drawing Sheets

U.S. PATENT DOCUMENTS

| | | | |
|---|---|---|---|
| 5,936,596 A * | 8/1999 | Yoshida et al. | 345/9 |
| 6,064,504 A * | 5/2000 | Minakuchi et al. | 359/210.1 |
| 6,123,425 A | 9/2000 | Ohzawa | |
| 6,130,786 A * | 10/2000 | Osawa et al. | 359/649 |
| 6,137,602 A * | 10/2000 | Mukawa | 359/14 |
| 6,211,988 B1 * | 4/2001 | Engelhardt et al. | 359/201 |
| 6,219,169 B1 * | 4/2001 | Iizuka | 359/234 |
| 6,232,991 B1 * | 5/2001 | Appel | 347/137 |
| 6,246,526 B1 * | 6/2001 | Okuyama | 359/621 |
| 6,388,697 B1 * | 5/2002 | Sonehara et al. | 347/239 |
| RE38,153 E * | 6/2003 | Finarov | 356/630 |
| 6,601,957 B2 * | 8/2003 | Sugawara | 353/31 |
| 6,657,763 B2 * | 12/2003 | Kobayashi | 359/212 |
| 6,671,107 B2 * | 12/2003 | Chee | 359/819 |
| 6,698,902 B2 * | 3/2004 | Kawano et al. | 353/99 |
| 6,795,223 B2 * | 9/2004 | Kuba | 359/207.8 |
| 6,859,329 B2 * | 2/2005 | Kobayashi | 359/635 |
| 6,894,746 B1 * | 5/2005 | Manabe et al. | 349/113 |
| 6,985,309 B2 * | 1/2006 | Shinohara | 359/783 |
| 7,176,881 B2 * | 2/2007 | Nishimura et al. | 345/156 |
| 7,256,917 B2 * | 8/2007 | Ishihara | 359/202.1 |
| 2003/0078477 A1 * | 4/2003 | Kang et al. | 600/178 |
| 2004/0075914 A1 * | 4/2004 | Yamamoto | 359/726 |
| 2004/0080799 A1 * | 4/2004 | Ishihara | 359/202 |

* cited by examiner

FIG. 5A

| OPTICAL SYSTEM | | | | | | | | | | | |
|---|---|---|---|---|---|---|---|---|---|---|---|
| OPTICAL SURFACE | | RADIUS OF CURVATURE | Y RADIUS OF CURVATURE | SURFACE SEPARATION | POSITION OF SURFACE VERTEX | | | TILT OF NORMAL TO SURFACE | | REFRACTIVE INDEX | DISPERSION |
| DEVICE | SURFACE | | | | POSITION Z | POSITION X | POSITION Y | TILT ZX | TILT ZY | Nd | νd |
| | | (mm) | (mm) | (mm) | (mm) | (mm) | (mm) | (deg) | (deg) | | |
| DEFLECTING UNIT 4 | REFLECTING SURFACE | | | 19.490 | 0.000 | 0.000 | 0.000 | | | | |
| FIRST SCANNING LENS 5a' | INCIDENT SURFACE | -52.6860 | | 3.000 | 19.490 | 0.000 | 0.000 | 0.000 | 0.000 | 1.53064 | 55.5 |
| | LIGHT EMERGENCE SURFACE | -72.9672 | | 2.000 | 22.490 | 0.000 | 0.000 | 0.000 | 0.000 | | |
| SECOND SCANNING LENS 5b' | INCIDENT SURFACE | -89.0572 | | 12.712 | 24.490 | 0.000 | 0.000 | 0.000 | 0.000 | 1.53064 | 55.5 |
| | LIGHT EMERGENCE SURFACE | -61.7955 | | 432.671 | 37.202 | 0.000 | 0.000 | 0.000 | 0.000 | | |
| SURFACE TO BE SCANNED 6 | | | | | 469.873 | 0.000 | 0.000 | 0.000 | 0.000 | | |

FIG. 5B

| ASPHERICAL COEFFICIENT | | | | | |
|---|---|---|---|---|---|
| DEVICE | FIRST SCANNING LENS 5a' | | | | K |
| SURFACE | INCIDENT SURFACE | | | | -1.8977E+01 |
| | $Y^0$ | $Y^2$ | $Y^4$ | $Y^6$ | $Y^8$ |
| $X^0$ | 0.0000E+00 | -2.4329E-03 | 9.5563E-05 | 4.2894E-07 | -6.3143E-10 |
| $X^2$ | -4.5363E-03 | 8.9788E-05 | -3.7654E-07 | -1.9146E-09 | 0.0000E+00 |
| $X^4$ | -7.1872E-05 | 6.0851E-07 | -5.6160E-09 | 0.0000E+00 | 0.0000E+00 |
| $X^6$ | -4.7550E-08 | 2.5491E-09 | 0.0000E+00 | 0.0000E+00 | 0.0000E+00 |
| $X^8$ | -1.1199E-10 | 0.0000E+00 | 0.0000E+00 | 0.0000E+00 | 0.0000E+00 |

FIG. 5C

| ASPHERICAL COEFFICIENT | | | | | |
|---|---|---|---|---|---|
| DEVICE | FIRST SCANNING LENS 5a' | | | | K |
| SURFACE | LIGHT EMERGENCE SURFACE | | | | 3.3674E+00 |
| | $Y^0$ | $Y^2$ | $Y^4$ | $Y^6$ | $Y^8$ |
| $X^0$ | 0.0000E+00 | -8.8805E-03 | 1.0608E-04 | 3.4862E-07 | 2.2660E-09 |
| $X^2$ | -6.1817E-03 | 1.2334E-04 | -3.7014E-07 | -3.7415E-09 | 0.0000E+00 |
| $X^4$ | -2.1866E-05 | 2.1179E-07 | -7.2546E-10 | 0.0000E+00 | 0.0000E+00 |
| $X^6$ | -6.5104E-08 | 8.2409E-10 | 0.0000E+00 | 0.0000E+00 | 0.0000E+00 |
| $X^8$ | 7.1489E-11 | 0.0000E+00 | 0.0000E+00 | 0.0000E+00 | 0.0000E+00 |

FIG. 5D

| ASPHERICAL COEFFICIENT | | | | | | |
|---|---|---|---|---|---|---|
| DEVICE | SECOND SCANNING LENS 5b' | | | | | K |
| SURFACE | INCIDENT SURFACE | | | | | 8.7944E-01 |
| | $Y^0$ | $Y^2$ | $Y^4$ | $Y^6$ | $Y^8$ | $Y^{10}$ |
| $X^0$ | 0.0000E+00 | -7.9033E-03 | -2.5900E-05 | 4.6536E-08 | 6.0897E-10 | 5.5563E-13 |
| $X^2$ | -5.6029E-04 | -6.1477E-07 | 3.2752E-08 | 2.8149E-10 | 6.6453E-12 | 0.0000E+00 |
| $X^4$ | 4.0844E-06 | -1.5741E-08 | 1.4739E-10 | -5.1325E-13 | 0.0000E+00 | 0.0000E+00 |
| $X^6$ | -2.3846E-09 | 2.4979E-12 | -1.4764E-13 | 0.0000E+00 | 0.0000E+00 | 0.0000E+00 |
| $X^8$ | -2.9666E-13 | 1.8946E-14 | 0.0000E+00 | 0.0000E+00 | 0.0000E+00 | 0.0000E+00 |
| $X^{10}$ | -2.2325E-16 | 0.0000E+00 | 0.0000E+00 | 0.0000E+00 | 0.0000E+00 | 0.0000E+00 |

FIG. 5E

| ASPHERICAL COEFFICIENT | | | | | | |
|---|---|---|---|---|---|---|
| DEVICE | SECOND SCANNING LENS 5b' | | | | | K |
| SURFACE | LIGHT EMERGENCE SURFACE | | | | | 1.1223E+00 |
| | $Y^0$ | $Y^2$ | $Y^4$ | $Y^6$ | $Y^8$ | $Y^{10}$ |
| $X^0$ | 0.0000E+00 | -2.6639E-03 | -1.7603E-05 | 1.8446E-08 | -1.1943E-10 | -4.1606E-14 |
| $X^2$ | -3.1540E-04 | -8.5071E-06 | 2.2095E-08 | 6.8159E-11 | 6.2392E-13 | 0.0000E+00 |
| $X^4$ | -5.8311E-06 | -9.8501E-10 | -5.5316E-11 | -2.0112E-13 | 0.0000E+00 | 0.0000E+00 |
| $X^6$ | 7.9053E-09 | -2.6452E-12 | 2.7772E-14 | 0.0000E+00 | 0.0000E+00 | 0.0000E+00 |
| $X^8$ | -4.4063E-12 | -1.2391E-15 | 0.0000E+00 | 0.0000E+00 | 0.0000E+00 | 0.0000E+00 |
| $X^{10}$ | 6.4081E-16 | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.121 (%) | UPPER SIDE | 0.000 (%) |
| LOWER SIDE | −0.121 (%) | LOWER SIDE | 0.000 (%) |
| LEFT SIDE | 1.533 (%) | LEFT SIDE | 0.000 (%) |
| RIGHT SIDE | −1.533 (%) | RIGHT SIDE | 0.000 (%) |

| TV DISTORTION | | TRAPEZOID DISTORTION | |
|---|---|---|---|
| UPPER SIDE | 0.900 (%) | UPPER SIDE | 1.021 (%) |
| LOWER SIDE | −0.900 (%) | LOWER SIDE | 1.021 (%) |
| LEFT SIDE | 0.000 (%) | LEFT SIDE | 0.000 (%) |
| RIGHT SIDE | −1.702 (%) | RIGHT SIDE | 0.000 (%) |

FIG. 14A

| OPTICAL SURFACE | | RADIUS OF CURVATURE | SURFACE SEPARATION | OPTICAL SYSTEM | | | | | | REFRACTIVE INDEX | DISPERSION |
|---|---|---|---|---|---|---|---|---|---|---|---|
| | | | | | | POSITION OF SURFACE VERTEX | | | TILT OF NORMAL TO SURFACE | | |
| DEVICE | SURFACE | | Y RADIUS OF CURVATURE | SURFACE SEPARATION | | POSITION Z | POSITION X | POSITION Y | TILT ZX | TILT ZY | Nd | νd |
| | | (mm) | | (mm) | | (mm) | (mm) | (mm) | (deg) | (deg) | | |
| DEFLECTING UNIT 4 | REFLECTING SURFACE | | | 20.288 | | 0.000 | 0.000 | 0.000 | | | | |
| FIRST SCANNING LENS 5a | INCIDENT SURFACE | -63.8275 | | 3.000 | | 20.288 | 0.000 | 0.000 | 0.000 | 0.000 | 1.53064 | 55.5 |
| | LIGHT EMER-GENCE SURFACE | -93.3323 | | 2.000 | | 23.288 | 0.000 | 0.000 | 0.000 | 0.000 | | |
| SECOND SCANNING LENS 5b | INCIDENT SURFACE | -121.5431 | | 12.712 | | 25.288 | 0.000 | 0.000 | 15.561 | 0.000 | 1.53064 | 55.5 |
| | LIGHT EMER-GENCE SURFACE | -78.8558 | | 417.508 | | 38.000 | 3.540 | 0.000 | 15.561 | 0.000 | | |
| SURFACE TO BE SCANNED 6 | | | | | | 455.508 | 8.426 | 0.000 | 10.134 | 0.000 | | |

FIG. 14B

| ASPHERICAL COEFFICIENT | | | | | |
|---|---|---|---|---|---|
| DEVICE | FIRST SCANNING LENS 5a | | | K | |
| SURFACE | INCIDENT SURFACE | | | -2.3031E+00 | |
| | $Y^0$ | $Y^2$ | $Y^4$ | $Y^6$ | $Y^8$ |
| $X^0$ | 0.0000E+00 | 8.9907E-04 | 1.1848E-04 | 4.0591E-07 | -2.9912E-09 |
| $X^2$ | -4.7842E-03 | 7.4447E-05 | -4.1490E-07 | -9.1047E-10 | 0.0000E+00 |
| $X^4$ | -6.9854E-05 | 6.4756E-07 | -5.6615E-09 | 0.0000E+00 | 0.0000E+00 |
| $X^6$ | -3.4655E-08 | 2.5051E-09 | 0.0000E+00 | 0.0000E+00 | 0.0000E+00 |
| $X^8$ | -1.2845E-10 | 0.0000E+00 | 0.0000E+00 | 0.0000E+00 | 0.0000E+00 |

FIG. 14C

| ASPHERICAL COEFFICIENT | | | | | |
|---|---|---|---|---|---|
| DEVICE | FIRST SCANNING LENS 5a | | | K | |
| SURFACE | LIGHT EMERGENCE SURFACE | | | -9.9922E+00 | |
| | $Y^0$ | $Y^2$ | $Y^4$ | $Y^6$ | $Y^8$ |
| $X^0$ | 0.0000E+00 | -1.2594E-02 | 9.6063E-05 | 3.2645E-07 | 5.2057E-10 |
| $X^2$ | -6.1191E-03 | 1.2948E-04 | -2.7195E-07 | -2.5534E-09 | 0.0000E+00 |
| $X^4$ | -2.2681E-00 | 1.8864E-07 | -1.1439E-09 | 0.0000E+00 | 0.0000E+00 |
| $X^6$ | -6.6590E-08 | 9.0531E-10 | 0.0000E+00 | 0.0000E+00 | 0.0000E+00 |
| $X^8$ | 7.5080E-11 | 0.0000E+00 | 0.0000E+00 | 0.0000E+00 | 0.0000E+00 |

FIG. 14D

| ASPHERICAL COEFFICIENT |||||||
|---|---|---|---|---|---|---|
| DEVICE | SECOND SCANNING LENS 5b | | | | | K |
| SURFACE | INCIDENT SURFACE | | | | | 8.7944E-01 |
| | $Y^0$ | $Y^2$ | $Y^4$ | $Y^6$ | $Y^8$ | $Y^{10}$ |
| $X^0$ | 0.0000E+00 | -1.2929E-02 | -3.9672E-05 | -2.4341E-08 | 6.5352E-10 | 3.0567E-12 |
| $X^2$ | -3.3604E-04 | -1.0658E-05 | -2.2548E-08 | 3.3417E-11 | 8.6494E-13 | 0.0000E+00 |
| $X^4$ | 5.2175E-06 | -1.1900E-08 | 8.2217E-11 | -1.9087E-13 | 0.0000E+00 | 0.0000E+00 |
| $X^6$ | -1.8294E-09 | 8.7846E-12 | -2.8013E-14 | 0.0000E+00 | 0.0000E+00 | 0.0000E+00 |
| $X^8$ | 2.6515E-15 | -9.9952E-16 | 0.0000E+00 | 0.0000E+00 | 0.0000E+00 | 0.0000E+00 |
| $X^{10}$ | 1.0610E-16 | 0.0000E+00 | 0.0000E+00 | 0.0000E+00 | 0.0000E+00 | 0.0000E+00 |

FIG. 14E

| ASPHERICAL COEFFICIENT |||||||
|---|---|---|---|---|---|---|
| DEVICE | SECOND SCANNING LENS 5b | | | | | K |
| SURFACE | LIGHT EMERGENCE SURFACE | | | | | 2.2545E-01 |
| | $Y^0$ | $Y^2$ | $Y^4$ | $Y^6$ | $Y^8$ | $Y^{10}$ |
| $X^0$ | 0.0000E+00 | -1.0930E-03 | -1.4592E-05 | 3.0157E-08 | -8.5957E-11 | 4.1395E-13 |
| $X^2$ | -4.1889E-04 | -2.2205E-05 | -8.9921E-09 | 2.1539E-11 | -4.1669E-14 | 0.0000E+00 |
| $X^4$ | -4.9253E-06 | 1.9010E-09 | -1.6464E-11 | -1.5503E-13 | 0.0000E+00 | 0.0000E+00 |
| $X^6$ | 8.5327E-09 | -3.3855E-12 | 7.4694E-15 | 0.0000E+00 | 0.0000E+00 | 0.0000E+00 |
| $X^8$ | -4.1149E-12 | 1.6041E-15 | 0.0000E+00 | 0.0000E+00 | 0.0000E+00 | 0.0000E+00 |
| $X^{10}$ | 6.9470E-16 | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.148 (%) | UPPER SIDE | 0.045 (%) |
| LOWER SIDE | -0.148 (%) | LOWER SIDE | 0.045 (%) |
| LEFT SIDE | 0.266 (%) | LEFT SIDE | 0.000 (%) |
| RIGHT SIDE | -0.037 (%) | RIGHT SIDE | 0.000 (%) |

FIG. 18A

OPTICAL SYSTEM

| OPTICAL SURFACE | | RADIUS OF CURVATURE | SURFACE SEPARATION | POSITION OF SURFACE VERTEX | | | TILT OF NORMAL TO SURFACE | | REFRACTIVE INDEX | DISPERSION |
|---|---|---|---|---|---|---|---|---|---|---|
| DEVICE | SURFACE | Y RADIUS OF CURVATURE (mm) | SURFACE SEPARATION (mm) | POSITION Z (mm) | POSITION X (mm) | POSITION Y (mm) | TILT ZX (deg) | TILT ZY (deg) | Nd | νd |
| DEFLECTING UNIT 4 | REFLECTING SURFACE | | 39.860 | 0.000 | 0.000 | 0.000 | 0.000 | 0.000 | | |
| FIRST SCANNING LENS 15a | INCIDENT SURFACE | 144.1589 | 3.000 | 39.860 | 0.000 | 0.000 | 0.000 | 0.000 | 1.75520 | 27.5 |
| | LIGHT EMERGENCE SURFACE | 153.0713 | 2.000 | 42.860 | 0.000 | 0.000 | 0.000 | 0.000 | | |
| SECOND SCANNING LENS 15b | INCIDENT SURFACE | 180.5564 | 0.140 | 44.860 | 20.004 | 0.000 | 25.000 | 0.000 | 1.75520 | 27.5 |
| | LIGHT EMERGENCE SURFACE | −199.8478 | 399.471 | 45.000 | 69.405 | 0.000 | 33.141 | 0.000 | | |
| SURFACE TO BE SCANNED 6 | | | | 444.471 | −0.296 | 0.000 | 6.835 | 0.000 | | |

FIG. 18B

| ASPHERICAL COEFFICIENT |||||
| --- | --- | --- | --- | --- |
| DEVICE | SECOND SCANNING LENS 15b | | | K |
| SURFACE | INCIDENT SURFACE | | | -2.1677E+00 |
| | $Y^0$ | $Y^2$ | $Y^4$ | $Y^6$ | $Y^8$ |
| $X^0$ | 0.0000E+00 | -1.1493E-02 | 3.7211E-07 | 0.0000E+00 | 0.0000E+00 |
| $X^2$ | 4.7398E-04 | -4.4403E-08 | 0.0000E+00 | 0.0000E+00 | 0.0000E+00 |
| $X^4$ | -2.8232E-09 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 18C

| ASPHERICAL COEFFICIENT |||||
| --- | --- | --- | --- | --- |
| DEVICE | SECOND SCANNING LENS 15b | | | K |
| SURFACE | LIGHT EMERGENCE SURFACE | | | -6.0053E-01 |
| | $Y^0$ | $Y^2$ | $Y^4$ | $Y^6$ | $Y^8$ |
| $X^0$ | 0.0000E+00 | -7.8454E-03 | -4.6779E-07 | 0.0000E+00 | 0.0000E+00 |
| $X^2$ | 2.0545E-03 | -1.0375E-07 | 0.0000E+00 | 0.0000E+00 | 0.0000E+00 |
| $X^4$ | 1.2955E-08 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.163 (%) | UPPER SIDE | 0.110 (%) |
| LOWER SIDE | −0.163 (%) | LOWER SIDE | 0.110 (%) |
| LEFT SIDE | 0.194 (%) | LEFT SIDE | 0.000 (%) |
| RIGHT SIDE | −0.106 (%) | RIGHT SIDE | 0.000 (%) |

FIG. 22A

OPTICAL SYSTEM

| OPTICAL SURFACE | | RADIUS OF CURVATURE | Y RADIUS OF CURVATURE | SURFACE SEPARATION | SURFACE SEPARATION | POSITION OF SURFACE VERTEX | | | TILT OF NORMAL TO SURFACE | | REFRACTIVE INDEX | DISPERSION |
|---|---|---|---|---|---|---|---|---|---|---|---|---|
| DEVICE | SURFACE | | | | | POSITION Z | POSITION X | POSITION Y | TILT ZX | TILT ZY | Nd | νd |
| | | (mm) | (mm) | (mm) | (mm) | (mm) | (mm) | (mm) | (deg) | (deg) | | |
| DEFLECTING UNIT 4 | REFLECTING SURFACE | | | 19.471 | | 0.000 | | | | | | |
| FIRST SCANNING LENS 25a | INCIDENT SURFACE | -59.2564 | | 0.140 | | 19.471 | 32.136 | 0.000 | 0.000 | 0.000 | 1.48749 | 70.4 |
| | LIGHT EMER-GENCE SURFACE | -56.7891 | | 0.140 | | 19.611 | 6.104 | 0.000 | 0.000 | 0.000 | | |
| SECOND SCANNING LENS 25b | INCIDENT SURFACE | 177.3642 | | 0.700 | | 19.751 | 13.353 | 0.000 | 30.000 | 0.000 | 1.74330 | 49.2 |
| | LIGHT EMER-GENCE SURFACE | -202.4853 | | 535.957 | | 20.451 | 149.086 | 0.000 | 47.218 | 0.000 | | |
| SURFACE TO BE SCANNED 6 | | | | | | 556.408 | -88.835 | 0.000 | 4.961 | 0.000 | | |

FIG. 22B

| ASPHERICAL COEFFICIENT | | | | | |
|---|---|---|---|---|---|
| DEVICE | SECOND SCANNING LENS 25b | | | K | |
| SURFACE | INCIDENT SURFACE | | | -9.8701E+00 | |
| | $Y^0$ | $Y^2$ | $Y^4$ | $Y^6$ | $Y^8$ |
| $X^0$ | 0.0000E+00 | -7.1559E-03 | 8.6088E-08 | 0.0000E+00 | 0.0000E+00 |
| $X^2$ | -6.5182E-04 | 4.4616E-08 | 0.0000E+00 | 0.0000E+00 | 0.0000E+00 |
| $X^4$ | 2.3774E-09 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 22C

| ASPHERICAL COEFFICIENT | | | | | |
|---|---|---|---|---|---|
| DEVICE | SECOND SCANNING LENS 25b | | | K | |
| SURFACE | LIGHT EMERGENCE SURFACE | | | -9.9096E-01 | |
| | $Y^0$ | $Y^2$ | $Y^4$ | $Y^6$ | $Y^8$ |
| $X^0$ | 0.0000E+00 | -2.7111E-03 | -2.8962E-07 | 0.0000E+00 | 0.0000E+00 |
| $X^2$ | 1.6414E+00 | -3.8837E-08 | 0.0000E+00 | 0.0000E+00 | 0.0000E+00 |
| $X^4$ | -9.3506E-10 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.037 (%) | UPPER SIDE | −0.010 (%) |
| LOWER SIDE | −0.037 (%) | LOWER SIDE | −0.010 (%) |
| LEFT SIDE | 0.064 (%) | LEFT SIDE | 0.000 (%) |
| RIGHT SIDE | −0.111 (%) | RIGHT SIDE | 0.000 (%) |

FIG. 26A

| OPTICAL SURFACE | | RADIUS OF CURVATURE | Y RADIUS OF CURVATURE | SURFACE SEPARATION | OPTICAL SYSTEM | | | | TILT OF NORMAL TO SURFACE | | REFRACTIVE INDEX | DISPERSION |
|---|---|---|---|---|---|---|---|---|---|---|---|---|
| | | | | | POSITION OF SURFACE VERTEX | | | | | | | |
| DEVICE | SURFACE | | | | POSITION Z | POSITION X | POSITION Y | | TILT ZX | TILT ZY | Nd | νd |
| | | (mm) | (mm) | (mm) | (mm) | (mm) | (mm) | | (deg) | (deg) | | |
| DEFLECTING UNIT 4 | REFLECTING SURFACE | | | 16.489 | 0.000 | | | | | | | |
| FIRST SCANNING LENS 35a | INCIDENT SURFACE | -105.7343 | | 0.160 | 16.489 | 27.222 | 0.000 | | 7.471 | 0.000 | 1.48749 | 70.4 |
| | LIGHT EMER- GENCE SURFACE | -278.2567 | | 0.100 | 16.649 | -6.940 | 0.000 | | -1.813 | 0.000 | | |
| SECOND SCANNING LENS 35b | INCIDENT SURFACE | 83.4333 | | 0.700 | 16.749 | 11.342 | 0.000 | | 28.187 | 0.000 | 1.74330 | 49.2 |
| | LIGHT EMER- GENCE SURFACE | -183.4301 | | 499.855 | 17.449 | 119.730 | 0.000 | | 48.187 | 0.000 | | |
| SURFACE TO BE SCANNED 6 | | | | | 517.304 | -68.625 | 0.000 | | 0.000 | 0.000 | | |

FIG. 26B

| ASPHERICAL COEFFICIENT | | | | | |
|---|---|---|---|---|---|
| DEVICE | FIRST SCANNING LENS 35a | | | K | |
| SURFACE | INCIDENT SURFACE | | | -4.3379E+00 | |
| | $Y^0$ | $Y^2$ | $Y^4$ | $Y^6$ | $Y^8$ |
| $X^0$ | 0.0000E+00 | 4.4406E-03 | 2.0695E-05 | 0.0000E+00 | 0.0000E+00 |
| $X^2$ | -6.4421E-03 | 1.0958E-05 | 0.0000E+00 | 0.0000E+00 | 0.0000E+00 |
| $X^4$ | 2.3784E-07 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 26C

| ASPHERICAL COEFFICIENT | | | | | |
|---|---|---|---|---|---|
| DEVICE | FIRST SCANNING LENS 35a | | | K | |
| SURFACE | LIGHT EMERGENCE SURFACE | | | -7.5714E+01 | |
| | $Y^0$ | $Y^2$ | $Y^4$ | $Y^6$ | $Y^8$ |
| $X^0$ | 0.0000E+00 | -9.8325E-03 | 5.1377E-07 | 0.0000E+00 | 0.0000E+00 |
| $X^2$ | -9.0439E-04 | 7.0829E-08 | 0.0000E+00 | 0.0000E+00 | 0.0000E+00 |
| $X^4$ | 4.1836E-09 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 26D

| ASPHERICAL COEFFICIENT | | | | | |
|---|---|---|---|---|---|
| DEVICE | SECOND SCANNING LENS 35b | | | | K |
| SURFACE | INCIDENT SURFACE | | | | -7.5714E+01 |
| | $Y^0$ | $Y^2$ | $Y^4$ | $Y^6$ | $Y^8$ |
| $X^0$ | 0.0000E+00 | -9.8325E-03 | 5.1377E-07 | 0.0000E+00 | 0.0000E+00 |
| $X^2$ | -9.0439E-04 | 7.0829E-08 | 0.0000E+00 | 0.0000E+00 | 0.0000E+00 |
| $X^4$ | 4.1836E-09 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 26E

| ASPHERICAL COEFFICIENT | | | | | |
|---|---|---|---|---|---|
| DEVICE | SECOND SCANNING LENS 35b | | | | K |
| SURFACE | LIGHT EMERGENCE SURFACE | | | | -9.5698E-01 |
| | $Y^0$ | $Y^2$ | $Y^4$ | $Y^6$ | $Y^8$ |
| $X^0$ | 0.0000E+00 | -3.3817E-03 | -7.0526E-07 | 0.0000E+00 | 0.0000E+00 |
| $X^2$ | 1.5315E-03 | -1.0305E-07 | 0.0000E+00 | 0.0000E+00 | 0.0000E+00 |
| $X^4$ | -1.3855E-09 | 0.0000E+00 | 0.0000E+00 | 0.0000E+00 | 0.0000E+00 |
| $X^6$ | 0.0000E+00 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.058 (%) | UPPER SIDE | 0.012 (%) |
| LOWER SIDE | −0.058 (%) | LOWER SIDE | 0.012 (%) |
| LEFT SIDE | 0.069 (%) | LEFT SIDE | 0.000 (%) |
| RIGHT SIDE | −0.060 (%) | RIGHT SIDE | 0.000 (%) |

FIG. 30A

| OPTICAL SYSTEM |||||||||||
|---|---|---|---|---|---|---|---|---|---|---|
| OPTICAL SURFACE || RADIUS OF CURVATURE (mm) | SURFACE SEPARATION (mm) | POSITION OF SURFACE VERTEX ||| TILT OF NORMAL TO SURFACE || REFRACTIVE INDEX | DISPERSION |
| DEVICE | SURFACE | Y RADIUS OF CURVATURE | SURFACE SEPARATION | POSITION Z (mm) | POSITION X (mm) | POSITION Y (mm) | TILT ZX (deg) | TILT ZY (deg) | Nd | νd |
| DEFLECTING UNIT 4 | REFLECTING SURFACE |  | 49.860 | 0.000 |  |  |  |  |  |  |
| FIRST SCANNING LENS 45b | INCIDENT SURFACE | 172.0144 | 0.140 | 49.860 | 12.932 | 0.000 | 25.000 | 0.000 | 1.75520 | 27.5 |
|  | LIGHT EMERGENCE SURFACE | −178.0748 | 402.084 | 50.000 | 68.349 | 0.000 | 36.040 | 0.000 |  |  |
| SURFACE TO BE SCANNED 6 |  |  |  | 452.084 | 1.457 | 0.000 | 8.421 | 0.000 |  |  |

FIG. 30B

| ASPHERICAL COEFFICIENT |||||
|---|---|---|---|---|
| DEVICE SURFACE | FIRST SCANNING LENS 45a INCIDENT SURFACE ||| K -9.6195E+02 ||
| | $Y^0$ | $Y^2$ | $Y^4$ | $Y^6$ | $Y^8$ |
| $X^0$ | 0.0000E+00 | -1.4038E-02 | 2.7472E-06 | -3.1388E-10 | 0.0000E+00 |
| $X^2$ | 3.0160E-04 | -4.3890E-08 | -2.3366E-11 | 0.0000E+00 | 0.0000E+00 |
| $X^4$ | -1.6218E-09 | 9.1459E-13 | 0.0000E+00 | 0.0000E+00 | 0.0000E+00 |
| $X^6$ | 3.3836E-14 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

FIG. 30C

| ASPHERICAL COEFFICIENT |||||
|---|---|---|---|---|
| DEVICE SURFACE | FIRST SCANNING LENS 45a LIGHT EMERGENCE SURFACE ||| K -7.0304E-01 ||
| | $Y^0$ | $Y^2$ | $Y^4$ | $Y^6$ | $Y^8$ |
| $X^0$ | 0.0000E+00 | -9.9320E-03 | 3.4709E-07 | 3.8799E-10 | 0.0000E+00 |
| $X^2$ | 1.6734E-03 | -1.3457E-07 | -1.0293E-12 | 0.0000E+00 | 0.0000E+00 |
| $X^4$ | 1.8684E-08 | -1.4702E-12 | 0.0000E+00 | 0.0000E+00 | 0.0000E+00 |
| $X^6$ | -3.6730E-14 | 0.0000E+00 | 0.0000E+00 | 0.0000E+00 | 0.0000E+00 |
| $X^8$ | 0.0000E+00 | 0.0000E+00 | 0.0000E+00 | 0.0000E+00 | 0.0000E+00 |

| TV DISTORTION | | TRAPEZOID DISTORTION | |
|---|---|---|---|
| UPPER SIDE | 0.173 (%) | UPPER SIDE | 0.097 (%) |
| LOWER SIDE | -0.173 (%) | LOWER SIDE | 0.097 (%) |
| LEFT SIDE | 0.132 (%) | LEFT SIDE | 0.000 (%) |
| RIGHT SIDE | -0.198 (%) | RIGHT SIDE | 0.000 (%) |

TWO-DIMENSIONAL SCANNING APPARATUS, AND IMAGE DISPLAYING APPARATUS

BACKGROUND OF THE INVENTION

1. Field of the Invention

The present invention relates to a two-dimensional scanning apparatus usable in an image displaying apparatus of a scanning type capable of displaying a two-dimensional image by scanning light in a two-dimensional manner.

2. Related Background Art

There have been proposed various two-dimensional scanning apparatuses in which a light spot is scanned in a two-dimensional manner, and a two-dimensional image is formed due to the effect of its after image.

It is generally known that distortion is likely to appear in a two-dimensional image formed on a surface to be scanned (a scanned surface) when a light beam is two-dimensionally deflected and scanned. The distortion includes trapezoid distortion, uniform-velocity scanning distortion, linear scanning distortion, and so-called TV distortion of curvature in an image frame formed on the scanned surface.

Japanese Patent Application Laid-Open No. H8(1996)-146320 discloses a two-dimensional scanning apparatus in which a light beam emitted by a light source is two-dimensionally deflected by a deflecting unit, and a light spot is two-dimensionally scanned through a scanning lens having f-θ characteristics as distortion characteristics to form an image. It is described therein that f-θ characteristics of the scanning lens and electrical correction can correct the TV distortion that is distortion appearing in an image formed when light is two-dimensionally scanned. Further, Japanese Patent Application Laid-Open Nos. H11(1999)-84291 and 2001-281583 disclose a two-dimensional scanning apparatus in which an optical element having a refractive surface and a reflecting surface is used, an optical path is folded in the optical element, and inner and outer refractive surfaces or reflecting surfaces are comprised of rotational asymmetrical surfaces having no rotational symmetrical axes to correct decentering aberrations.

In those two-dimensional scanning apparatuses, velocity uniformity of scanning light on the scanned surface is preferably corrected over a wide scanning angle though the apparatus is constructed using a single optical element. Further, the apparatus is capable of achieving telecentric characteristic that is necessary for highly precise drawing.

In the two-dimensional scanning apparatus disclosed in Japanese Patent Application Laid-Open No. H8(1996)-146320, however, it is actually difficult to electrically correct the TV distortion though the apparatus aims at correcting the TV distortion by the f-θ characteristics of the scanning lens and the electrical correction.

The two-dimensional scanning apparatuses proposed in Japanese Patent Application Laid-Open Nos. H11(1999)-84291 and 2001-281583 do not aim at correcting the TV distortion form the beginning. Further, it is difficult to stably correct the TV distortion in those two-dimensional scanning apparatuses since the optical element is provided with a reflecting surface having optical power and its surface precision is very severe. Furthermore, the thickness of the optical element tends to increase since a folded optical path needs to be established in the optical element. Moreover, when the optical element is formed of plastic material, large influences of distribution of inner refractive index and double refraction are likely to occur.

SUMMARY OF THE INVENTION

It is an object of the present invention to provide a two-dimensional scanning apparatus capable of preferably correcting distortions including TV distortion and trapezoid distortion with ease.

It is another object of the present invention to provide a two-dimensional scanning apparatus capable of correcting TV distortion and trapezoid distortion by using a scanning optical system without any reflecting surface having optical power.

According to one aspect of the present invention, there is provided a two-dimensional scanning apparatus which includes a deflecting unit for two-dimensionally deflecting a light beam from a light source, and a scanning optical system for directing the light beam deflected by the deflecting unit onto a scanned surface. The scanning optical system includes an optical surface which is tilted at an angle larger than a maximum angle of view relative to a central axis of a two-dimensional deflection range of the light beam deflected by the deflecting unit.

In the above two-dimensional scanning apparatus, an optical element including the optical surface can be adapted to be tilted at an angle larger than the maximum angle of view relative to the central axis of the two-dimensional deflection range.

Further, the tilt direction of the optical surface can be adapted to correspond to a first one-dimensional direction of the two-dimensional directions.

The light beam from the light source can be adapted to be incident obliquely relative to at least one of two deflection axes of the deflecting unit (for example, a vibration axis of a deflecting unit with a vibratory reflecting surface).

The scanned surface can be adapted to be tilted in the same direction as the tilt optical surface relative to the central axis of the two-dimensional deflection range.

The tilted optical surface can be adapted to be shifted relative to the central axis of the two-dimensional deflection range.

Further, where a normal at a surface vertex of the tilted optical surface is extended toward a side of light emergence, the optical surface can be adapted to be shifted toward a side of extension of the normal relative to the central axis of the two-dimensional deflection range.

A surface vertex of the tilted optical surface can be adapted to be located outside the two-dimensional deflection range, and only a portion of the optical surface on one side of a center (its surface vertex) of coordinates of the optical surface can be adapted to be used to guide the light beam deflected by the deflecting units to the scanned surface.

Further, there can be provided a plurality of the tilted optical surfaces, and tilt amounts of the optical surfaces can be made different from each other.

There can be provided a plurality of the tilted optical surfaces (for example, a light incident surface and a light emergence surface of the tilted optical element), and a tilt angle of the optical surface (the light emergence surface) disposed on a side of the scanned surface relative to the central axis of the two-dimensional deflection range can be adapted to be larger than that of the optical surface (the light incident surface) disposed on a side of the deflecting unit.

There can be provided a plurality of the tilted optical surfaces (for example, a light incident surface and a light emergence surface of the tilted optical element), and the optical surfaces can be adapted to be shifted relative to the central axis of the two-dimensional deflection range by shift amounts different from each other, respectively.

Further, there can be provided a plurality of the tilted optical surfaces (for example, a light incident surface and a light emergence face of the tilted optical element), and a surface vertex of the optical surface (the light emergence surface) on a side of the scanned surface can be adapted to be more away from the central axis of the two-dimensional deflection range than a normal at a surface vertex of the optical surface (the light incident surface) on a side of the deflecting unit.

Further, the tilted optical surface can be an anamorphic face. The tilted optical surface can be a rotational asymmetrical surface. The tilted optical element can be a meniscus lens whose concave surface faces a side of the deflecting unit. The tilted optical surface (or the optical element) can be adapted to be disposed on a side closest to the scanned surface in the scanning optical system.

Further, the tilted optical element can be a transmission optical element having no reflecting surface. The tilted optical element can be formed of plastic material.

All portions of the tilted optical surface used to guide the light beam deflected by the deflecting unit to the scanned surface can be adapted to be tilted at angles larger than a maximum angle of view relative to the central axis of the two-dimensional deflection range.

There can be provided a plurality of the tilted optical elements tilted at angles larger than a maximum angle of view relative to the central axis of the two-dimensional deflection range.

An angle of view with respect to the first one-dimensional direction can be adapted to be narrower than an angle of view with respect to a second one-dimensional direction perpendicular to the first one-dimensional direction. Alternately, an angle of view with respect to the first one-dimensional direction can be adapted to be wider than an angle of view with respect to a second one-dimensional direction perpendicular to the first one-dimensional direction.

The light beam incident on the deflecting unit can be a convergent light beam.

Further, distortion on the scanned surface can be adapted to be optically corrected by the optical system, or to be corrected by a combination of optical correction by the optical system, and electrical correction by a circuit for controlling the deflecting unit.

Furthermore, according to another aspect of the present invention, there is provided a scanning-type image displaying apparatus, such as projectors, and electronic finders usable in video cameras, digital still cameras and the like, using the above-discussed two-dimensional scanning apparatus.

In this image displaying apparatus, a colour image can be adapted to be formed on the scanned surface by causing a plurality of light beams at different wavelengths from a light source to be incident on the deflecting unit.

Furthermore, according to another aspect of the present invention, there is provided an apparatus wherein an optical element, which is provided in an optical system, has no reflecting surface having optical power, and is tilted and/or shifted, is used to correct TV distortion and trapezoid distortion. Here, the tilted and/or shifted optical element is an optical element whose optical axis or reference axis is tilted and/or shifted relative to a central axis (light ray) of a two-dimensional deflection range of the light beam deflected by the deflecting unit.

More specifically, the following configurations can be employed, other than-several configurations of the present invention described later.

In a two-dimensional scanning apparatus, which, for example, includes a deflecting unit for two-dimensionally deflecting a light beam from a light source, and a scanning optical system for directing the light beam deflected by the deflecting unit onto a scanned surface, and in which the scanning optical system includes an optical element which has no reflecting surface having optical power, and is tilted relative to a central axis of the deflection range of the light beam deflected by the deflecting unit, the light beam from the light source is adapted to be obliquely-incident on a reflecting surface of the deflecting unit, a one-dimensional direction of the two-dimensional directions is adapted to correspond to a direction-along a plane of incidence of the oblique incidence, and the optical element is tilted about an axis perpendicular to the plane of incidence toward a side on which the light beam is obliquely incident on the deflecting unit, the following structures can be adopted.

(A) The optical element is a meniscus lens whose concave surface faces a side of the deflecting unit.

(B) The optical element is an anamorphic lens whose optical power in a one-dimensional direction of the two-dimensional directions is different from that in the other one-dimensional direction perpendicular to the above one-dimensional direction.

(C) The optical element is an anamorphic lens whose optical power in a one-dimensional direction of the two-dimensional directions is smaller than (preferably near zero) that in the other one-dimensional direction perpendicular to the above one-dimensional direction.

(D) The optical element is an aspherical lens having a rotational asymmetrical aspherical surface.

(E) Light incident surface and light emergence surface of the optical element are made decentering from each other.

(F) The optical system includes a plurality of optical elements, and one optical element is tilted and shifted toward a minus side and a second optical element is shifted toward a plus side where the minus side is a side on which the light beam is obliquely incident on the deflecting unit in the one-dimensional direction, and the plus side is a side opposite to the minus side.

Further, the above optical element is tilted toward a minus side, and shifted toward a plus side where the minus side is a side on which the light beam is obliquely incident on the deflecting unit in the one-dimensional direction, and the plus side is a side opposite to the minus side.

These and further aspects and features of the invention will become apparent from the following detailed description of preferred embodiments thereof in conjunction with the accompanying drawings.

BRIEF DESCRIPTION OF THE DRAWINGS

FIGS. 5A, 5B, 5C, 5D and 5E are tables showing numerical example of the first comparative example;

FIGS. 14A, 14B, 14C, 14D and 14E are tables showing numerical example of the two-dimensional scanning apparatus of the first embodiment;

FIGS. 18A, 18B and 18C are tables showing numerical example of the two-dimensional scanning apparatus of the second embodiment;

FIGS. 22A, 22B and 22C are tables showing numerical example of the two-dimensional scanning apparatus of the third embodiment;

FIGS. 26A, 26B, 26C, 26D and 26E are tables showing numerical example of the two-dimensional scanning apparatus of the fourth embodiment;

FIGS. 30A, 30B and 30C are tables showing numerical example of the two-dimensional scanning apparatus of the fifth embodiment;

DESCRIPTION OF THE PREFERRED EMBODIMENTS

First Embodiment

Figure 1:
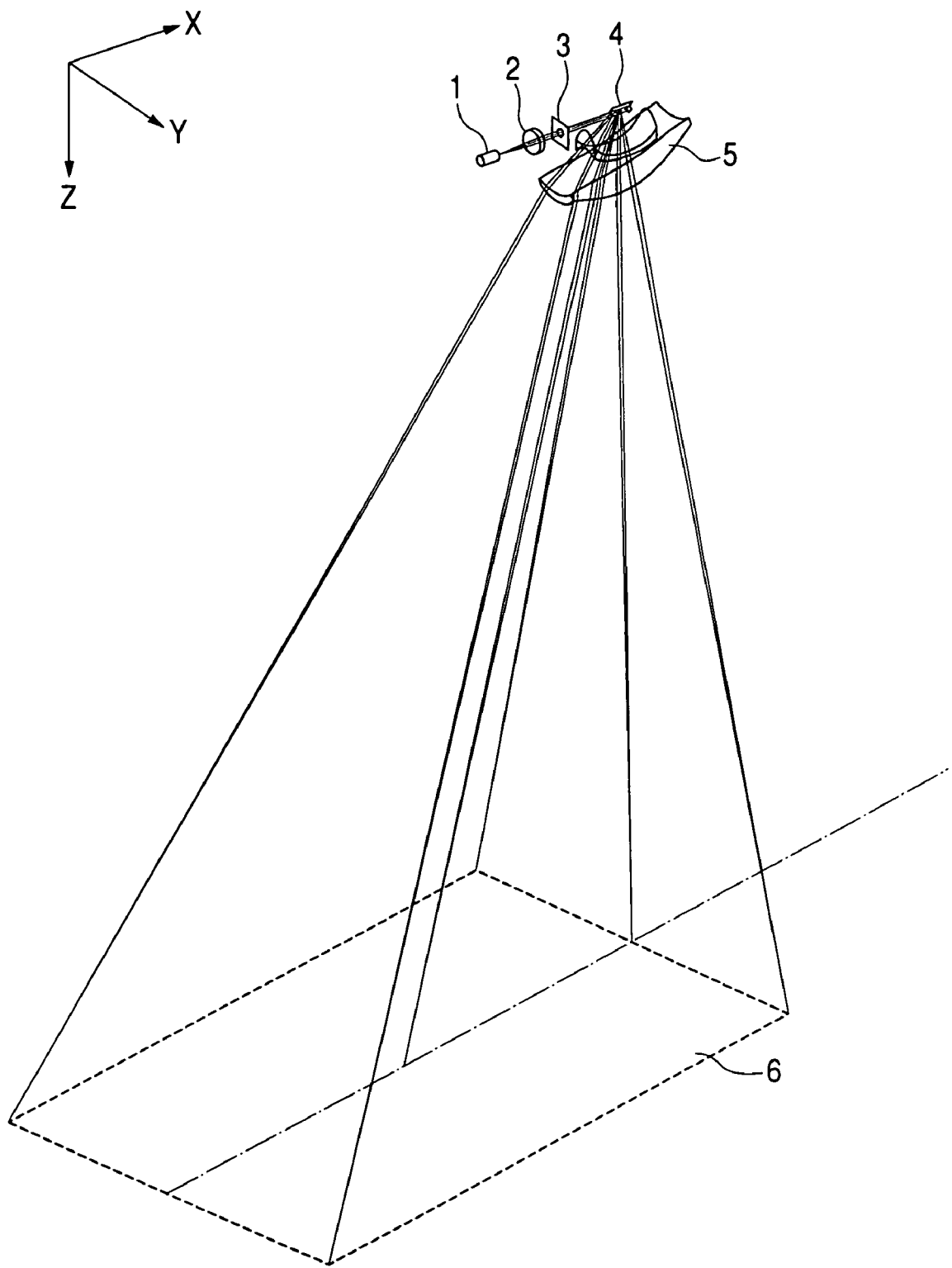
FIG. 1 is a perspective view illustrating a two-dimensional scanning apparatus of a first embodiment according to the present invention.
Figure 2:
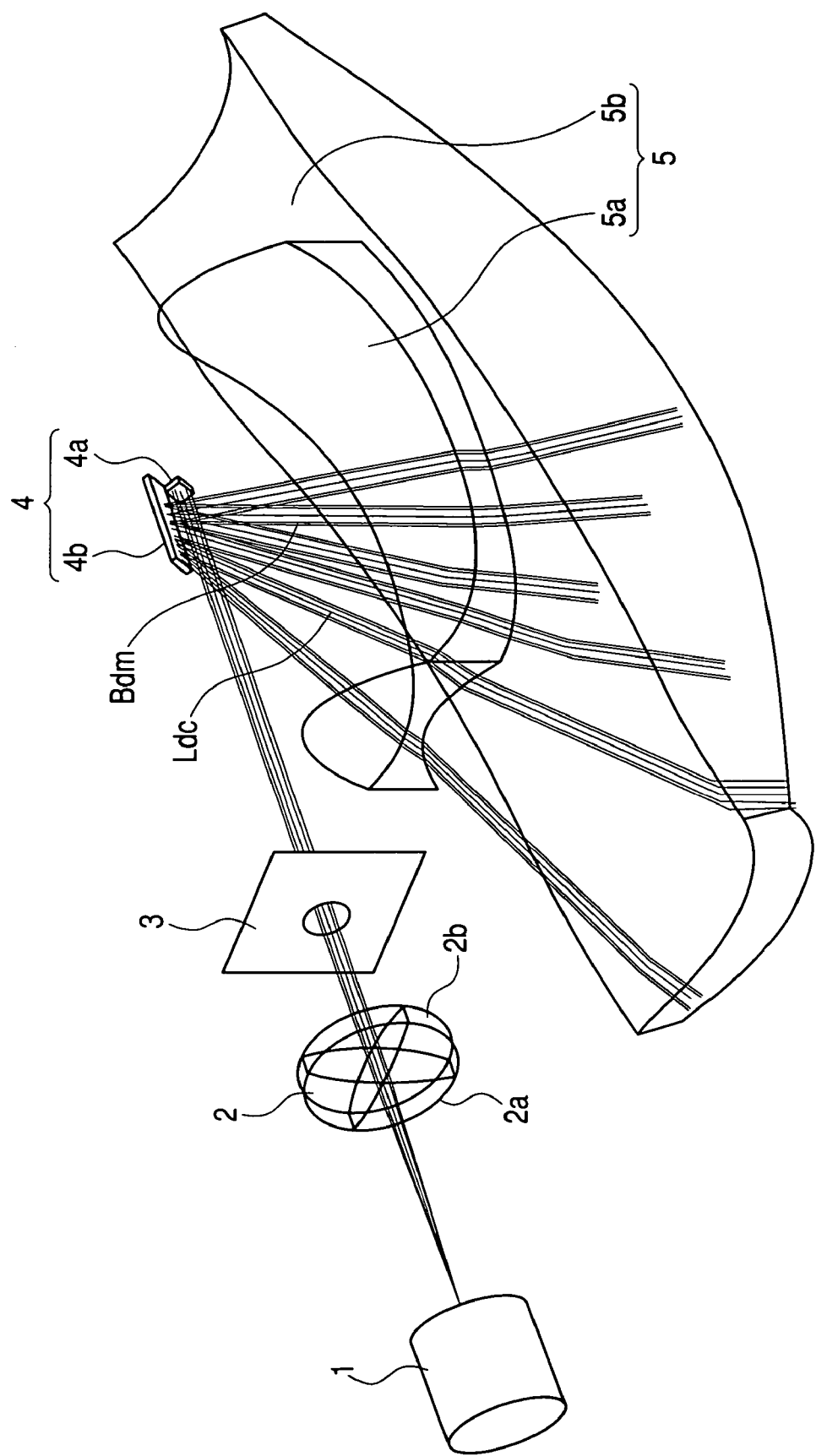
FIG. 2 is a perspective view illustrating a main portion of the first embodiment.

FIG. 1 illustrates the entire construction of a two-dimensional scanning apparatus of a first embodiment according to the present invention. FIG. 2 is an enlarged view illustrating this two-dimensional scanning apparatus. In the first embodiment and other embodiments described later, two-dimensional scanning apparatuses are applied to image displaying apparatuses such as projectors.

In those figures, reference numeral 1 designates a light source such as a laser diode, an LED, and a lamp. Radiation of the light source 1 is controlled by a driving control (not shown) which is operated in response to image signals supplied from an image information supplying apparatus, such as a personal computer, a video player, and a DVD player, described later. A divergent light beam emitted from the light source 1 is converted into a convergent light beam by a condensing lens 2 constructed by cementing two condensing lenses 2a and 2b, and the width of the convergent light beam is restricted by an aperture stop 3.

Reference numeral 4 designates a deflecting unit. The deflecting unit 4 in the first embodiment includes two deflectors (a first deflector 4a, and a second deflector 4b) each having a reflecting surface capable of vibrating in a one-dimensional direction. Two reflecting surfaces of those deflectors 4a and 4b can be vibrated about two mutually-perpendicular axes, respectively. Each of the deflectors 4a and 4b can be comprised of an MEMS (Micro-Electro-Mechanical Systems) device, for example. In the deflectors 4a and 4b comprised of MEMS devices, as described later, their reflecting surfaces can be vibrated using their resonant resonance motions, respectively. The MEMS device can be fabricated by the MEMS technology using semiconductor producing techniques, for example, and hence its size and weight can be remarkably reduced advantageously.

The light beam from the light source 1 is deflected in a horizontal direction by the first deflector 4a. The light beam deflected by the first deflector 4a is deflected in a vertical direction by the second deflector 4b. The light beam emitted from the light source 1 is thereby deflected in two-dimensional directions (i.e., two-dimensionally) by the deflecting unit 4.

Reference numeral 5 designates a scanning optical system having f-θ characteristics. The scanning optical system 5 includes two aspherical lenses 5a and 5b. The light beam (deflected light beam) two-dimensionally deflected by the deflecting unit 4 is guided onto a scanned surface 6, and is imaged as a spot on the scanned surface 6 by the scanning optical system 5. The imaged spot is horizontally scanned by the first deflector 4a, and vertically scanned by the second deflector 4b. A two-dimensional image is accordingly formed on the scanned surface 6 due to the effect of after image.

Figure 3A:
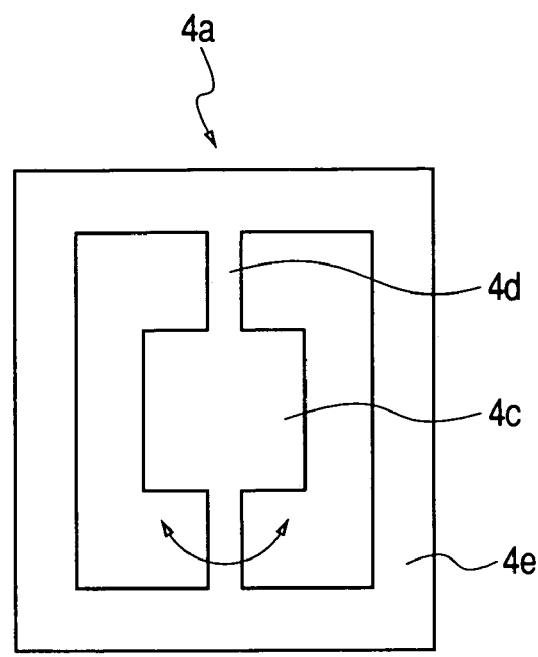
FIGS. 3A and 3B are plan views illustrating main portions of one-dimensional deflectors used in the first embodiment, respectively.

FIG. 3A schematically illustrates the structure of the first deflector 4a constructed as the MEMS device. In FIG. 3A, a reflecting surface 4c is supported by a frame 4e through a pair of torsion bars 4d, and the reflecting surface 4c is resonantly vibrated one-dimensionally about the torsion bars 4d (a deflection axis) when a magnet provided on a bottom surface of the reflecting surface 4c is responded to magnetic force generated by a coil (not shown). The posture of the first deflector 4a is set such that the light beam incident on and reflected by the vibrating reflecting surface 4c can be deflected in the horizontal direction (the X-direction).

Figure 3B:
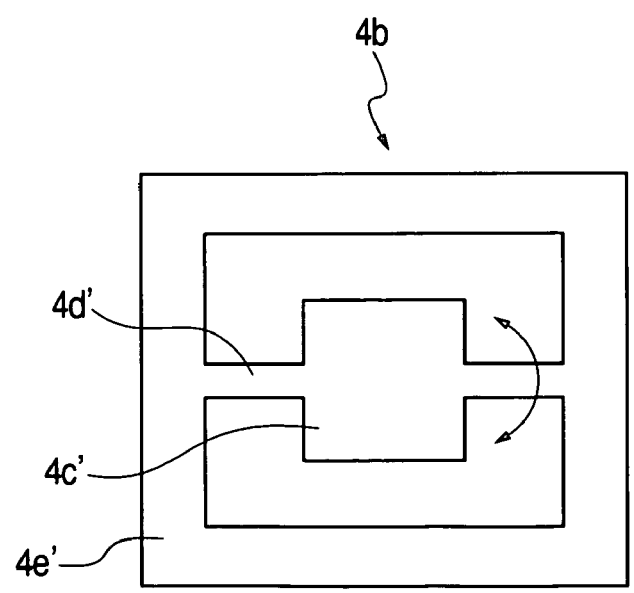

FIG. 3B schematically illustrates the structure of the second deflector 4b constructed as the MEMS device. In FIG. 3B, a reflecting surface 4c' is supported by a frame 4e' through a pair of torsion bars 4d', and the reflecting surface 4c' is resonantly vibrated one-dimensionally about the torsion bars 4d' (a deflection axis) when a magnet provided on a bottom surface of the reflecting surface 4c' is responded to magnetic force generated by a coil (not shown). The posture of the second deflector 4b is also set such that the light beam incident on and reflected by the vibrating reflecting surface 4c' can be deflected in the vertical direction (the Y-direction).

Those first and second deflectors 4a and 4b constitute the deflecting unit 4 capable of two-dimensionally deflecting the light beam from the light source 1 about the two deflection axes. In the first embodiment, the distance between the first deflector 4a and the second deflector 4b is set to 3.0 mm.

Figure 4:
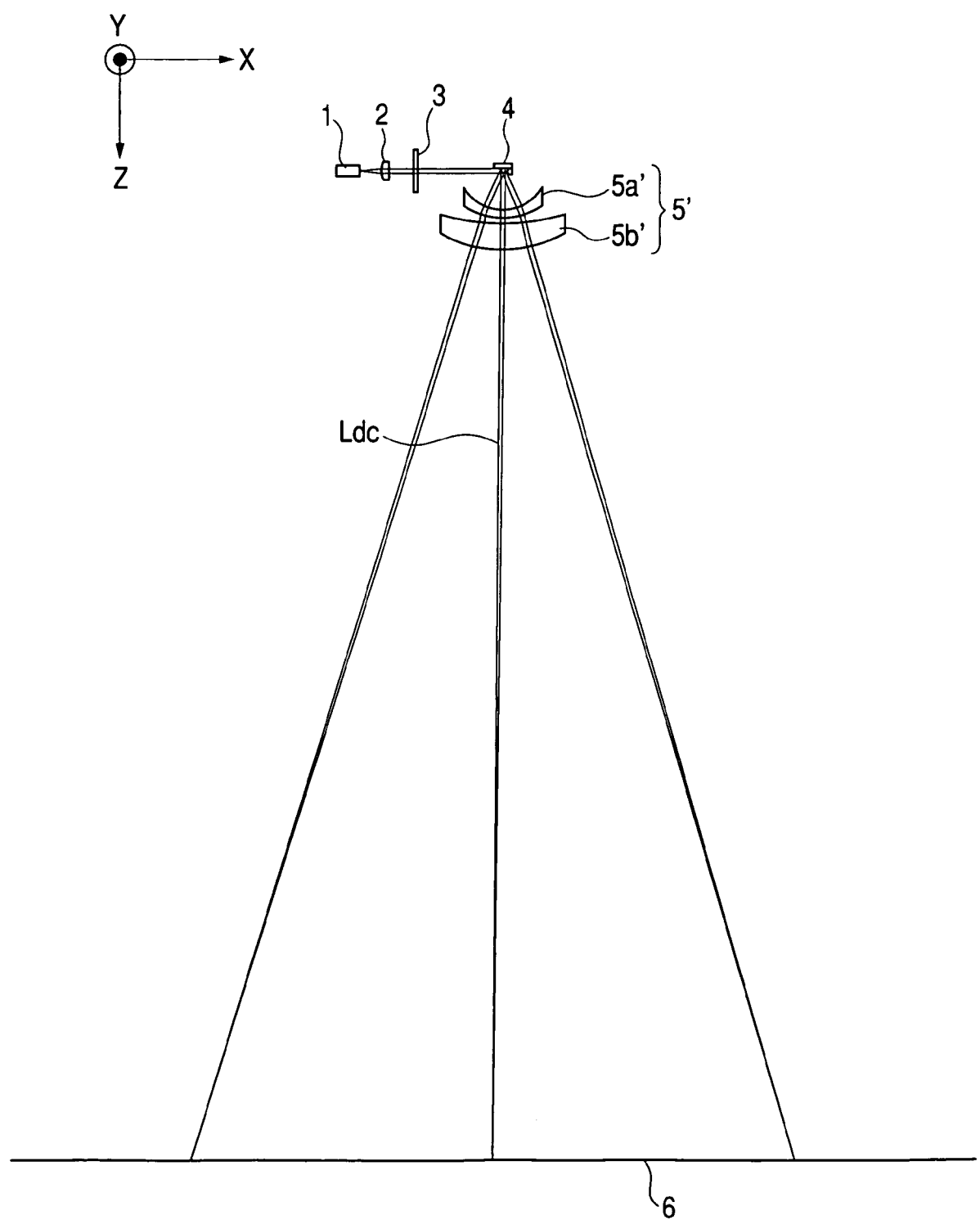
FIG. 4 is a perpendicular cross-sectional view illustrating a first comparative example of a two-dimensional scanning apparatus to be compared with the present invention.

FIG. 4 illustrates a perpendicular cross section (an XZ cross section) of a first comparative example of a two-dimensional scanning apparatus to be used for comparison with this embodiment.

In the first comparative example, similar to the first embodiment, a divergent light beam emitted from a light source 1 is converted into a convergent light beam by a condensing lens 2, and the width of the convergent light beam is restricted by an aperture stop 3. The light beam is then deflected two-dimensionally in horizontal and vertical directions by a deflecting unit 4. The first comparative example further includes a scanning optical system 5' having f-θ characteristics. The scanning optical system 5' includes two rotational asymmetrical aspherical lenses 5a' and 5b', each of which is formed of plastic material and has no rotational symmetrical axis. The light beam (deflected light beam) deflected by the deflecting unit 4 is imaged as a spot on a scanned surface 6 by the scanning optical system 5'. When the deflecting unit 4 is horizontally and vertically deflected, the deflected light beam is scanned on the scanned surface 6 through the scanning optical system 5'.

In this specification, a two-dimensional deflection range is defined by a range in which the light beam is two-dimensionally deflected by the deflecting unit 4, and a deflection scanning axis Ldc in this embodiment is defined by an axis (a central axis) located at a center of the two-dimensional deflection range in the horizontal and vertical directions. FIGS. 5A to 5E show a numerical example (lens data) of the two-dimensional scanning apparatus of the first comparative example.

In the first comparative example illustrated in FIG. 4, the deflection scanning axis Ldc is coincident with the optical axis of the scanning optical system 5'. Two scanning lenses (the first scanning lens 5a' and the second scanning lens 5b') constituting the scanning optical system 5' are neither tilted nor shifted relative to the deflection scanning axis Ldc, and surface vertexes of all surfaces are positioned on the optical axis (the deflection scanning axis Ldc). Further, the scanned surface 9 is not tilted, either, and accordingly the deflected light beam traveling through the optical axis of the scanning optical system 5' is perpendicularly incident on the scanned surface 6.

In an image formed on the scanned surface 6 in the first comparative example, the TV distortion appears due to the two-dimensional deflection by the deflecting unit 4.

Figure 6A:
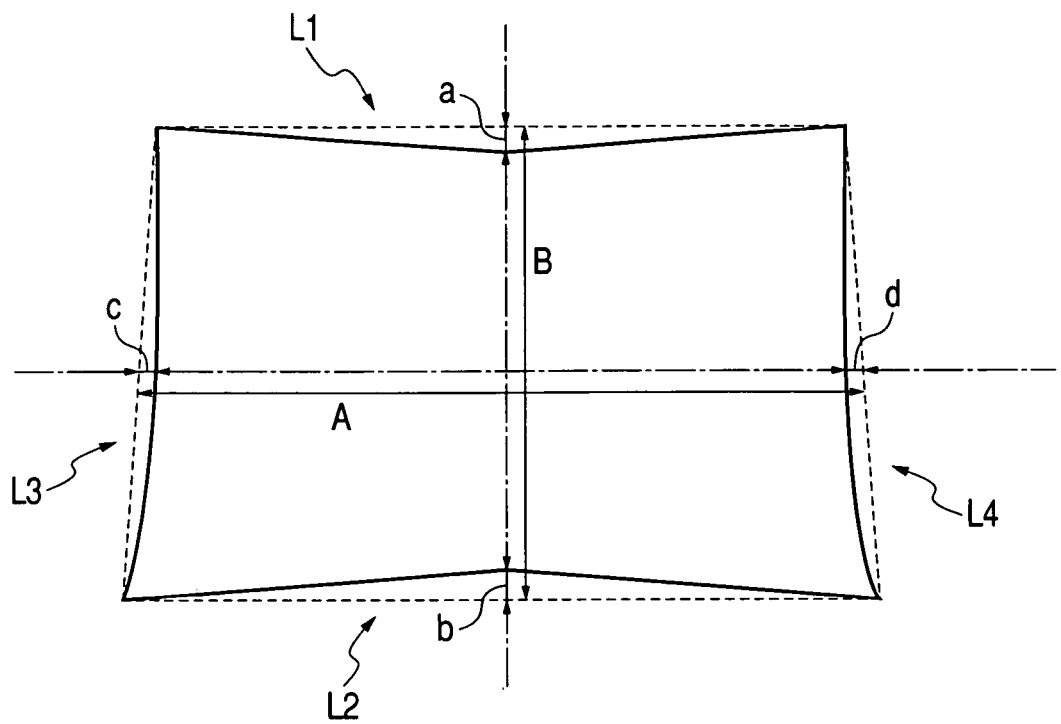
FIGS. 6A and 6B are views showing TV distortion and trapezoid distortion, respectively.

Calculating methods of TV distortion and trapezoid distortion will be described with reference to FIGS. 6A and 6B, respectively. FIG. 6A is a view showing the calculating method of the TV distortion. The TV distortion is the amount of aberration exhibiting the amount of curvature in a frame of a displayed image (an image plane), and is defined by a ratio of the amount of displacement along an axis (a horizontal axis, or a vertical axis indicated by an alternate short and long dash line) passing the image center relative to a width (a width A in the horizontal direction, or a width B in the vertical direction) of the image. Accordingly, the TV distortion in each side of the image frame is represented by the following formula:

Upper side L1; a/B×100%

Lower side L2; b/B×100%

Left side L3; c/A×100%

Right side L4; d/A×100%

Figure 6B:
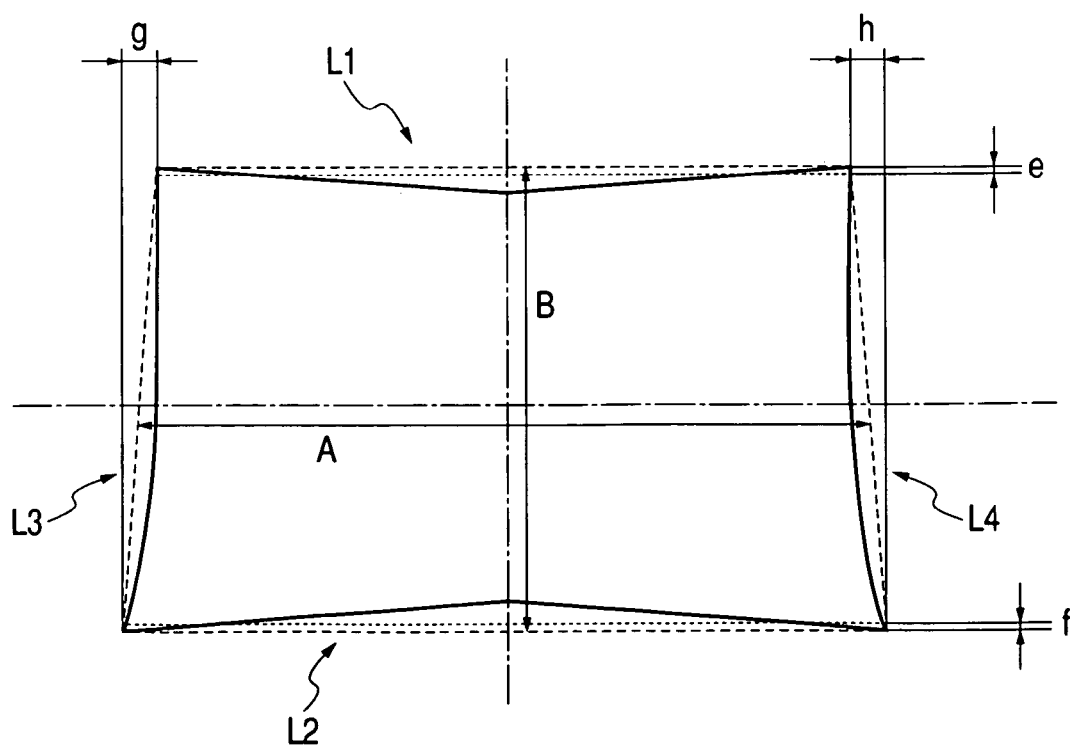

Further, FIG. 6B is a view showing the calculating method of the trapezoid distortion. The trapezoid distortion is the amount of aberration exhibiting the amount of slope or tilt in a frame of a displayed image, and is defined by a ratio of the amount of displacement in each corner of the image relative to a width of the image. Accordingly, the trapezoid distortion in each side of the image frame is represented by the following formula:

Upper side L1; e/2/B×100%

Lower side L2; f/2/B×100%

Left side L3; g/2/A×100%

Right side L4; h/2/A×100%

Figures 7, 8:
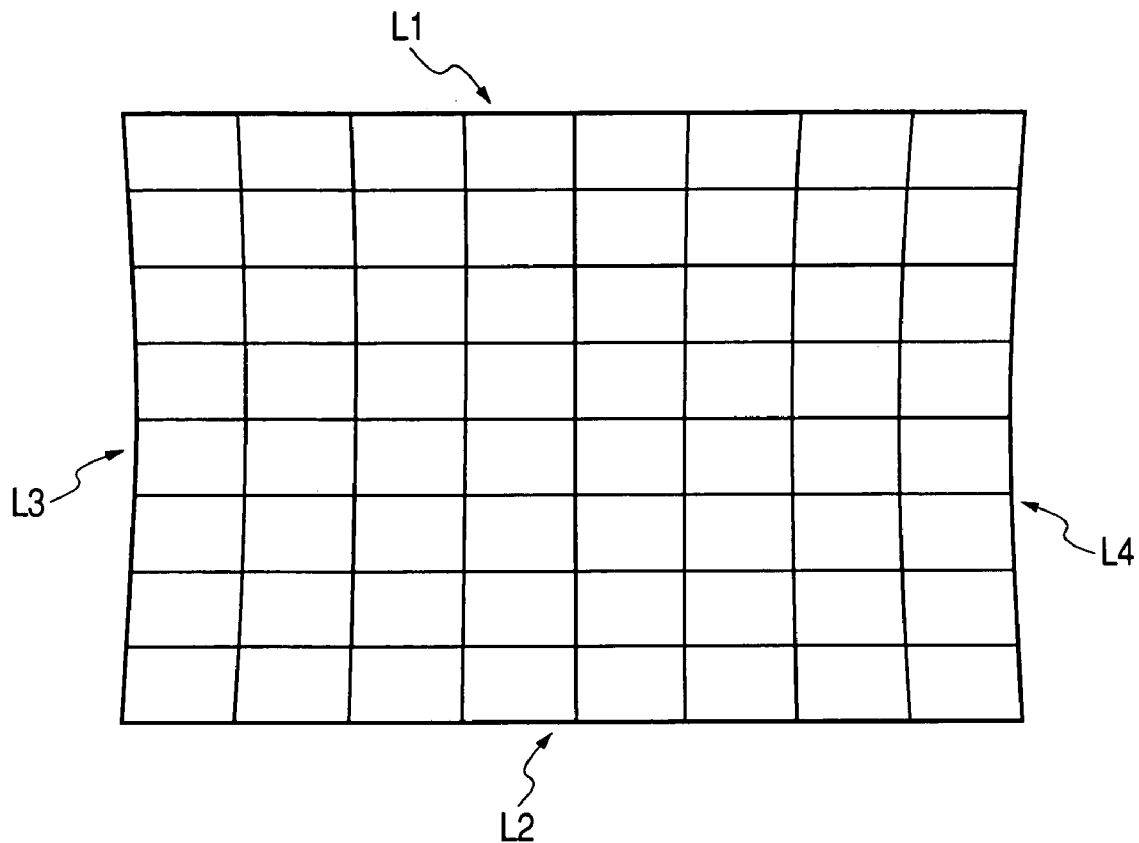
FIG. 7 is a view illustrating a displayed image (grating) in the first comparative example.
FIG. 8 is a table showing amounts of TV distortion and trapezoid distortion in the first comparative example.

FIG. 7 illustrates an image (grating) scanned and displayed by the two-dimensional scanning apparatus of the first comparative example. FIG. 8 shows amounts of the TV distortion and the trapezoid distortion in the displayed image.

All four lines (sides) constituting the image frame should be ideally straight, but as illustrated in FIG. 7, each of the left side L3 and the right side L4 of the frame is in the form of a curve whose central portion caves toward the image center though the upper side L1 and the lower side L2 are approximately straight. Thus, it can be seen that the TV distortion largely occurs. Here, in connection with the TV distortion, the upper side is 0.12%, the lower side is 0.12%, the left side is 1.53%, and the right side is 1.53% (see FIG. 8). In the first comparative example, no trapezoid distortion appears since the scanning optical system 5' is symmetrically arranged with respect to the deflection scanning axis Ldc.

As discussed above, in a general optical arrangement wherein the optical axis of the scanning optical system 5' is coincident with the deflection scanning axis Ldc, a large TV distortion is liable to occur due to the two-dimensional deflection and scanning. Accordingly, the image is thereby distorted, and quality of the displayed image is degraded.

Figure 9:
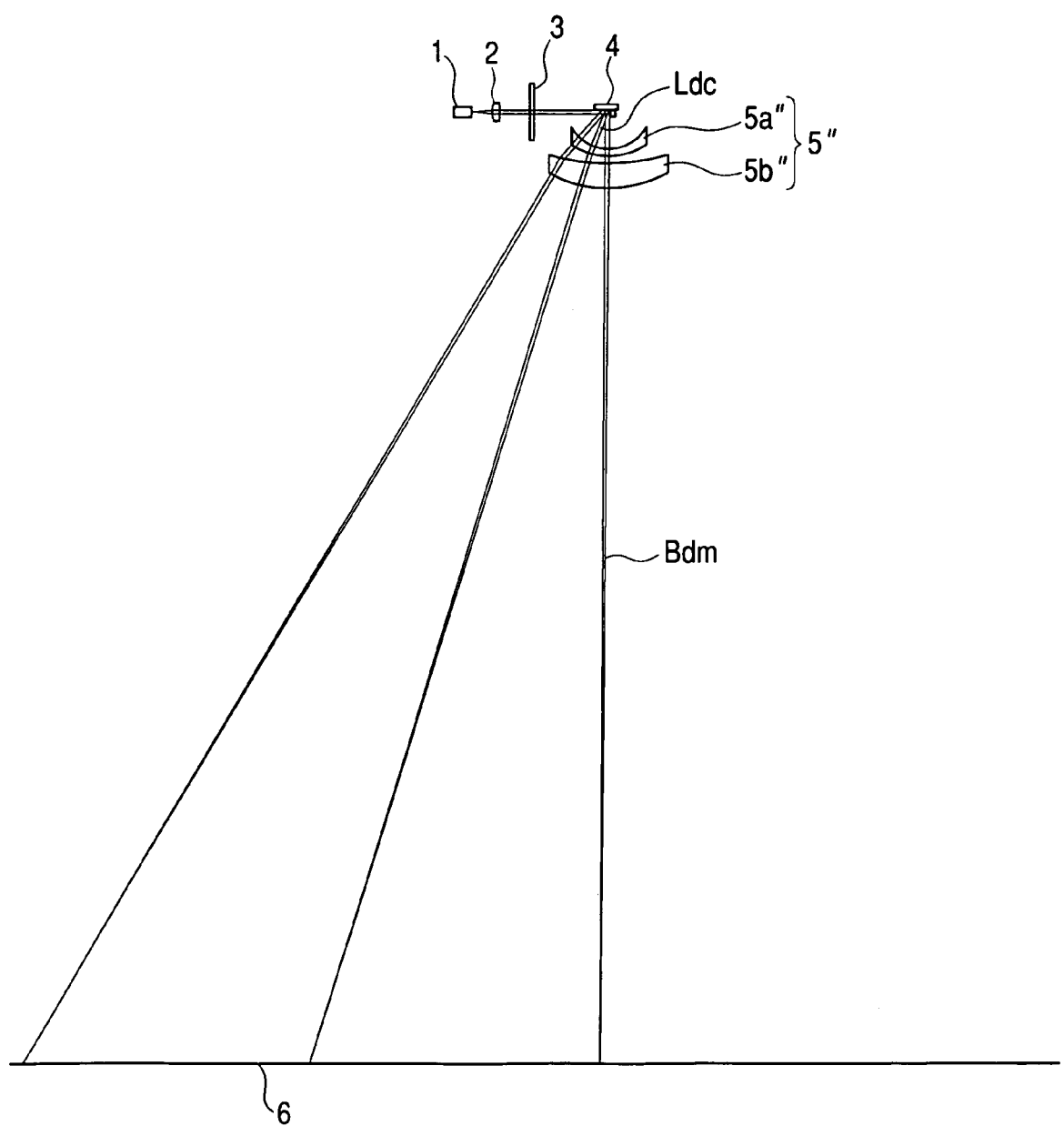
FIG. 9 is a perpendicular cross-sectional view illustrating a second comparative example of a two-dimensional scanning apparatus to be compared with the present invention.

FIG. 9 illustrates a perpendicular cross section (an XZ cross section) of a second comparative example of a two-dimensional scanning apparatus. In the second comparative example, a scanning optical system 5" is comprised of two scanning lenses (a first scanning lens 5a", and a second scanning lens 5b"), and these first and second scanning lenses 5a" and 5b" are arranged on the optical axis of the scanning optical system 5". The scanning optical system 5" is disposed decentering from the deflection scanning axis Ldc in the perpendicular cross section.

More specifically, orientation and position of the deflecting unit 4 are set such that the optical axis of the scanning optical system 5" can overlap a deflected light beam Bdm which forms a maximum angle of view (a maximum deflection angle relative to the deflection scanning axis Ldc) at an edge of the perpendicular cross section. Further, tilt amounts of the first scanning lens 5a" and the second scanning lens 5b" are equalized with the maximum angle of view.

Thus, since the deflected light beam at the edge of the perpendicular cross section passes on the optical axis of the first scanning lens 5a" and the second scanning lens 5b", portions of the first and second scanning lenses 5a" and 5b" on one side from their optical axis are used in the perpendicular cross section. The first scanning lens 5a" and the second scanning lens 5b" are thus used asymmetrically with respect to the optical axis.

Figures 10, 11:
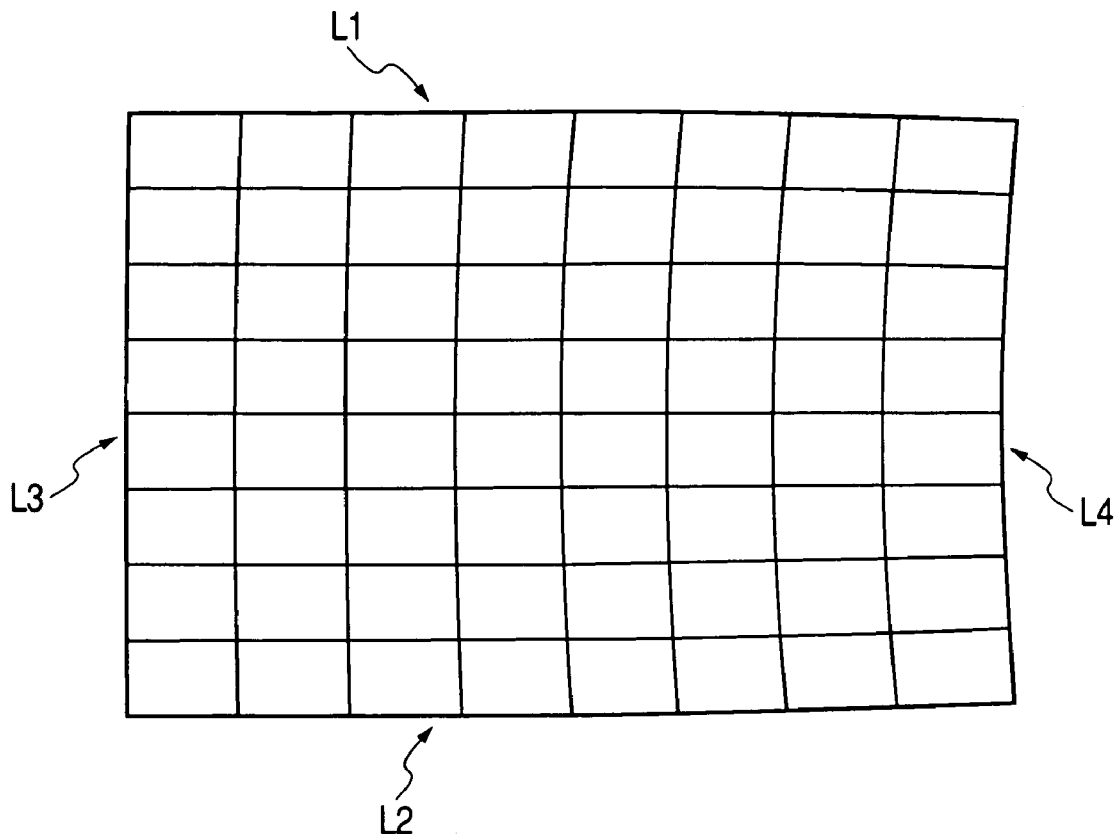
FIG. 10 is a view illustrating a displayed image (grating) in the second comparative example.
FIG. 11 is a table showing amounts of TV distortion and trapezoid distortion in the second-comparative example.

FIG. 10 illustrates an image (grating) scanned and displayed by the two-dimensional scanning apparatus of the second comparative example. Further, FIG. 11 shows amounts of the TV distortion and the trapezoid distortion in the displayed image.

In the second comparative example, as illustrated in FIG. 10, the TV distortion asymmetrically appears with respect to right and left directions (the horizontal direction). In other words, the amount of appearing TV distortion is small on a left side on which the deflected light beam travels near the optical axis of the first and second scanning lenses 5a" and 5b", while the amount of appearing TV distortion is large on a right side on which the deflected light beam travels away from the optical axis of the first and second scanning lenses 5a" and 5b".

As shown in FIG. 11, in connection with the TV distortion, the upper side is 0.90%, the lower side is 0.90%, the left side is 0.00%, and the right side is 1.70% (see FIG. 11). Further, in connection with the trapezoid distortion, the upper side is 1.02%, the lower side is 1.02%, the left side is 0.00%, and the right side is 0.00% (see FIG. 11).

Also in the second comparative example, large TV distortion and large trapezoid distortion occur. Accordingly, quality of the displayed image is degraded.

In the first embodiment, therefore, the scanning optical system 5 and the scanned surface 6 are arranged in such an appropriate manner that TV distortion and trapezoid distortion can be corrected.

Figure 12:
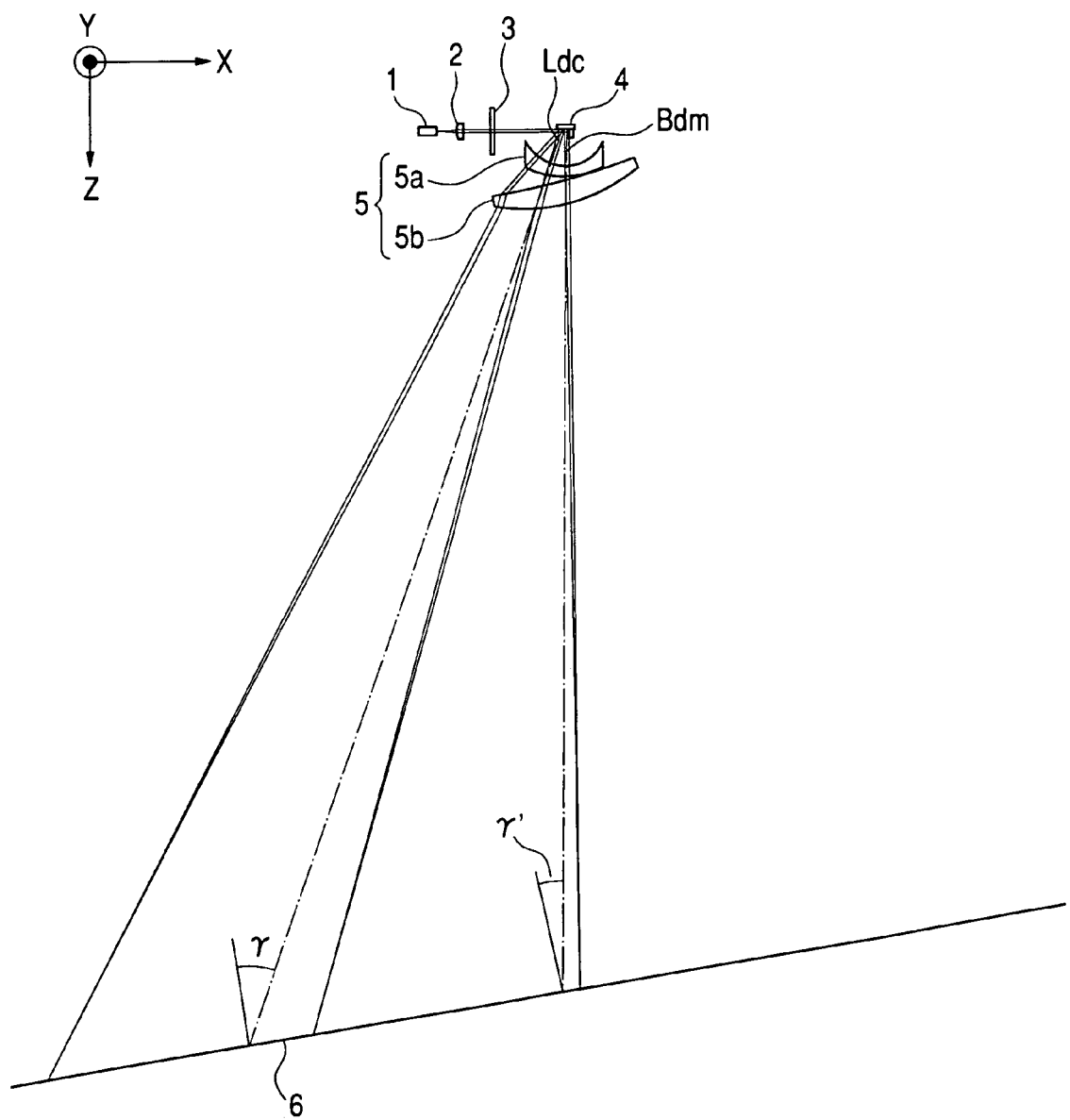
FIG. 12 is a perpendicular cross-sectional view illustrating the two-dimensional scanning apparatus of the first embodiment.
Figure 13:
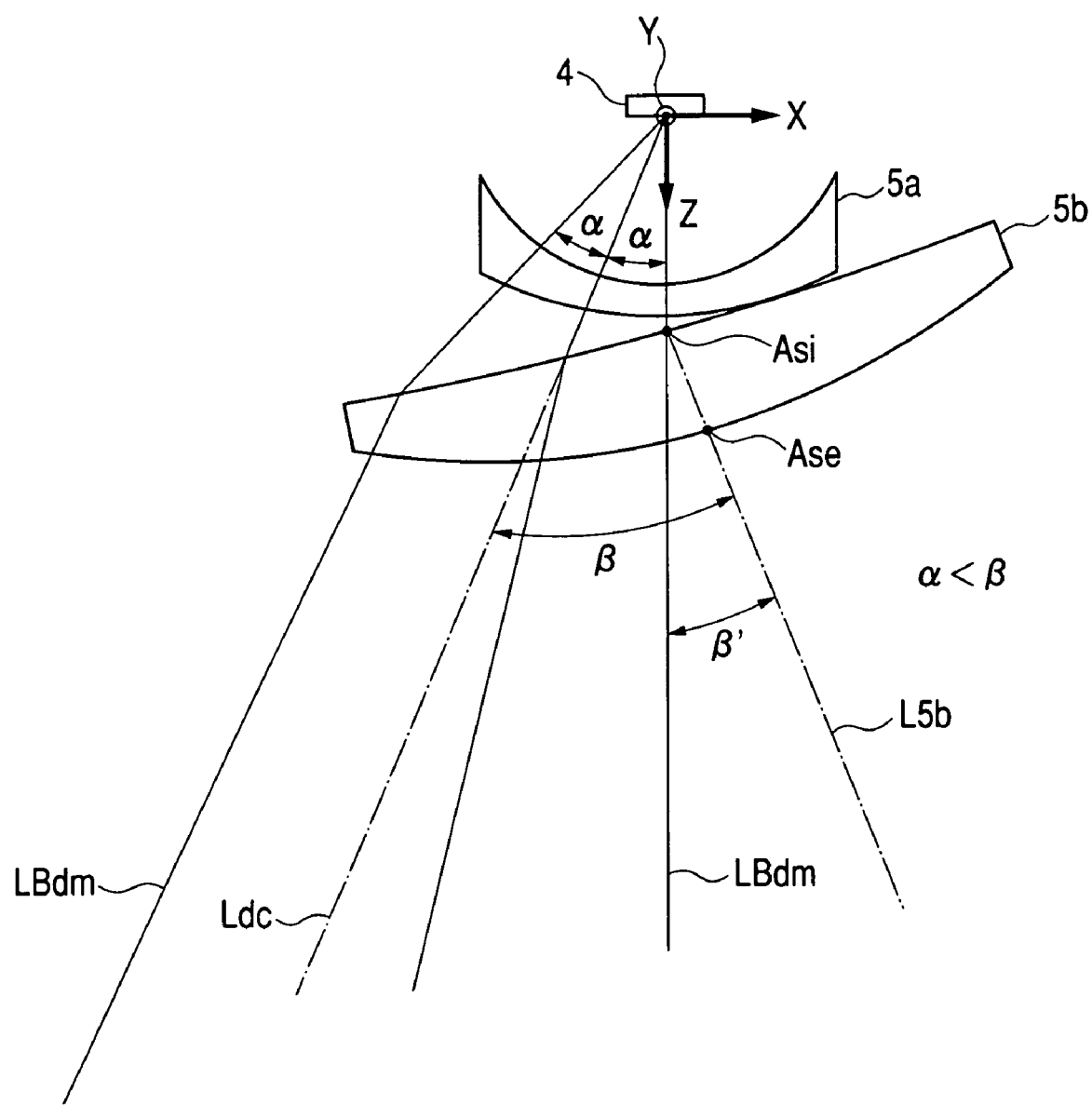
FIG. 13 is an enlarged view illustrating a main portion of the two-dimensional scanning apparatus of the first embodiment.

FIG. 12 illustrates a perpendicular cross section (the XZ cross section: the same in embodiments described later) of the two-dimensional scanning apparatus of the first embodiment. FIG. 13 illustrates an enlarged portion of the two-dimensional scanning apparatus of the first embodiment. FIGS. 14A to 14E show a numerical example (lens data) of the two-dimensional scanning apparatus of the first embodiment. In coordinates exhibiting positions of surface vertexes on optical surfaces in FIGS. 14A to 14E, an origin is a point at which the deflected light beam Bdm forming the maximum angle of view is reflected and deflected by the second deflector 4b in FIG. 13, a Z-axis extends in a direction in which the deflected light beam Bdm forming the maximum angle of view travels, an X-axis extends in a direction perpendicular to the Z-axis (a direction extending rightward from the deflection scanning axis Ldc in FIG. 13 is positive), and a Y-axis extends in a direction perpendicular to the Z-axis and the X-axis. A surface separation or inter-surface distance is defined by a distance between coordinate locations of respective surface vertexes measured along the Z-axis.

Arrangement of the scanning optical system 5 and the scanned surface 6 in the first embodiment will be described with reference to those figures.

In the first embodiment, two scanning lenses constitute the scanning optical system 5, and these lenses are a first scanning lens 5a and a second scanning lens 5b disposed in this order from the side of the deflecting unit 4, respectively.

In the first embodiment, the maximum angle of view α in the horizontal direction is ±20.3 degrees about a center of the deflection scanning axis Ldc, and the maximum angle of view in the vertical direction is ±15.2 degrees about a center of the deflection scanning axis Ldc.

The scanning optical system 5 is disposed decentering from the deflection scanning axis Ldc such that a central light ray LBdm of the deflected light beam Bdm forming the maximum angle of view α in the horizontal direction (the X-direction) can pass on the optical axis of the scanning optical system 5.

The first scanning lens 5a disposed on the side of the deflecting unit 4 is arranged such that surface vertexes of its incident surface and its light emergence surface can be located on the optical axis (the central light ray LBdm of the deflected light beam Bdm) of the scanning optical system 5.

On the other hand, the second scanning lens 5b disposed on the side of the scanned surface 6 is tilted and shifted in the horizontal direction relative to the optical axis of the scanning optical system 5. In the first embodiment, the second scanning lens 5b is tilted such that an angle β' between an optical axis L5b (a normal at a surface vertex Asi of the incident surface, and a normal at a surface vertex Ase of the light emergence surface: a normal to surface) of the second scanning lens 5b and the deflected light beam Bdm (the central light ray LBdm) can be equal to 15.6 degrees. Accordingly, the second scanning lens 5b is tilted such that its optical axis L5b can form an angle β of 35.9 degrees relative to the deflection scanning axis Ldc. This angle β is larger than the maximum angle of view α of 20.3 degrees by 15.6 degrees.

Further, the second scanning lens 5b is disposed on the deflected light beam Bdm forming the maximum angle of view α, and is shifted such that the surface vertex Asi of its incident surface (i.e., the optical axis L5b) is 10.5 mm away from the deflection scanning axis Ldc toward a side on which the optical axis L5b of the second scanning lens 5b (the normal to the incident surface) extends tilting relative to the deflection scanning axis Ldc when the optical axis L5b is extended toward the light emergence side, i.e., toward a right side in FIGS. 12 and 13.

Therefore, the surface vertex on the incident surface of the second scanning lens 5b is disposed on the deflected light beam forming the maximum angle of view, and the surface vertex on the light emergence surface of the second scanning lens 5b is disposed outside a deflection range (a two-dimensional deflection range) of the deflected light beam. Hence, the second scanning lens 5b is used only at its portions of the incident surface and the light emergence surface on one side of their surface vertexes.

Further, the scanned surface 6 (a normal thereto) is tilted by γ' of 10.1 degrees relative to the deflected light beam Bdm forming the maximum angle of view α in a counterclockwise direction of FIG. 12 in the perpendicular cross section. Relative to the deflection scanning axis Ldc, the scanned surface 6 (the normal thereto) is tilted by γ of 30.4 degrees. Here, the scanned surface 6 is tilted relative to the deflection scanning axis Ldc in the same direction as the second scanning lens 5b. The tilt angle of the scanned surface 6 is also larger than the maximum angle of view α.

The thus-constructed two scanning lenses 5a and 5b of the scanning optical system 5 both have rotational asymmetrical aspherical surfaces without any rotational symmetrical axes, respectively. The first scanning lens 5a is a meniscus lens having negative optical power (a reciprocal of a focal length: refractive power), and having a concave surface facing the side of the deflecting unit 4. Further, the second scanning lens 5b is a meniscus lens having a concave surface facing the side of the deflecting unit 4.

The rotational asymmetrical aspherical surface in the first embodiment has a profile given by $$z = \frac{cr^2}{1 + SQRT[1-(1+k)c^2r^2]} + \sum_{i=2}^{66} C_j x^m y^n \quad j = [(m+n)^2 + m + 3m]/2 + 1$$

where the amount of displacement Z in a traveling direction (the Z-direction) of the deflected light beam Bdm is given at each position in the horizontal direction (the X-direction) and the vertical direction (the Y-direction), Z is the sag of a surface parallel to the Z-axis, c is the curvature of the vertex, k is the conic coefficient, and Cj is the coefficient of $x^m y^n$.

Figures 15, 16:
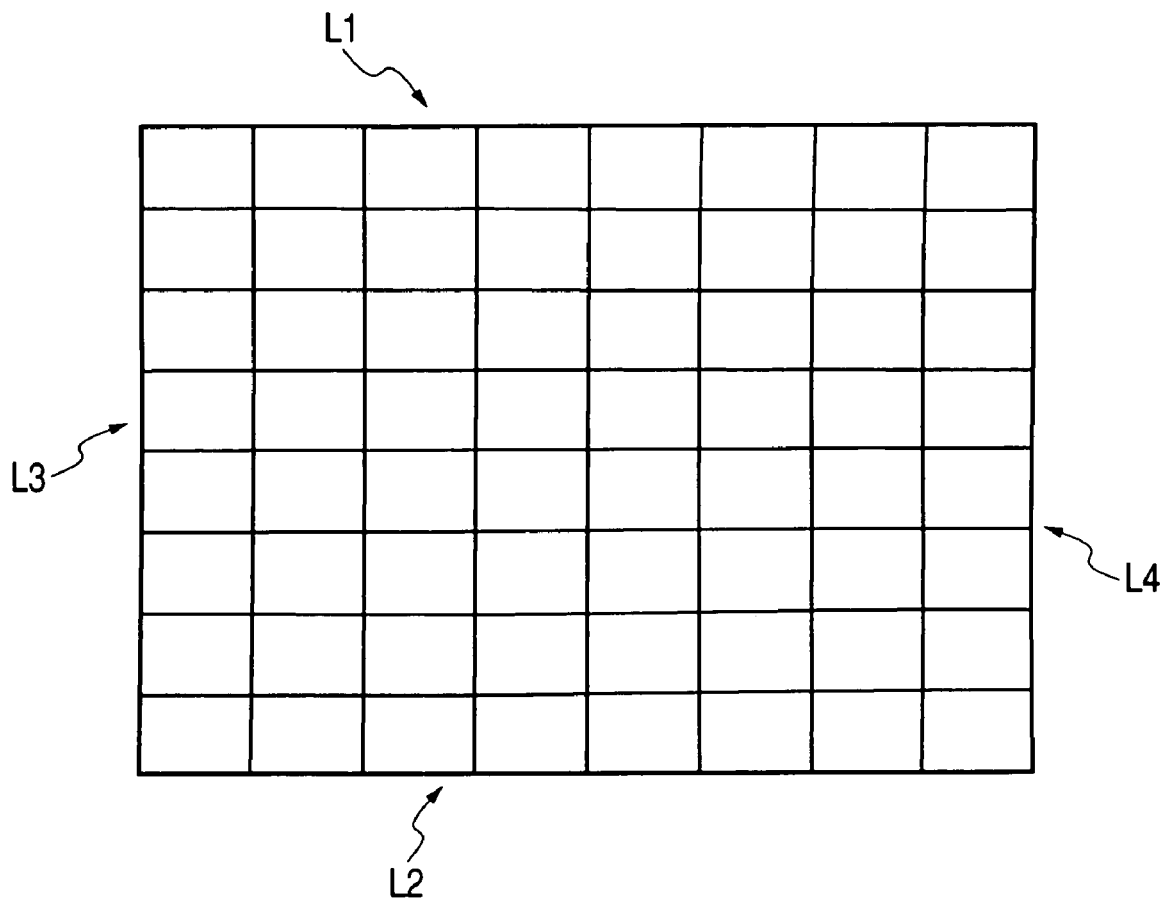
FIG. 15 is a view illustrating a displayed image (grating) in the first embodiment.
FIG. 16 is a table showing amounts of TV distortion and trapezoid distortion in the first embodiment.

FIG. 15 illustrates an image (grating) scanned and displayed by the two-dimensional scanning apparatus of the first embodiment. FIG. 16 shows amounts of the TV distortion and the trapezoid distortion in the displayed image.

With respect to the TV distortion of the image illustrated in FIG. 15, the upper side L1 of the frame is 0.15%, the lower side L2 is 0.15%, the left side L3 is 0.27%, and the right side L4 is 0.04%. The upper side L1 and the lower side L2 curved in the comparative example are corrected to almost straight lines, respectively. Further, with respect to the trapezoid distortion, both the upper side L1 and the lower side L2 are 0.05%, and both the left side L3 and the right side L4 are 0%. Lines sloping in the comparative example are corrected to vertical lines.

As discussed above, in the first embodiment, the optical axis of the scanning optical system 5 is made decentering from the deflection scanning axis Ldc, the scanning lenses 5a and 5b of optical elements constituting the scanning optical system are appropriately tilted and shifted, and the scanned surface 6 is tilted, thereby preferably correcting the TV dictortion and the trapezoid distortion in the displayed image.

More specifically, at least one optical element (the second scanning lens 5b) of the optical elements constituting the scanning optical system 5 is tilted relative to the deflection scanning axis Ldc at an angle β larger than the maximum angle of view α, and is shifted toward the side on which the normal at the surface vertex of the incident surface of that optical element extends tilting relative to the deflection scanning axis Ldc when the normal is extended toward the light emergence side. Further, the scanned surface 6 is tilted relative to the deflection scanning axis Ldc in the same direction as the above-discussed optical element.

The correcting mechanism of the TV distortion is as follows. When the scanning optical system 5 (the first and second scanning lenses 5a and 5b) is made decentering from the deflection scanning axis Ldc, TV distortion asymmetrically appears in the displayed image. The TV distortion is small in the vicinity of the optical axis of the scanning optical system 5, and increases as the distance of its location from the optical axis of the scanning optical system 5 increases. Here, TV distortion at a position remote from the optical axis of the scanning optical system 5 can be corrected by tilting the second scanning lens 5b with little influence on a portion close to the optical axis of the scanning optical system 5

In other words, the TV distortion can be preferably (or to a degree with almost no problem) corrected by the decentering arrangement of the scanning optical system 5 from the deflection scanning axis Ldc and the tilt of the optical element (the second scanning lens 5b) constituting the scanning optical system 5 relative to the optical axis of the scanning optical system 5.

Paraphrasing the above discussion, TV distortion is caused to asymmetrically appear by shifting the scanning optical system 5 from the deflection scanning axis Ldc, and the asymmetrical TV distortion can be corrected by tilting the optical element (the second scanning lens 5b) constituting the scanning optical system 5. Here, correction of the TV distortion can be more effectively made when the optical element (the second scanning lens 5b) is tilted at an angle (an angle larger than the maximum angle of view α) which is larger than any angle that the deflected light beam forms relative to the deflection scanning axis Ldc.

The correcting mechanism of trapezoid distortion is as follows. When the scanning optical system 5 (the first and second scanning lenses 5a and 5b) is made decentering from the deflection scanning axis Ldc, trapezoid distortion appears. Conversely, it is possible to create trapezoid distortion in a reverse direction by tilting the scanned surface 6. As the result, those trapezoid distortions can be offset, and the trapezoid distortion can hence be corrected.

According to the above-discussed first embodiment, TV distortion and trapezoid distortion appearing on the image displayed on the scanned surface 6 can be preferably corrected, and accordingly a two-dimensional scanning apparatus capable of displaying a high-quality image can be achieved.

When a two-dimensional scanning apparatus of the first embodiment is applied to a projector, it is possible to obliquely project an image on a projection surface, such as a screen, by tilting the scanned surface 6. Therefore, when the image is observed from a position behind the projector or the like, the image can be prevented from falling in a shadow of the projector. Further, flexibility in arrangement of the projector can be increased.

Further, in the first embodiment, the tilted second scanning lens (a transmission optical element without any reflecting surfaces) 5b has a meniscus shape whose concave surface faces the side of the deflecting unit 4, and accordingly it is possible to reduce adverse influence of the tilt of the second scanning lens 5b on the curvature of field while maintaining effective corrections of the TV distortion and the trapezoid distortion due to the tilt of the second scanning lens 5b. In other words, corrections of the TV distortion and the trapezoid distortion can be made independently from the curvature of field, and hence the TV distortion and the trapezoid distortion can be corrected with ease.

Further, optical surfaces of two optical elements constituting the scanning optical system 5 in the first embodiment are all composed of transmission refractive surfaces, respectively. Precision required to the refractive surface only needs to be ¼ as small as that required to the reflecting surface, so that the optical element can be readily fabricated. Further, when the reflecting surface is used, there is a limitation to arrangement of an optical path after tilted (folded) by the reflecting surface. In contrast thereto, in the case of the transmission refractive surface that undergoes no such disadvantage, flexibility in such arrangement is large.

Further, since a transmission factor for light rays for displaying the image is larger than a reflection factor therefor, the amount of light loss is outstandingly small in the case of the transmission refractive surface. Particularly, this advantage is remarkable when the number of optical surfaces is large. Additionally, the transmission factor can be drastically enhanced by coating the transmission refractive surface with an antireflective film.

Further, in the event of an optical element having a refractive surface and a reflecting surface in a mixed manner, it is necessary to secure the optical path within the optical element. The size of the optical element itself accordingly increases. However, when an optical element with only optical surfaces of refractive surfaces is used, the optical element can be thinned and the size of a two-dimensional scanning apparatus can be advantageously decreased since there is no necessity to secure the optical path within the optical element.

Accordingly, when an optical element without any reflecting surfaces for directing light to the scanned surface is used in the scanning optical system, the apparatus can enjoy various advantageous effects in contrast to the case using an optical element with the reflecting surface, as described in the above-mentioned Japanese Patent Application Laid-Open Nos. H11(1999)-84291 and 2001-281583. In the present invention, it is also possible to use an optical element which uses a diffraction surface for transmission-diffracting light in place of, or in combination with the refractive surface to correct distortions of the image formed on the scanned surface.

Furthermore, in the first embodiment, two optical elements constituting the scanning optical system 5 are formed of plastic material. The plastic lens is advantageous in that it can be fabricated by injection molding at relatively low costs, and that its weight is lighter that that of a glass lens. Accordingly, an image displaying apparatus including such a two-dimensional scanning apparatus can be reduced in weight, and can be advantageously made portable. In the event that a large-sized optical element having a refractive surface and a reflecting surface in a mixed manner is formed by plastic. molding, there is a fear that influences of refractive-index distribution and double refraction largely appear. However, when the optical element is reduced in size (or thinned) as in the first embodiment, those influences can be reduced.

Second Embodiment

Figure 17:
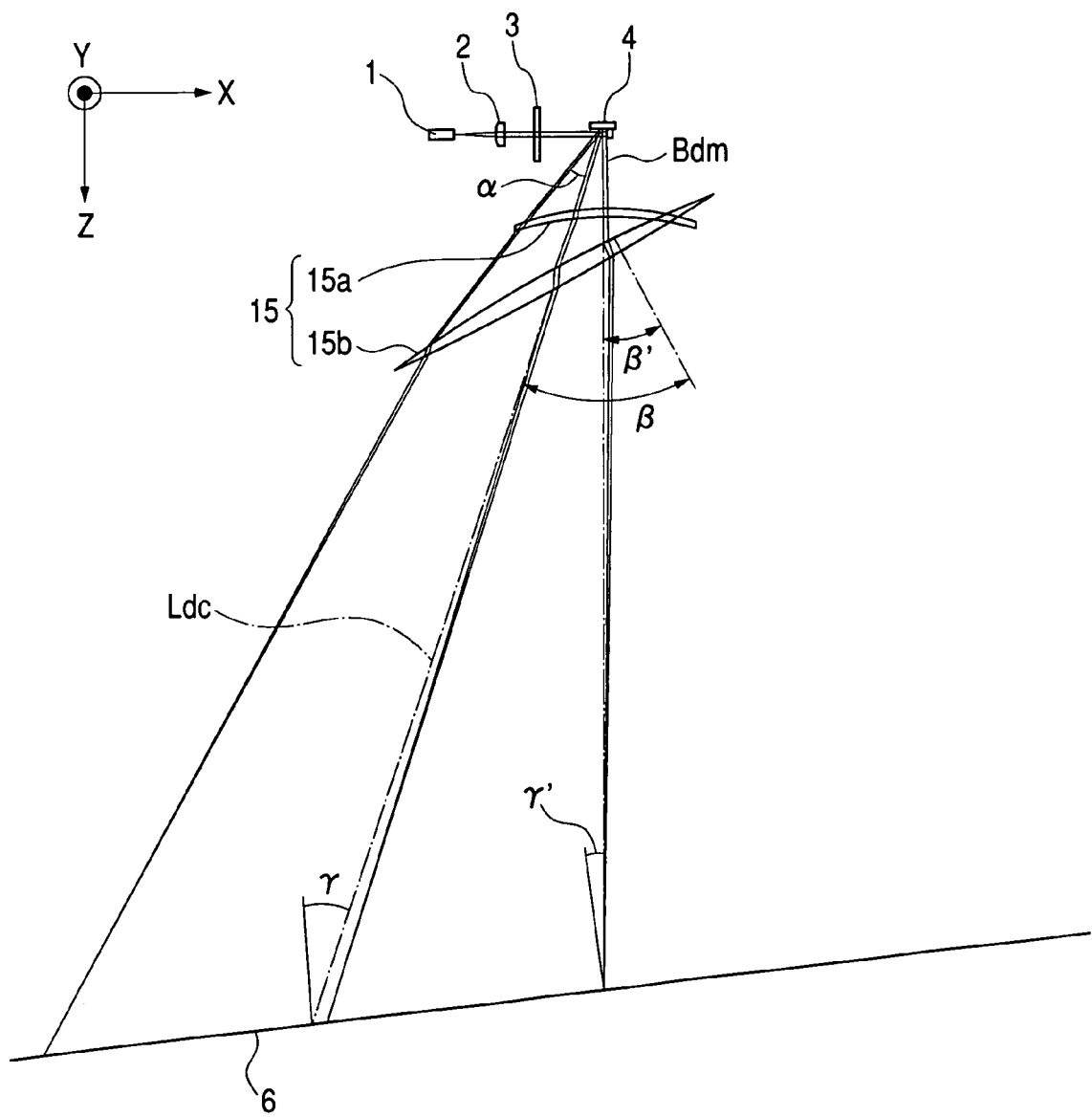
FIG. 17 is a perpendicular cross-sectional view illustrating a two-dimensional scanning apparatus of a second embodiment according to the present invention.

FIG. 17 illustrates a perpendicular cross section of a two-dimensional scanning apparatus of a second embodiment according to the present invention. FIGS. 18A to 18C show a numerical example (lens data) of this two-dimensional scanning apparatus. The second embodiment will be described with reference to those figures. In the second embodiment, constituent elements common to the first embodiment are designated by the same reference numerals as those of the first embodiment. Description of those elements is omitted.

The second embodiment is different from the first embodiment in that a light beam incident on the deflecting unit 4 is made a parallel beam, and that a scanning optical system 15 has a different construction.

Similar to the first embodiment, the scanning optical system 15 in the second embodiment is disposed decentering from the deflection scanning axis Ldc in the horizontal direction, and is arranged such that a central light ray of the deflected light beam Bdm forming the maximum angle of view α in the horizontal direction can travel along the optical axis of the scanning optical system 15.

The scanning optical system 15 is comprised of two scanning lenses (a first scanning lens 15a, and a second scanning lens 15b). The first scanning lens 15a disposed on the side of the deflecting unit 4 is neither tilted nor shifted, and is arranged such that surface vertexes of its incident surface and its light emergence surface can be located on the optical axis of the scanning optical system 15 (i.e., the optical axis of the first scanning lens 15a can be located on the optical axis of the scanning optical system 15).

On the other hand, the second scanning lens 15b disposed on the side of the scanned surface 6 is tilted such that a normal at the surface vertex of its incident surface can form an angle β' of 25.0 degrees in a counterclockwise direction of FIG. 17 relative to the deflected light beam Bdm forming the maximum angle of view α in the horizontal direction, and is tilted such that the above normal to the incident surface can form an angle β of 45.3 degrees relative to the deflection scanning axis Ldc. Also in the second embodiment, the second scanning lens 15b is tilted relative to the deflection scanning axis Ldc at an angle β larger than the maximum angle of view α of 20.3 degrees.

Further, the second scanning lens 15b is shifted relative to the deflected light beam Bdm forming the maximum angle of view α in a direction away from the deflection scanning axis Ldc, namely, is shifted such that the surface vertex of its incident surface is 20.0 mm away relative to the deflected light beam Bdm toward the side on which the normal at the surface vertex on the incident surface of the second scanning lens 15b extends tilting relative to the deflection scanning axis Ldc when this normal to its incident surface is extended toward the light emergence side, i.e., toward a right side in FIG. 17.

Therefore, the second scanning lens 15b is arranged such that surface vertexes on the incident surface and the light emergence surface thereof can be disposed outside the deflection range (the two-dimensional deflection range) of the deflected light beam. Hence, the second scanning lens 15b is used only at its portions of the incident surface and the light emergence surface on one side of their surface vertexes.

Further, the scanned surface 6 is also tilted at an angle of γ' of 6.8 degrees relative to the deflected light beam Bdm forming the maximum angle of view α in a counterclockwise direction of FIG. 17 in the perpendicular cross section. Relative to the deflection scanning axis Ldc, the scanned surface 6 is hence tilted at an angle of γ of 27.1 degrees, which is larger than the maximum angle of view α, in the same direction as the second scanning lens 15b.

In the thus-constructed scanning optical system 15, the first scanning lens 15a is a spherical lens. Further, the second scanning lens 15b is an anamorphic lens whose incident surface and light emergence surface are comprised of anamorphic surfaces, respectively. Each anamorphic surface is a rotational asymmetrical aspherical surface which has aspherical amounts different in the horizontal and vertical cross sections.

Further, the light emergence surface of the second scanning lens 15b is tilted relative to the normal at the surface vertex of its incident surface such that an angle between the normal at the surface vertex of its light emergence surface and the deflection scanning axis Ldc can be 8.1 degrees larger than an angle between the normal at the surface vertex of its incident surface and the deflection scanning axis Ldc. Further, the surface vertex on the light emergence surface of the second scanning lens 15b is 49.4 mm shifted relative to the surface vertex of its incident surface in a direction away from the deflection scanning axis Ldc.

Figures 19, 20:
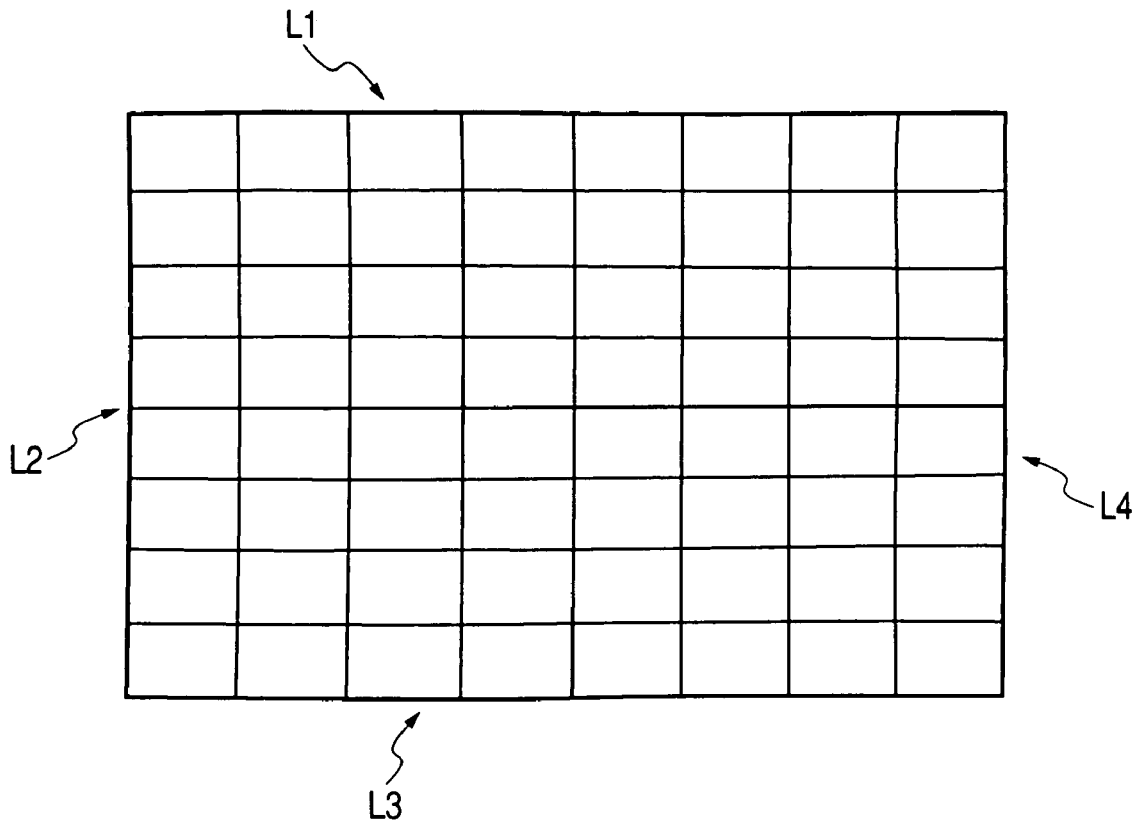
FIG. 19 is a view illustrating a displayed image (grating) in the second embodiment.
FIG. 20 is a table showing amounts of TV distortion and trapezoid distortion in the second embodiment.

FIG. 19 illustrates an image (grating) scanned and displayed by the two-dimensional scanning apparatus of the second embodiment. FIG. 20 shows amounts of the TV distortion and the trapezoid distortion in the displayed image.

With respect to the TV distortion of the image illustrated in FIG. 19, the upper side L1 of the image frame is 0.16%, the lower side L2 is 0.16%, the left side L3 is 0.19%, and the right side L4 is 0.11%. The TV distortion is thus preferably corrected. Further, with respect to the trapezoid distortion, both the upper side L1 and the lower side L2 of the image frame are 0.11%, and both the left side L3 and the right side L4 are 0.0%. Thus, the trapezoid distortion is also preferably corrected.

As discussed above, the second scanning lens 15b is tilted at an angle larger than the maximum angle of view α relative to the deflection scanning axis Ldc, and at the same time the tilt amount and the shift amount of the incident surface of the second scanning lens 15b are made different from those of its light emergence surface, respectively. Thereby, correction of the TV distortion can be more effectively made.

The present invention aims at providing a two-dimensional scanning apparatus capable of displaying a high-quality image at all times. The TV distortion relates to the amount of aberration showing the linearity of the frame of the displayed image. The linearity at a location inside the frame of the displayed image needs to be preferably corrected to display a high-quality image. However, the linearity generally varies depending on location and direction of the image, so that the linearity within the frame cannot be always corrected completely even if the scanning optical system is tilted and shifted.

In the second embodiment, therefore, the incident surface and the light emergence surface of the second scanning lens 15b are comprised of rotational asymmetrical aspherical surfaces, respectively. When the lens surface is made aspherical, the linearity at each location within the image can be achieved. Further, when the lens surface is made rotational asymmetrical and aspherical, the linearity in each direction within the image can be achieved. Thus, when the tilted second scanning lens 15b is constructed as a rotational asymmetrical lens, it is possible to correct linearities at each location and in each direction in the image that cannot be completely corrected by the tilt of the second scanning lens 15b. Further, the TV distortion can also be effectively corrected.

Further, the second scanning lens 15b is constructed as an anamorphic lens whose incident and light emergence surfaces are anamorphic surfaces with optical powers different in the horizontal and vertical directions, respectively. It is accordingly possible to correct astigmatism that is likely to occur when the second scanning lens 15b is tilted.

In the second embodiment, aspherical coefficients up to $(m+n) \leq 4$ are used in connection with the rotational asymmetrical aspherical surface of the tilted or shifted second scanning lens 15b, but the construction is not limited thereto. When aspherical coefficients in higher orders of $(m+n) \geq 6$ are used, the TV distortion and the trapezoid distortion can be more effectively corrected.

Furthermore, a compact two-dimensional scanning apparatus can be achieved when portions of the tilted and shifted lenses other than their use portions are cut away as in the second embodiment.

Third Embodiment

Figure 21:
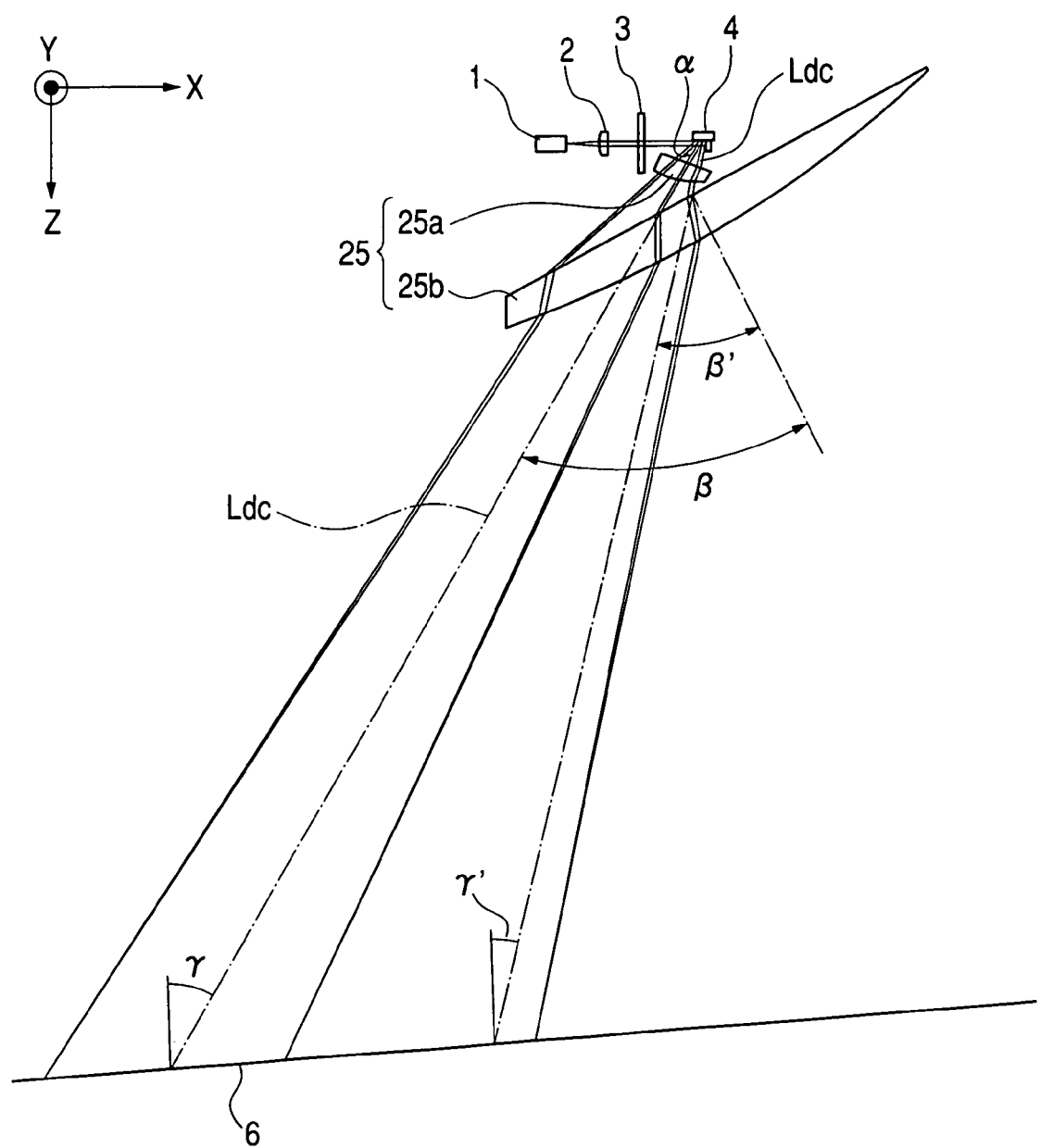
FIG. 21 is a perpendicular cross-sectional view illustrating a two-dimensional scanning apparatus of a third embodiment according to the present invention.

FIG. 21 illustrates a perpendicular cross section of a two-dimensional scanning apparatus of a third embodiment according to the present invention. FIGS. 22A to 22C show a numerical example (lens data) of this two-dimensional scanning apparatus. The third embodiment will be described with reference to those figures. In the third embodiment, constituent, elements common to the other embodiments are designated by the same reference numerals as those of these embodiments. Description of those elements is omitted.

The third embodiment is different from the second embodiment in that two optical elements 25a and 25b constituting a scanning optical system 25 are shifted relative to the deflected light beam Bdm forming the maximum angle of view α in a direction away from the deflection scanning axis Ldc, and all surface vertexes of those optical elements are disposed outside the two-dimensional deflection range in which the deflected light beam is deflected. Further, shift amounts of respective optical surfaces of those optical elements are different from each other in the third embodiment.

Similar to the second embodiment, the scanning optical system 25 in the third embodiment is comprised of two glass lenses 25a and 25b which are first and second scanning lenses 25a and 25b disposed in this order from the side of the deflecting unit 4, respectively.

The first scanning lens 25a is a meniscus lens having a concave surface facing the side of the deflecting unit 4. Its incident and light emergence surfaces both are spherical. In the third embodiment, the surface vertex on the incident surface of the first scanning lens 25a is shifted 32.1 mm from the deflected light beam Bdm forming the maximum angle of view α in a direction away from the deflection scanning axis Ldc. Further, the surface vertex on the light emergence surface of the first scanning lens 25a is shifted 26.0 mm relative to its surface vertex on the incident surface in a direction approaching the deflected light beam Bdm forming the maximum angle of view α.

The second scanning lens 25b is a meniscus lens having a concave surface facing the side of the deflecting unit 4. Its incident and light emergence surfaces are comprised of rotational asymmetrical aspherical surfaces having no rotational symmetrical axis, respectively. The second scanning lens 25b is tilted such that a normal at the surface vertex on its incident surface can form an angle of β' of 30 degrees relative to the deflected light beam Bdm forming the maximum angle of view α and can form an angle of β of 50.3 degrees relative to the deflection scanning axis Ldc. Also in the third embodiment, similar to the first and second embodiments, the maximum angle of view α in the horizontal direction is 20.3 degrees, and the amount of tilt (β) of the second scanning lens 25b relative to the deflection scanning axis Ldc is larger than the maximum angle of view α.

Further, the second scanning lens 25b is shifted relative to the deflected light beam Bdm forming the maximum angle of view α in a direction away from the deflection scanning axis Ldc (a right side in FIG. 21), namely, is shifted such that the surface vertex of its incident surface can be 13.4 mm away from the deflected light beam Bdm toward the side on which the normal at the surface vertex on the incident surface of the second scanning lens 25b extends tilting relative to the deflection scanning axis Ldc when this normal to its incident surface is extended toward the light emergence side. Further, the surface vertex on the light emergence surface of the second scanning lens 25b is shifted 135.7 mm relative to the surface vertex on its incident surface in a direction away from the deflection scanning axis Ldc.

Therefore, all the surface vertexes on the optical surfaces (the incident surfaces and the light emergence surfaces) of the optical elements (the scanning lenses 25a and 25b) in the scanning optical system 25 are disposed outside the two-dimensional deflection range of the deflected light beam. Hence, only portions of all the optical elements on one side of their optical axes are used. In the thus-constructed construction, the TV distortion can be more preferably corrected.

Here, normals to incident and light emergence surfaces of the second scanning lens 25b in all light passing regions of the deflected light beam (portions to be used for guiding the deflected light beam) are tilted relative to the deflection scanning axis Ldc at angles larger than the maximum angle of view α. Thereby, the TV distortion can be more effectively corrected.

Further, the scanned surface 6 is also tilted at an angle of γ' of 5.0 degrees relative to the deflected light beam Bdm forming the maximum angle of view α in a counterclockwise direction in FIG. 21 in the perpendicular cross section. In other words, the scanned surface 6 is tilted relative to the deflection scanning axis Ldc at an angle of γ of 25.3 degrees larger than the maximum angle of view α in the same direction as the second scanning lens 25b.

Figures 23, 24:
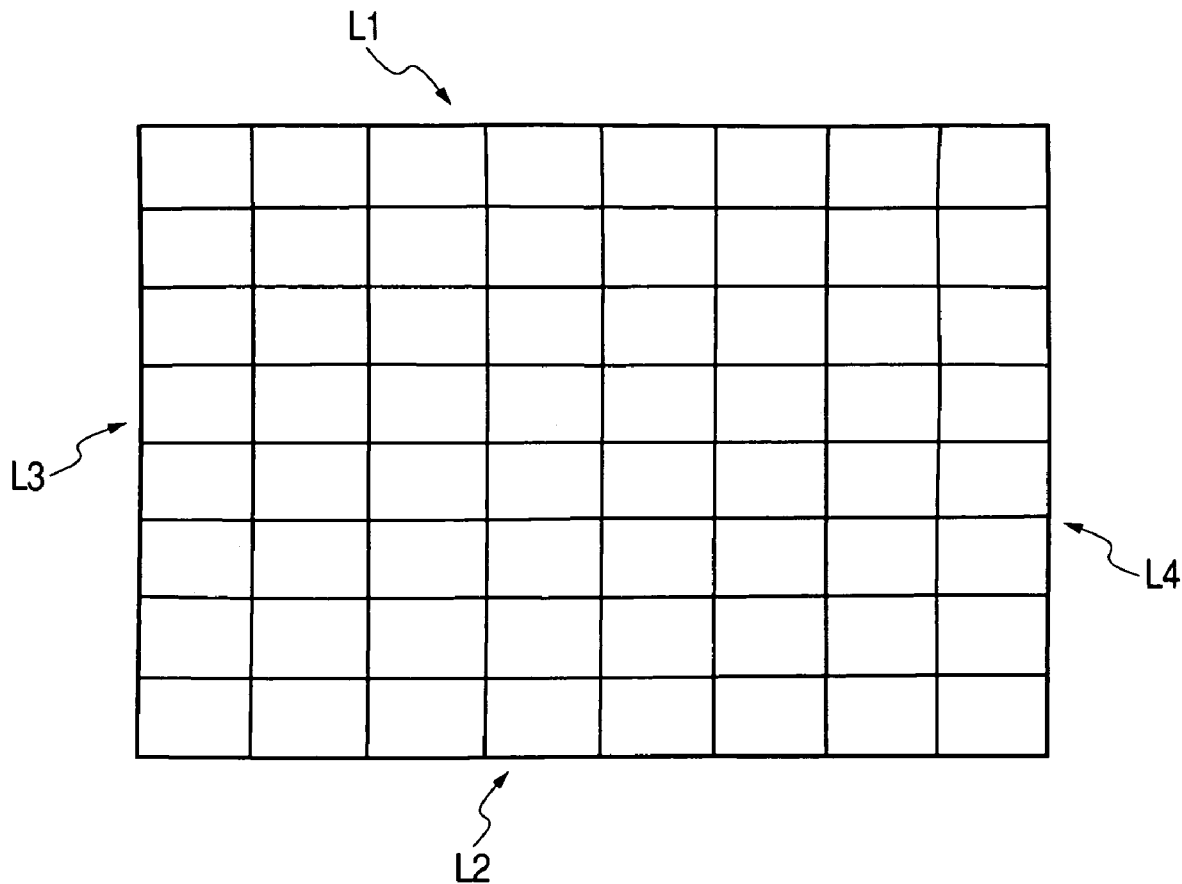
FIG. 23 is a view illustrating a displayed image (grating) in the third embodiment.
FIG. 24 is a table showing amounts of TV distortion and trapezoid distortion in the third embodiment.

FIG. 23 illustrates an image (grating) scanned and displayed by the two-dimensional scanning apparatus of the third embodiment. FIG. 24 shows amounts of the TV distortion and the trapezoid distortion in the displayed image.

With respect to the TV distortion, the upper side L1 of the image frame is 0.04%, the lower side L2 is 0.04%, the left side L3 is 0.06%, and the right side L4 is 0.11%. The TV distortion is thus very preferably corrected. Further, with respect to the trapezoid distortion, both the upper side L1 and the lower side L2 of the image frame are 0.01%, and both the left side L3 and the right side L4 are 0.00%. Thus, the trapezoid distortion is nearly eliminated.

As discussed above, surface vertexes of at least two optical elements in the scanning optical system are disposed outside the two-dimensional deflection range of the deflected light beam, thereby increasing effects of correcting the TV distortion and the trapezoid distortion. Accordingly, it is possible to provide a two-dimensional scanning apparatus capable of displaying a two-dimensional image with a remarkably high quality.

The first scanning lens 25a is comprised of a spherical lens in the third embodiment, but it can be an anamorphic lens, or a rotational asymmetrical aspherical lens. In this case, effect of correcting the TV distortion can be further increased. Further, when a plurality of light sources for emitting light at different wavelengths (different colour light) are used as the light source 1, it is possible to achieve achromatic characteristics by using a lens provided with diffraction gratings.

Fourth Embodiment

Figure 25:
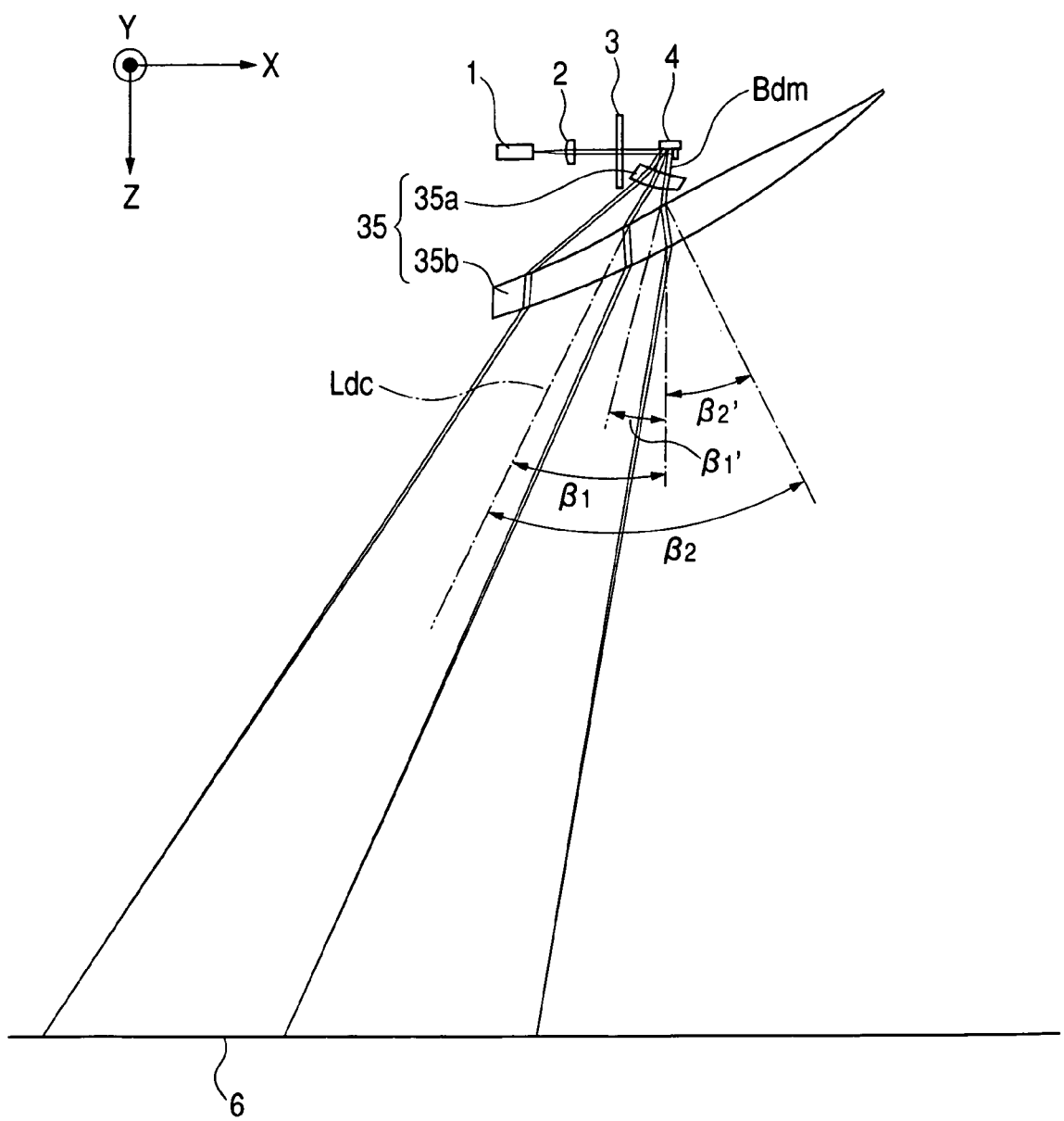
FIG. 25 is a perpendicular cross-sectional view illustrating a two-dimensional scanning apparatus of a fourth embodiment according to the present invention.

FIG. 25 illustrates a perpendicular cross section of a two-dimensional scanning apparatus of a fourth embodiment according to the present invention. FIGS. 26A to 26E show a numerical example (lens data) of this two-dimensional scanning apparatus. The fourth embodiment will be described with reference to those figures. In the fourth embodiment, constituent elements common to the other embodiments are designated by the same reference numerals as those of these embodiments. Description of those elements is omitted.

The fourth embodiment is different from the third embodiment in that two optical elements 35a and 35b constituting a scanning optical system 35 are tilted at angles larger than the maximum angle of view α relative to the deflection scanning axis Ldc, respectively. Further, tilt amounts of respective lens surfaces of those optical elements are different from each other in the fourth embodiment.

Similar to the second embodiment, the scanning optical system 35 in the fourth embodiment is comprised of two glass lenses 35a and 35b which are first and second scanning lenses 35a and 35b disposed in this order from the side of the deflecting unit 4, respectively.

The first scanning lens 35a is a meniscus lens having a concave surface facing the side of the deflecting unit 4. Its incident and light emergence surfaces both are comprised of rotational asymmetrical aspherical surfaces having no rotational symmetrical axis, respectively. In the fourth embodiment, the first scanning lens 35a is shifted such that the surface vertex on its incident surface can be 27.2 mm away from the deflected light beam Bdm forming the maximum angle of view α in a direction away from the deflection scanning axis Ldc (toward the side on which the normal at the surface vertex on its incident surface extends tilting relative to the deflection scanning axis Ldc when this normal to the incident surface is extended toward the light emergence side). Further, the surface vertex on the light emergence surface of the first scanning lens 35a is shifted 34.2 mm relative to the surface vertex on its incident surface in a direction approaching the deflected light beam Bdm forming the maximum angle of view α.

Further, the first scanning lens 35a is tilted such that the normal at the surface vertex on its incident surface can form an angle of β1' of 7.5 degrees relative to the deflected light beam Bdm forming the maximum angle of view α, and can form an angle of β1 of 27.8 degrees relative to the deflection scanning axis Ldc. Further, the light emergence surface of the first scanning lens 35a is tilted such that the normal thereto can form an angle of −9.3 degrees relative to the normal to the incident surface of the first scanning lens 35a.

The second scanning lens 35b is a meniscus lens having a concave surface facing the side of the deflecting unit 4. Its incident and light emergence surfaces are comprised of rotational asymmetrical aspherical surfaces having no rotational symmetrical axis, respectively. The second scanning lens 35b is tilted such that the normal at the surface vertex on its incident surface can form an angle of β2' of 28.2 degrees relative to the deflected light beam Bdm forming the maximum angle of view α, and can form an angle of β2 of 48.5 degrees relative to the deflection scanning axis Ldc. Also in the fourth embodiment, similar to the first to third embodiments, the maximum angle of view α in the horizontal direction is 20.3 degrees, and the amounts of tilt (β1 and β2) of the first and second scanning lenses 35a and 35b relative to the deflection scanning axis Ldc are larger than the maximum angle of view α.

Further, the second scanning lens 35b is shifted such that the surface vertex of its incident surface can be 11.3 mm away from the deflected light beam Bdm forming the maximum angle of view α in a direction away from the deflection scanning axis Ldc (toward the side on which the normal at the surface vertex on the incident surface of the second scanning lens 35b extends tilting relative to the deflection scanning axis Ldc when this normal to the incident surface is extended toward the light emergence side). Further, the surface vertex on the light emergence surface of the second scanning lens 35b is shifted by 108.4 mm relative to the surface vertex on its incident surface in a direction away from the deflection scanning axis Ldc.

Thus, the two optical elements 35a and 35b in the scanning optical system 35 are tilted relative to the deflection scanning axis Ldc at angles larger than the maximum angle of view α, respectively. Further, the shift amounts and the tilt amounts of the optical surfaces of the respective optical elements are made different from each other, respectively. Particularly, with respect to the light emergence surface of the second scanning lens 35b tilted relative to the deflection scanning axis Ldc at an angle larger than the maximum angle of view α, its tilt amount is made larger than the tilt amount of its incident surface, and its shift amount is also made larger than the shift amount of its incident surface.

Each of those structures has the effect of preferably correcting the TV distortion, and the TV distortion can be outstandingly preferably corrected by combining these structures into a united construction.

Figures 27, 28:
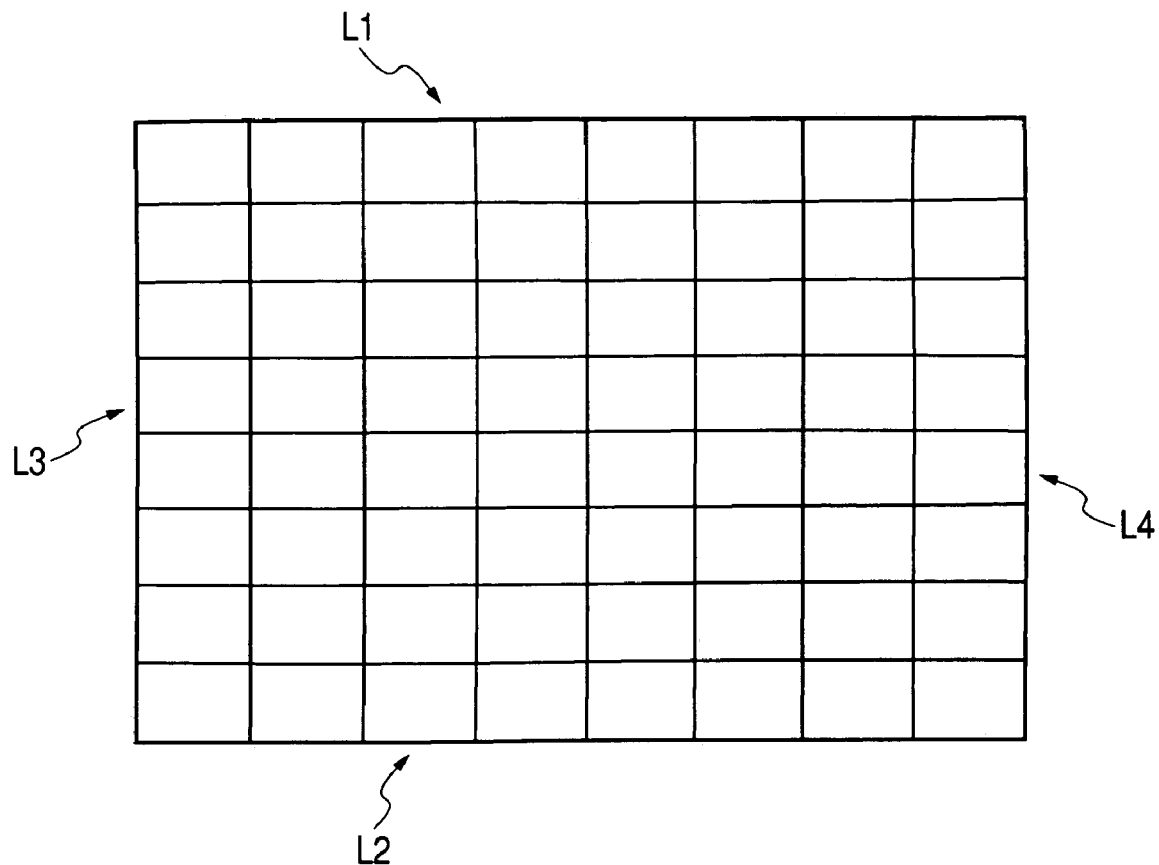
FIG. 27 is a view illustrating a displayed image (grating) in the fourth embodiment.
FIG. 28 is a table showing amounts of TV distortion and trapezoid distortion in the fourth embodiment.

FIG. 27 illustrates an image (grating) scanned and displayed by the two-dimensional scanning apparatus of the fourth embodiment. FIG. 28 shows amounts of the TV distortion and the trapezoid distortion in the displayed image.

With respect to the TV distortion, the upper side L1 of the image frame is 0.06%, the lower side L2 is 0.06%, the left side L3 is 0.07%, and the right side L4 is 0.06%. The TV distortion is thus very preferably corrected. Further, with respect to the trapezoid distortion, both the upper side L1 and the lower side L2 of the image frame are 0.01%, and both the left side L3 and the right side L4 are 0.00%. Thus, the trapezoid distortion is nearly eliminated.

As discussed above, at least two optical elements in the scanning optical system are tilted relative to the deflection scanning axis at angles larger than the maximum angle of view, thereby increasing effects of correcting the TV distortion and the trapezoid distortion. Further, the shift amounts and the tilt amounts of the optical surfaces of the respective optical elements are made different from each other, respectively, thereby further increasing effects of correcting the TV distortion and the trapezoid distortion. Accordingly, it is possible to provide a two-dimensional scanning apparatus capable of displaying a two-dimensional image with a remarkably high quality.

In the fourth embodiment, two optical elements are tilted and shifted, but more than two (for example, three) optical elements can be tilted and shifted with the same advantageous effects.

Fifth Embodiment

Figure 29:
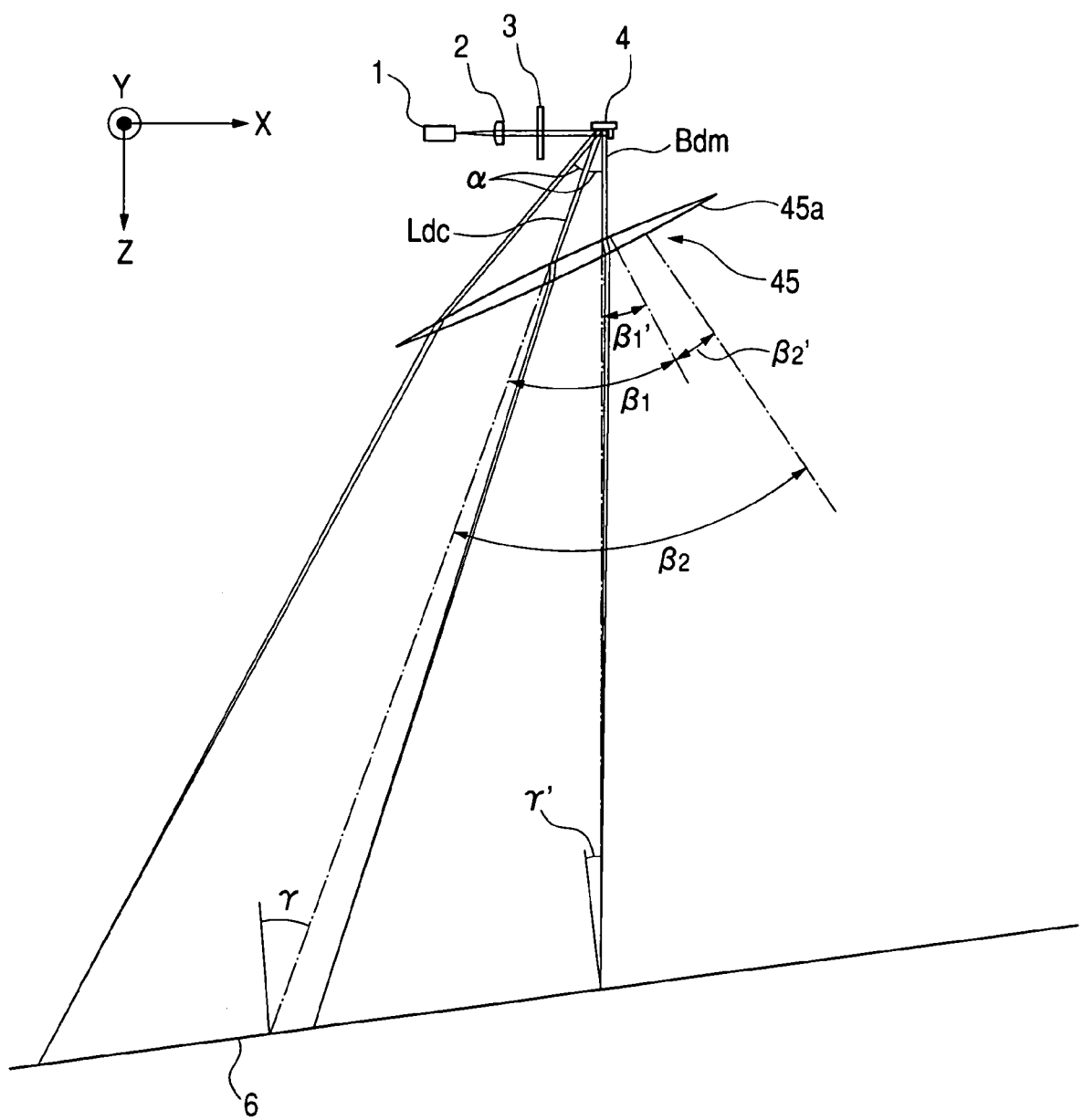
FIG. 29 is a perpendicular cross-sectional view illustrating a two-dimensional scanning apparatus of a fifth embodiment according to the present invention.

FIG. 29 illustrates a perpendicular cross section of a two-dimensional scanning apparatus of a fifth embodiment according to the present invention. FIGS. 30A to 30C show a numerical example (lens data) of this two-dimensional scanning apparatus. The fifth embodiment will be described with reference to those figures. In the fifth embodiment, constituent elements common to the other embodiments are designated by the same reference numerals as those of these embodiments. Description of those elements is omitted.

The fifth embodiment is different from the other embodiments in that a single optical element 45a constitutes a scanning optical system 45.

The scanning optical system 45 in the fifth embodiment is comprised of the scanning lens 45a formed by glass molding. The scanning lens 45a is arranged decentering relative to the deflection scanning axis Ldc. The scanning lens 45a is tilted such that a normal at the surface vertex on its incident surface can form an angle of β1' of 25.0 degrees relative to the deflected light beam Bdm forming the maximum angle of view α in a counterclockwise direction in FIG. 29, and can form an angle of β1 of 45.3 degrees relative to the deflection scanning axis Ldc in the counterclockwise direction.

Further, the light emergence surface of the scanning lens 45a is tilted such that a normal at its surface vertex can form an angle of β2' of 11.0 degrees relative to the normal to its incident surface in the counterclockwise direction, and can form an angle of β2 of 56.3 degrees relative to the deflection scanning axis Ldc in the counterclockwise direction. Also in the fifth embodiment, similar to the first to fourth embodiments, the maximum angle of view α in the horizontal direction is ±20.3 degrees about the deflection scanning axis Ldc, and the tilt amount of the scanning lens 45a relative to the deflection scanning axis Ldc is larger than the maximum angle of view α. This is the same in both the incident surface and the light emergence surface of the scanning lens 45a.

Further, the scanning lens 45a is shifted such that the surface vertex on its incident surface can be 12.9 mm away from the deflected light beam Bdm forming the maximum angle of view α in a direction away from the deflection scanning axis Ldc, namely, toward the side on which the normal to its incident surface extends tilting relative to the deflection scanning axis Ldc when this normal is extended toward the light emergence side. Further, the surface vertex on the light emergence surface of the scanning lens 45a is shifted by 55.4 mm relative to the surface vertex on its incident surface in a direction away from the deflection scanning axis Ldc. Hence, the surface vertexes on the incident and light emergence surfaces (all optical surfaces) of the scanning lens 45a are disposed outside the two-dimensional deflection range of the deflected light.

Further, the scanned surface 6 is also tilted at an angle of γ' of 8.4 degrees relative to the deflected light beam Bdm forming the maximum angle of view α in the counterclockwise direction in FIG. 29. Relative to the deflection scanning axis Ldc, the scanned surface 6 is tilted at an angle of γ of 28.7 degrees, which is larger than the maximum angle of view α, in the same direction as the scanning lens 45a.

In the thus-constructed fifth embodiment, the scanning optical system 45 is comprised of a single scanning lens 45a, so that the number of components and its cost can be reduced and the apparatus can be readily fabricated.

Further, the scanning lens 45a in the fifth embodiment is an anamorphic lens whose incident surface and light emergence surface are comprised of anamorphic surfaces, respectively. Each anamorphic surface is a rotational asymmetrical aspherical surface which has aspherical amounts different in the horizontal and vertical cross sections.

Figures 31, 32:
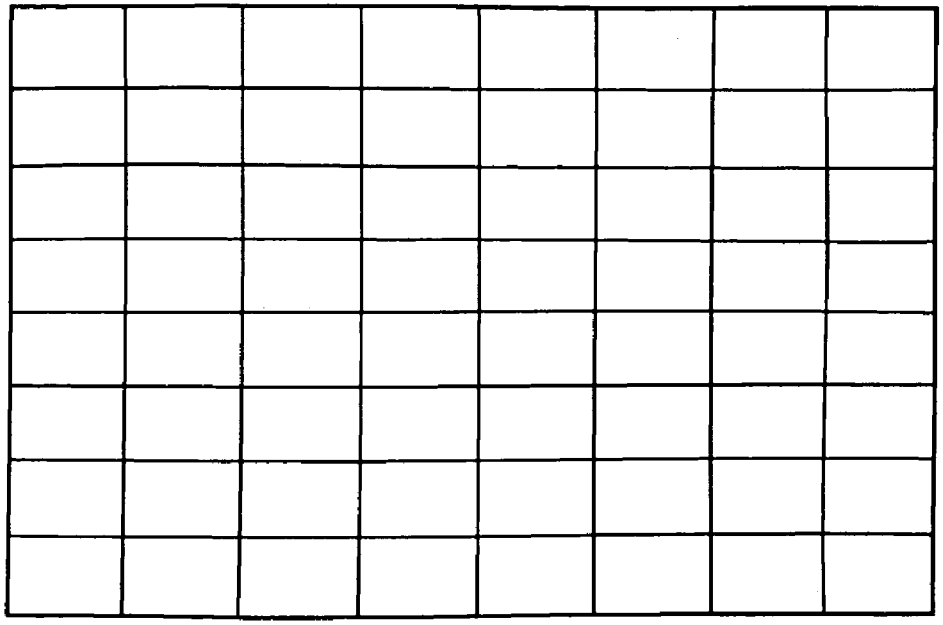
FIG. 31 is a view illustrating a displayed image (grating) in the fifth embodiment.
FIG. 32 is a table showing amounts of TV distortion and trapezoid distortion in the fifth embodiment.

FIG. 31 illustrates an image (grating) scanned and displayed by the two-dimensional scanning apparatus of the fifth embodiment. FIG. 32 shows amounts of the TV distortion and the trapezoid distortion in the displayed image.

With respect to the TV distortion, the upper side L1 of the image frame is 0.17%, the lower side L2 is 0.17%, the left side L3 is 0.13%, and the right side L4 is 0.20%. The TV distortion is thus sufficiently corrected. Further, with respect to the trapezoid distortion, both the upper side L1 and the lower side L2 of the image frame are 0.10%, and both the left side L3 and the right side L4 are 0.00%. Thus, the trapezoid distortion is preferably corrected.

Thus, even in the event that the scanning optical system 45 is comprised of a single optical element 45a, the optical element is tilted at an angle larger than the maximum angle of view α relative to the deflection scanning axis Ldc, and is shifted toward the side on which the normal at the surface vertex on its incident surface extends tilting relative to the deflection scanning axis Ldc when this normal is extended toward the light emergence side, and further the scanned surface is tilted relative to the deflection scanning axis Ldc in the same direction as the optical element, so that the TV distortion can be preferably corrected.

Further, the rotational asymmetrical aspherical surface is used in the tilted optical element, the surface vertexes of the optical element are disposed outside the two-dimensional deflection range of the deflected light beam, and the tilt amounts and the shift amounts of the optical surfaces of the respective optical elements are made different from each other, respectively, so that the effects of correcting the TV distortion and the trapezoid distortion can be remarkably improved.

In the above embodiments, the glass lens is used as the optical element in the scanning optical system, but an optical element other than the glass lens, such as a plastic lend formed by injection molding, can be used. Thereby, its fabrication can be facilitated, and its cost and weight of a two-dimensional scanning apparatus can be reduced.

Furthermore, a two-dimensional colour image can be displayed by providing three colour light emitting portions of blue, green and red in the light source. In this case, achromatic characteristics can be achieved by using an optical element provided with diffraction gratings. A scanning image displaying apparatus capable of scanning and displaying a high-quality colour image can be achieved. In this case, it is only necessary to direct three colour light of blue, green and red to the deflecting unit sequentially (in a field sequential manner), or simultaneously, for example. Alternately, it is possible to combine a light source of white colour, and a rotatable turret provided with three colour filters of blue, green and red, and sequentially direct three colour light of blue, green and red to the deflecting unit.

When the two-dimensional colour image is formed by using the deflecting unit and the scanning optical system while three light of blue, green and red from the light source is directed to the deflecting unit, the deflecting unit and the scanning optical system are appropriately controlled. Description thereof is omitted.

Figure 33:
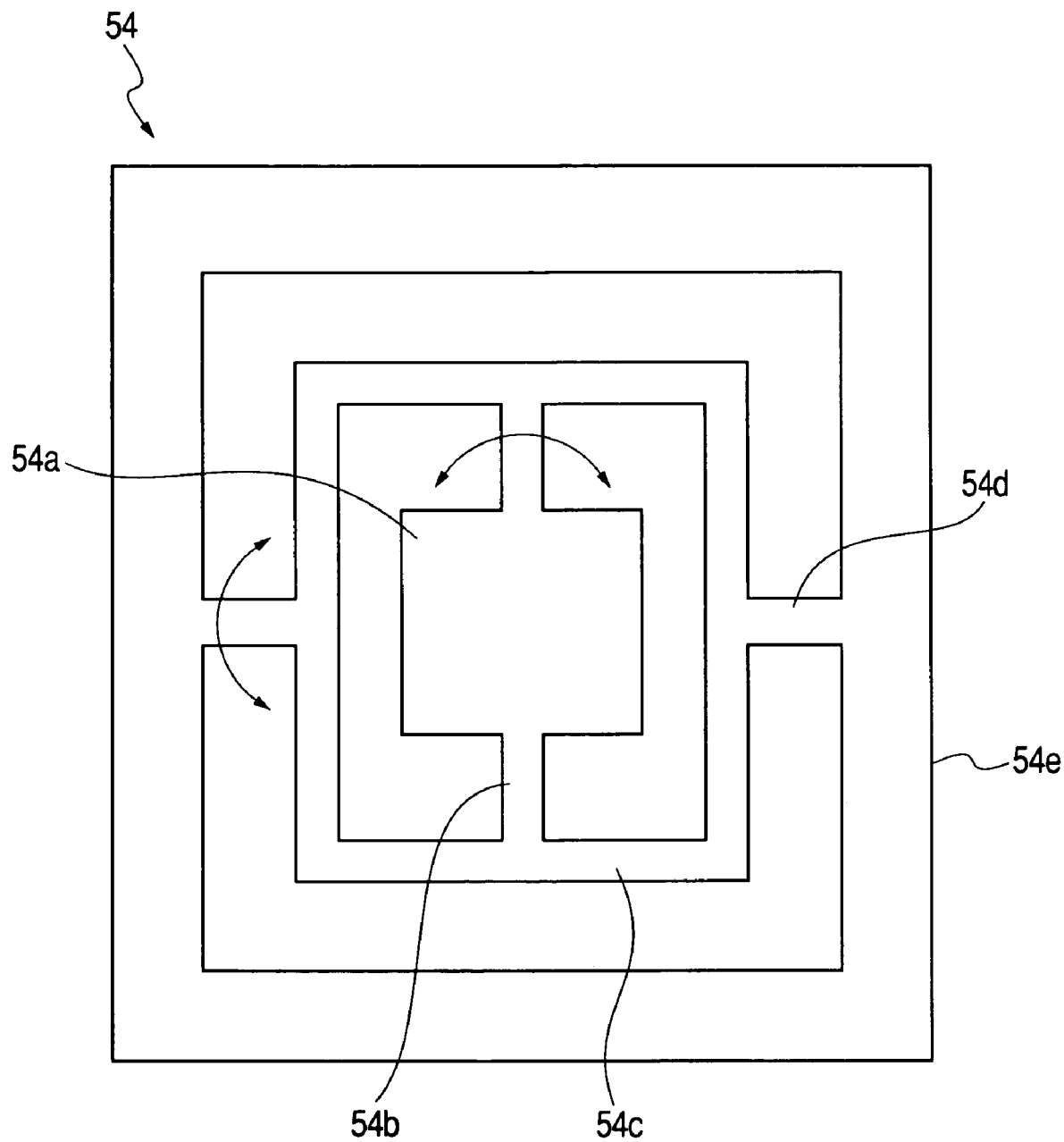
FIG. 33 is a plan view illustrating a main portion of a two-dimensional deflector to be used in a two-dimensional scanning apparatus.

Further, in the above-discussed embodiments, there are provided as the deflecting unit two deflectors which are MEMS devices, and are capable of one-dimensional resonant vibration. In place thereof, a single MEMS device as illustrated in FIG. 33 can be used. In the deflector using this MEMS device, a reflecting surface 54a is supported by a vibrating frame 54c through torsion bars 54b, and the vibrating frame 54c is supported by a frame body 54e through torsion bars 54d extending perpendicularly to the torsion bars 54b. The reflecting surface 54a can be resonantly vibrated in a two-dimensional fashion about the torsion bars 54a and 54b (deflecting axes).

Further, in place the deflector using the MEMS device, a galvanomirror or a polygon mirror whose reflecting surface is rotatable can also be used.

Further, techniques for electrically correcting the TV distortion exist as proposed in the above-noted Japanese Patent Application Laid-Open No. H8(1996)-146320, and distortions of the image can also be corrected by a combination of such electrical correction and the optical correction performed by the scanning optical system of the present invention.

When the TV distortion is electrically corrected, the tilt angle of the reflecting surface during the two-dimensional scanning is controlled by a driving circuit (not shown) for controlling the deflecting unit such that residual distortion after the optical correction can be corrected.

Sixth Embodiment

Figure 34A:
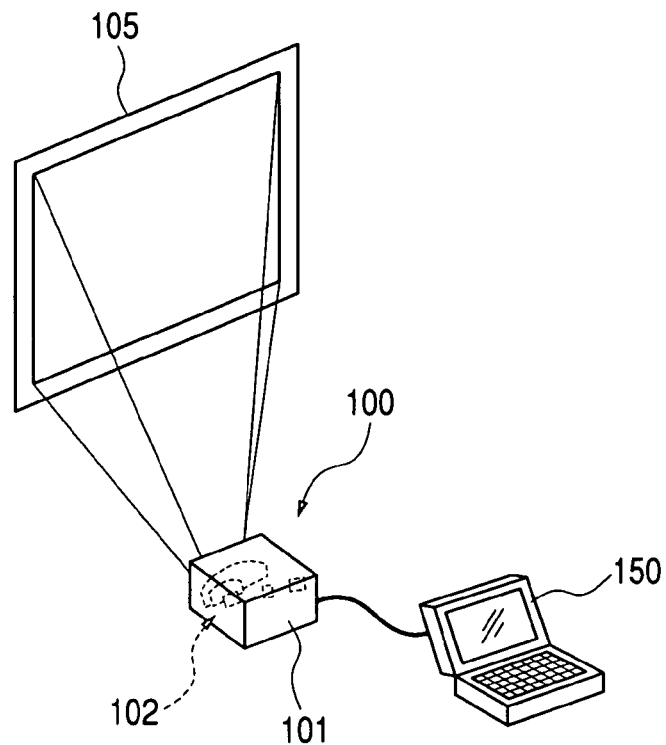
FIGS. 34A and 34B are perspective schematic views illustrating projectors provided with the two-dimensional scanning apparatus of each embodiment of the present invention, respectively.
Figure 34B:
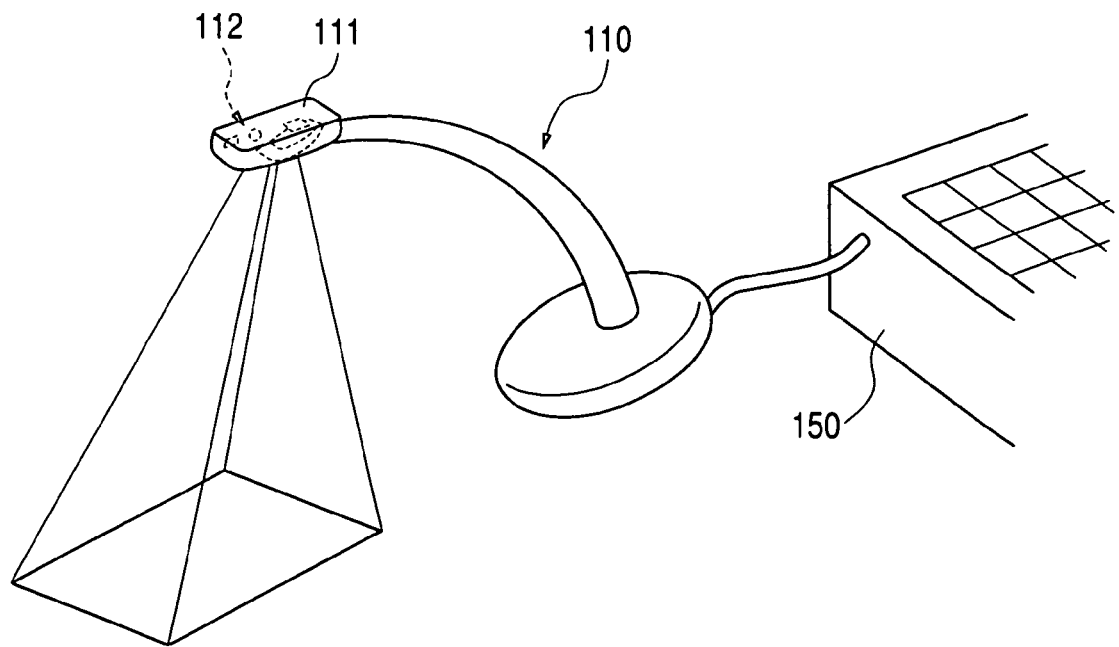

FIGS. 34A and 34B illustrate an image displaying apparatuses of a scanning type provided with a two-dimensional scanning apparatus of a sixth embodiment according to the present invention. FIG. 34A shows a projector 100 for displaying an image on a screen 105 placed on a wall or the like, and a two-dimensional scanning apparatus 102 of this embodiment is provided in a housing 101.

FIG. 34B shows a projector 110 of a stand type for displaying an image on a desk in place of a display of a personal computer or the like, and a two-dimensional scanning apparatus 112 of this embodiment is provided in a portion 111 supported above the desk top.

An image data supplying apparatus 150, such as a personal computer, a video player, and a DVD player, is connected to each of the projectors 100 and 110, and an image displaying system is thus constructed. There is provided in each projector 100 or 110 a driving circuit for modulating monochromatic light or multicoloured light emitted from the light source 1 based on image data supplied from an image data supplying apparatus 150. The projector 100 or 110 accordingly can scan and display an image on the screen 105 or the desk 115 in conformity with the image data supplied from the image data supplying apparatus 150.

The above-discussed embodiments exemplify the image displaying apparatus (for example, the projector) in which an image on the screen or the like provided on the scanned surface is directly observed. The present invention, however, can also be applied to an image displaying apparatus (for example, a finder) in which an image formed on the scanned surface is observed through a relay optical system or the like, for example.

Further, the present invention can also be applied to a structure in which a light beam from the light source enters a reflecting surface of the deflecting unit obliquely relative to the vibrating axis (the deflecting axis) of the reflecting surface.

Seventh Embodiment

Figure 35:
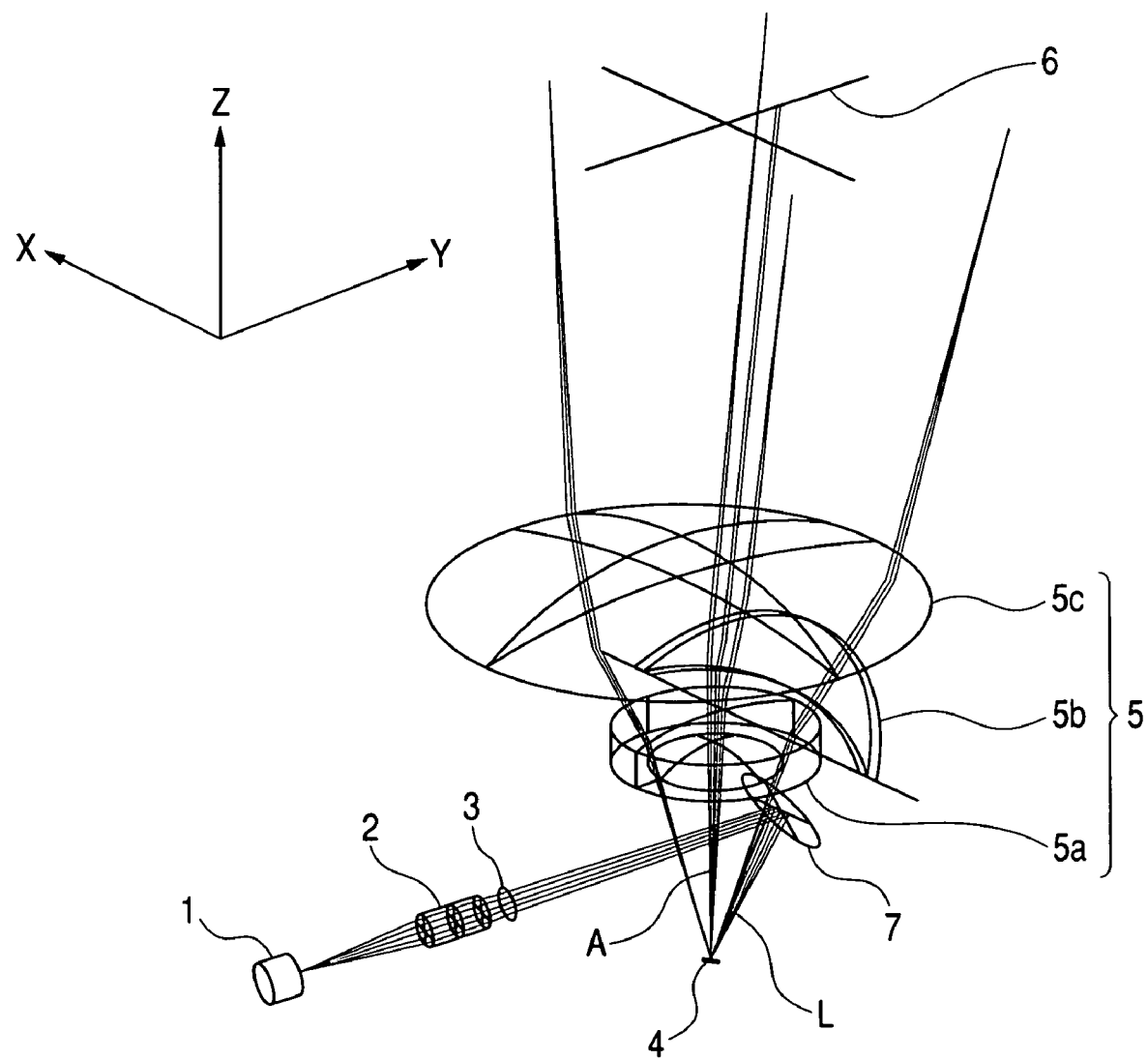
FIG. 35 is a perspective view illustrating a two-dimensional scanning apparatus of a seventh embodiment according to the present invention.

FIG. 35 is a perspective view illustrating a two-dimensional scanning apparatus of a seventh embodiment according to the present invention. In the seventh embodiment, the two-dimensional scanning apparatus is applied to an image displaying apparatus such as a projector.

In FIG. 35, reference numeral 1 designates a light source such as a laser diode, an LED, and a lamp. Radiation of the light source 1 is controlled by a driving control (not shown) which is operated according to image signals, for example. A divergent light beam emitted from the light source 1 is converted into a convergent light beam by a condensing lens system 2 constructed by cementing two condensing lenses 2a and 2b, and the width of the convergent light beam is restricted by an aperture stop 3.

Reference numeral 4 designates a deflecting unit. The deflecting unit 4 in this embodiment is comprised of a deflector (a deflecting unit) which can be resonantly vibrated in a two-dimensional manner, and has a reflecting surface capable of vibrating about two rotational axes extending perpendicularly to each other. The deflector 4 reflects and deflects the light beam emitted from the light source 1 and folded by a folding mirror 7 after traveling through the condensing lens system 2 and the aperture stop 3 to two-dimensionally deflect it in the horizontal direction and the vertical direction (the X-direction and the Y-direction). Tilt direction and tilt angle of the deflector 4 are controlled by a driving circuit (not shown) according to the image signal, for example.

Reference numeral 5 designates a scanning optical system having f-θ characteristics. The scanning optical system 5 includes three spherical lenses 5a, 5b and 5c. The light beam deflected by the deflecting unit 4 is imaged as a spot on the scanned surface 6 by the scanning optical system 5. Here, the deflected light is guided onto the scanned surface 6 through the scanning optical system 5. The imaged spot is scanned on the scanned surface 6 by the resonant motion of the deflector 4 in the horizontal and vertical directions. Accordingly, a two-dimensional image is formed on the scanned surface 6.

The two-dimensional deflector 4 in this embodiment is constructed as a conventional MEMS (Micro Electro-Mechanical Scanner) fabricated by using semiconductor producing techniques, for example, and hence its size and weight can be remarkably reduced.

Figure 36:
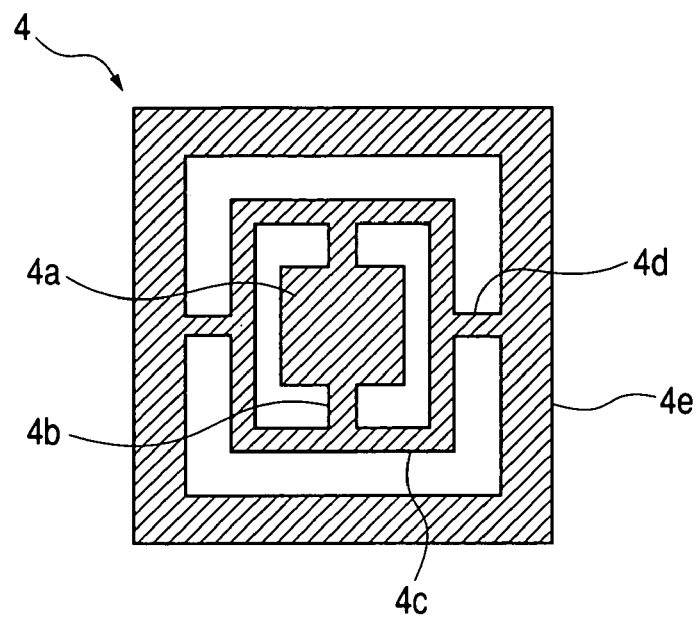
FIG. 36 is a plan view illustrating a main portion of a two-dimensional deflector (a two-dimensional deflecting unit)

FIG. 36 illustrates a main portion of the deflector 4, but the deflector is not limited thereto.

In FIG. 36, reference numeral 4a designates a reflecting surface. A light beam from the light source 1 is incident on the reflecting surface 4a, and is reflected and deflected thereby. The reflecting surface 4a is supported by a first frame 4c through first torsion bars 4b extending in the Y-direction, and the reflecting surface 4a can be vibrated in the horizontal direction (the X-direction) about the rotational central axis of the first torsion bars 4b. Further, the first frame 4c is supported by a second frame 4e through second torsion bars 4d extending in the X-direction, and the first frame 4c and the reflecting surface 4a supported thereby can be vibrated in the vertical direction (the Y-direction) about the rotational central axis of the second torsion bars 4d. Accordingly, the deflector 4 can be two-dimensionally vibrated in the horizontal and vertical directions as a two-dimensional deflecting unit.

Figure 37:
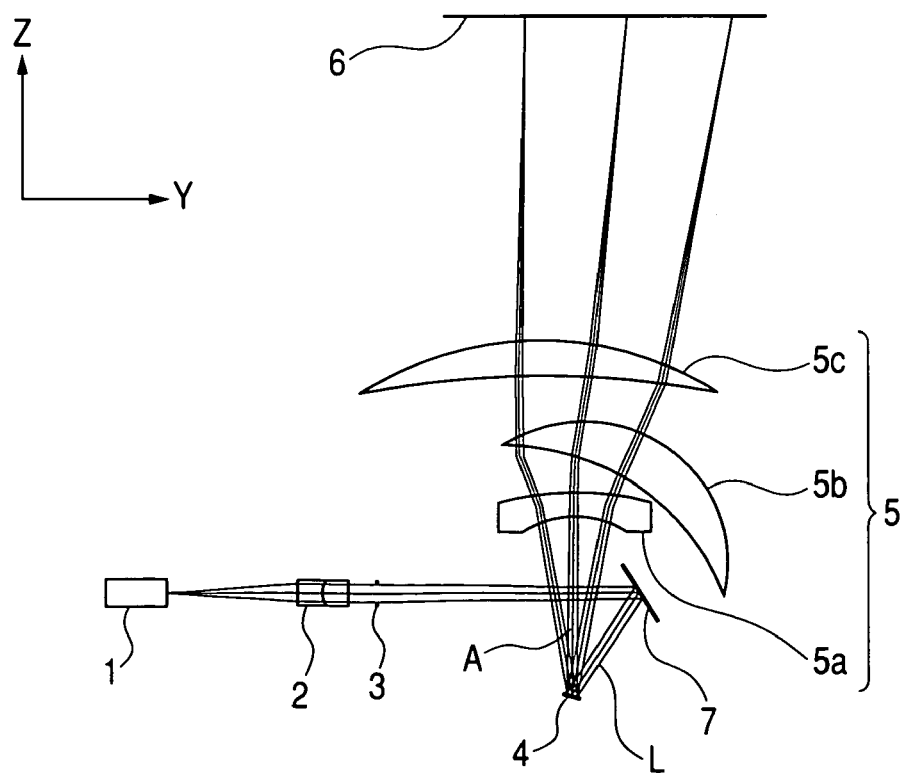
FIG. 37 is a perpendicular cross-sectional view illustrating the two-dimensional scanning apparatus of the seventh embodiment.

FIG. 37 is a perpendicular cross-sectional (the YZ cross section) view illustrating the two-dimensional scanning apparatus of the seventh embodiment. This perpendicular cross section corresponds to a plane of incidence in which the light beam obliquely enters the reflecting surface 4a of the deflector 4.

In the seventh embodiment, when the light beam from the light source 1 is incident on the deflector 4, the incident light beam is caused to enter the reflecting surface 4a of the deflector 4 at an angle of 15 degrees from a lower side in the perpendicular direction (a right side of the deflector 4 in FIG. 37). The deflector 4 is the two-dimensional light deflecting unit, and is arranged such that the first torsion bars 4b of the rotational central axis for vibrating the reflecting surface 4a of FIG. 36 in the horizontal direction can be parallel to the vertical direction, and the second torsion bars 4d of the rotational central axis for vibrating the reflecting surface 4a in the vertical direction can be parallel to the horizontal direction. Therefore, the light beam from the light source unit 1 is caused to enter obliquely relative to the first torsion bars 4b. When a light beam is caused to enter obliquely relative to the central axis of the deflecting unit 4, TV distortion is generally liable to largely occur in an image displayed on the scanned surface (for example, the screen).

In the seventh embodiment, however, this distortion is preferably corrected by the construction in which the spherical lens 5b is tilted and shifted relative to the central axis (light ray) A of the deflection range of the light beam deflected by the deflector 4 toward a side (a minus side) on which the light beam obliquely enters the deflector 4 about an axis parallel to the X-axis perpendicular to the plane of incidence of the light beam entering the reflecting surface 4a, and the spherical lens 5c is shifted relative to the central axis (light ray) A of the light beam deflection range toward a side (a plus side) opposite to the side on which the light beam obliquely enters the deflector 4. In connection therewith, a numerical example will be described later.

Figure 38:
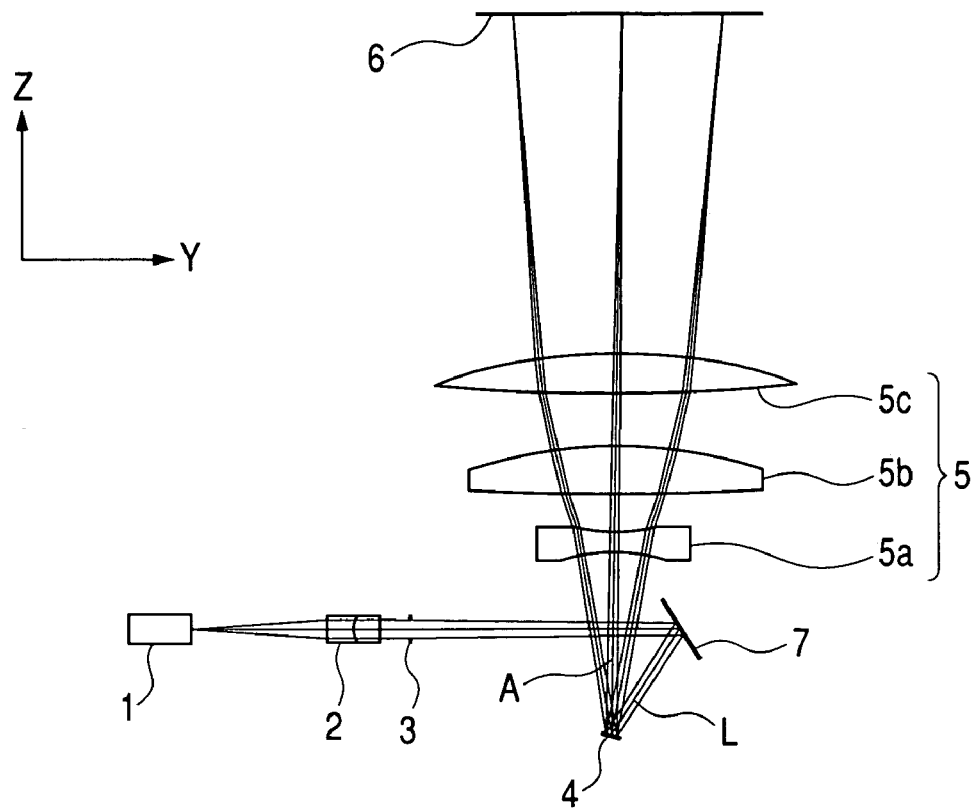
FIG. 38 is a perpendicular cross-sectional view illustrating a comparative example to be compared with the present invention.

FIG. 38 illustrates a perpendicular cross section of a two-dimensional scanning apparatus which is a comparative example to be compared with the seventh embodiment.

In the comparative example of FIG. 38, similar to the seventh embodiment, a divergent light beam emitted from the light source 1 is converted into a convergent light beam by a condensing lens system 2, and the width of the convergent light beam is restricted by an aperture stop 3. The light beam is then reflected and deflected by the deflector 4 two-dimensionally in the horizontal direction and the vertical direction. Reference numeral 5 designates a scanning optical system having f-θ characteristics. The scanning optical system 5 includes three coaxial spherical lenses 5a, 5b and 5c. The light beam deflected by the deflecting unit 4 is imaged as a light spot on a scanned surface 6 by the scanning optical system 5. Here, the deflected light is guided onto the scanned surface 6 through the scanning optical system 5. The imaged spot is scanned on the scanned surface 6 by the resonant motion of the deflector 4 in the horizontal and vertical directions.

Table 1 shows lens data representing the structure of the scanning optical system of the comparative example.

In the comparative example, no shift and no tilt are imparted to three spherical lenses 5a, 5b and 5c in the scanning optical system 5, and the light beam directed to a center of the image displayed on the scanned surface 6 travels on the optical axes of the respective spherical lenses 5a, 5b and 5c.

Further, the light beam from the light source 1 is caused to enter the reflecting surface of the deflector 4 at an angle of 15 degrees from a lower side in the perpendicular cross section, and the light beam is thus caused to enter the deflector 4 in an oblique incidence manner in the perpendicular cross section. Accordingly, TV distortion is likely to occur on the scanned surface 6 due to the two-dimensional scanning by the deflecting unit 4, and trapezoid distortion is likely to occur on the scanned surface 6 due to the oblique incidence on the deflector 4.

Figure 39:
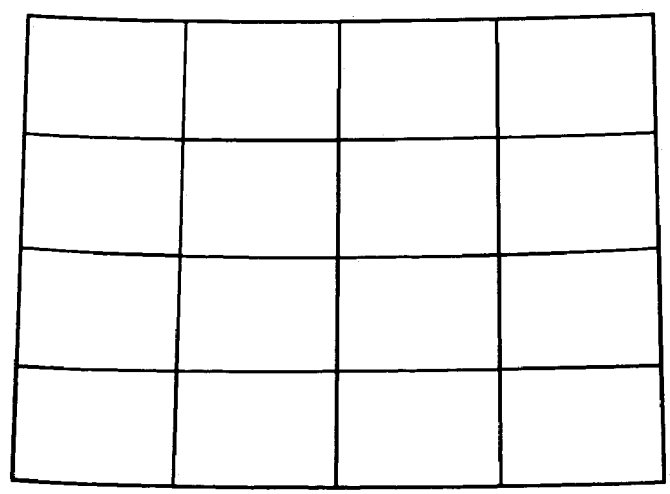
FIG. 39 is a view illustrating a displayed image (grating) in the comparative example of FIG. 38.

FIG. 39 illustrates an image (grating) displayed in the comparative example. Further, Table 2 shows amounts of the TV distortion and the trapezoid distortion in the comparative example.

Upper side L1 and lower side L2 of four lines constituting the image frame should straightly extend horizontally, but as illustrated in FIG. 39, each of the upper side L1 and the lower side L2 is in the form of a curve whose central portion caves downward. Thus, TV distortion occurs. Here, in connection with the TV distortion, the upper side is 1.59%, and the lower side is 1.93% (see Table 2). Further, left side L3 and right side L4 of the image frame should straightly extend vertically, but the left side L3 and the right side L4 tilt so that the distance between them widens from an upper portion to a lower portion. Thus, trapezoid distortion occurs. Here, in connection with the trapezoid distortion, both the left side and the left side are 2.11% (see Table 2).

Thus, in the comparative example, the TV distortion and the trapezoid distortion largely appear, and a preferable two-dimensional image cannot be obtained.

Therefore, in the seventh embodiment, as discussed above, at least one of the spherical lenses 5a, 5b and 5c constituting the scanning optical system is tilted, and at least one lens is shifted, thereby correcting the TV distortion and the trapezoid distortion preferably, or to a degree with almost no problem.

Table 3 shows lens data representing the construction of the scanning optical system 5 in the seventh embodiment.

In this embodiment, three spherical lenses 5a, 5b and 5c constitute the scanning optical system 5, and these lenses are a first scanning lens 5a, a second scanning lens 5b and a third scanning lens 5c disposed in this order from the side of the deflector 4, respectively. The first scanning lens 5a is a meniscus lens having negative optical power (a reciprocal of a focal length: refractive power), and having a concave surface facing the side of the deflector 4. The second scanning lens 5b is a meniscus lens having positive power, and a concave surface facing the side of the deflector 4. Further, the third scanning lens 5c is a meniscus lens having positive power, and a concave surface facing the side of the deflector 4.

The second scanning lens 5b is tilted at an angle of 36.1 degrees in a clockwise direction (the minus side) in the perpendicular cross section. In other words, the optical axis of the second scanning lens 5b is tilted toward the side of the light beam L which is obliquely incident on the deflector 4, namely toward a direction approaching a parallel direction to the obliquely incident light beam L. The second scanning lens 5b is also shifted by 4.64 mm downward (toward the minus side). In other words, the second scanning lens 5b is shifted toward a direction approaching the obliquely incident light beam L. Accordingly, the rotational centers of the second scanning lens 5b are located on the side of the deflector 4, and the second scanning lens 5b is tilted so as to approach the incident light beam. Here, the rotational center is located at a position (z, x, y)=(11.14, 0, 0) that is shifted by 6.36 mm from the light incident surface of the second scanning lens 5b toward the side of the deflector 4.

Further, the third scanning lens 5c is shifted by 2.76 mm upward (toward the plus side). In other words, the third scanning lens 5c is shifted toward a direction away from the incident light beam.

Figure 40:
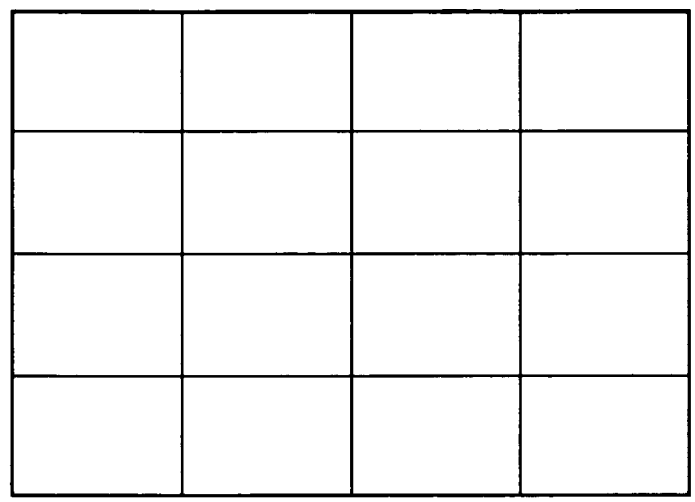
FIG. 40 is a view illustrating a displayed image (grating) in the seventh embodiment.

FIG. 40 illustrates an image (grating) displayed by the two-dimensional scanning apparatus of the seventh embodiment. Table 4 shows amounts of the TV distortion and the trapezoid distortion in this embodiment.

With respect to the TV distortion of the image illustrated in FIG. 40, the upper side L1 of the frame is 0.12%, and the lower side L2 is 0.21%. The upper side L1 and the lower side L2 curved in the comparative example are thus corrected to be almost straight. Further, with respect to the trapezoid distortion, both the upper side L1 and the lower side L2 are 0.10%. Lines sloping in the comparative example are thus corrected to vertical lines. Thus, the scanning lenses constituting the scanning optical system 5 are appropriately tilted and shifted, thereby correcting the TV distortion and the trapezoid distortion preferably, or to a degree with almost no problem.

Particularly, in the scanning optical system of the seventh embodiment, the TV distortion is corrected by tilting the second scanning lens 5b, and the trapezoid distortion is corrected by tilting the second scanning lens 5b and the third scanning lens 5c. The correction made by the tilt and the correction made by the shift also influence each other, so that it is important to establish the balance between them.

Therefore, the light beam from the light source is caused to be obliquely incident on the deflector 4, at least one transmission optical element in the scanning optical system 5 is tilted in the oblique incidence cross section, i.e., the plane of incidence, and at least one transmission optical element is shifted. The TV distortion and the trapezoid distortion in the image displayed on the scanned surface 6 are accordingly corrected preferably, and it is hence possible to provide a two-dimensional scanning apparatus capable of displaying a high-quality image.

Further, in the seventh embodiment, the tilted scanning lens (the optical element without any reflecting surface having optical power) 5b is comprised of the meniscus lens having a concave surface facing the side of the deflector 4. Thereby, when the scanning lens 5b is tilted, its influence imparted to the curvature of field can be reduced with its influence imparted to the TV distortion and the trapezoid distortion being maintained. Therefore, the TV distortion and the trapezoid distortion can be corrected separately from the curvature of field, and the TV distortion and the trapezoid distortion can hence be corrected readily.

In the seventh embodiment, a single deflector 4 capable of two-dimensional resonant vibration is used as the deflecting unit, but the deflecting unit is not limited thereto. A combination of two deflectors capable of one-dimensional resonant vibration can be used as the deflecting unit capable of two-dimensionally deflecting the light beam with the same effect. Further, in place the deflector capable of resonant vibration, a galvanomirror or a polygon mirror whose reflecting surface is rotatable can also be used, for example.

Optical surfaces (surfaces acting on light to direct it to the scanned surface) of three optical elements (scanning lenses) constituting the scanning optical system in the seventh embodiment are all composed of refractive surfaces which transmit light therethrough and at the same time control its wave front, respectively. Precision required to the refractive surface only needs to be ¼ as small as that required to the reflecting surface, so that the optical element can be readily fabricated. Further, there is a limitation to arrangement of an optical path after tilted by the reflecting surface where the reflecting surface is used. In contrast thereto, in the case of the transmission refractive surface that undergoes no such disadvantage, flexibility in such arrangement is large. Further, since a transmission factor of the refractive surface is larger than a reflection factor of the reflecting surface, the amount of light loss is outstandingly small in the case of the transmission refractive surface. Particularly, this advantage is remarkable when the number of optical surfaces is large. Additionally, the transmission factor can be highly enhanced by coating the refractive surface with an antireflective film.

Further, in the event of an optical element having a refractive surface and a reflecting surface in a mixed manner, it is necessary to secure the optical path within the optical element. The size of the optical element itself accordingly increases. Further, the problem of such enhanced size is likely to increase adverse influences of the refractive-index distribution and the double refraction which occur when the optical element is formed by plastic molding.

However, when a scanning lens with optical surfaces of reflecting surfaces is used as in the seventh embodiment, the scanning lens can be thinned and can be reduced in its size since there is no necessity to secure the optical path.

Accordingly, when an optical element without any reflecting surfaces for directing light to the scanned surface is used in the scanning optical system, the apparatus can enjoy various advantageous effects in contrast to the case using an optical element with the reflecting surface as described in the above-mentioned Japanese Patent Application Laid-Open No. 2001-281583. In the present invention, it is also possible to use an optical element which uses a diffraction surface for transmission-diffracting light in place of, or in combination with the refractive surface to correct distortions of the image formed on the scanned surface.

Furthermore, in the seventh embodiment, the light beam from the light source unit is caused to obliquely enter in the ZY plane, but the construction is not limited thereto. In the event that the light beam is caused to obliquely enter in the ZX plane, TV distortion and trapezoid distortion can be corrected by tilting and/or shifting the transmission optical element in the ZX plane, similarly to the seventh embodiment. In the event that the light beam is caused to obliquely enter in both the ZX plane and the ZY plane, TV distortion and trapezoid distortion can be corrected by tilting and/or shifting the transmission optical element one-dimensionally in at least one of the ZX plane and the ZY plane, similarly to the seventh embodiment.

Eighth Embodiment

Figure 41:
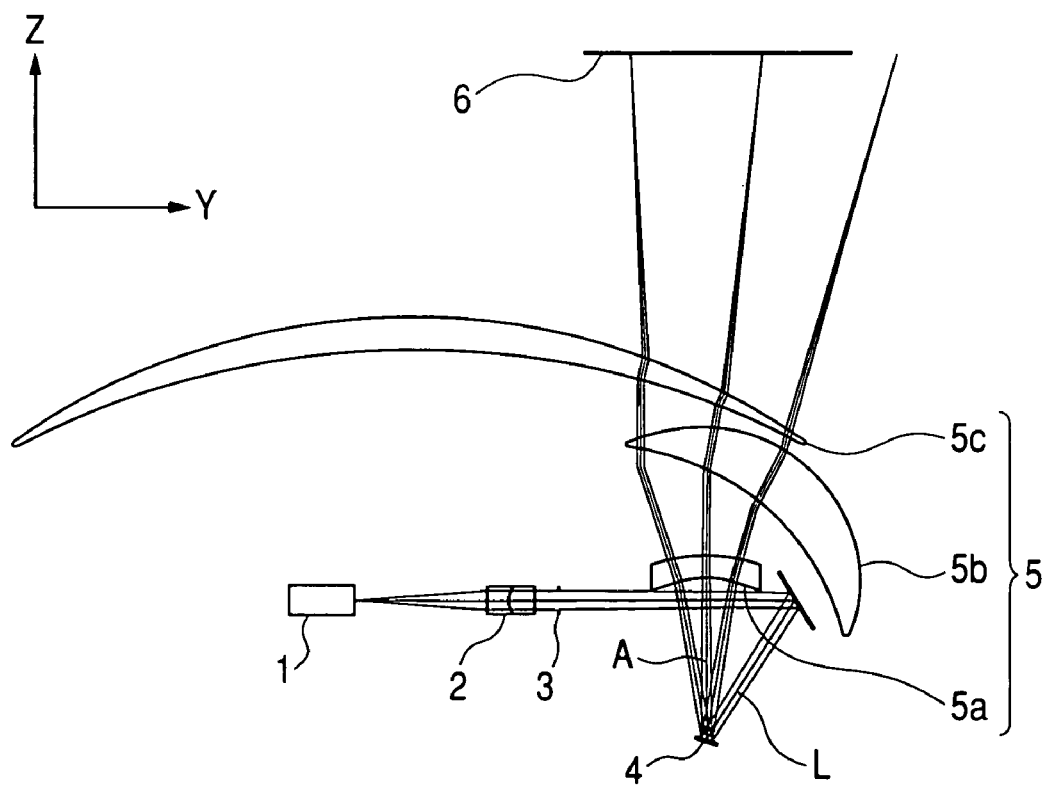
FIG. 41 is a perpendicular cross-sectional view illustrating a two-dimensional scanning apparatus of an eighth embodiment according to the present invention.

FIG. 41 is a perpendicular cross-sectional view illustrating a two-dimensional scanning apparatus of an eighth embodiment according to the present invention.

The eighth embodiment differs from the seventh embodiment in that an image size displayed on the scanned surface 6 is increased. Accordingly, constructions of scanning optical systems are different between those embodiments, but the apparatus illustrated in FIG. 41 has the same construction as the apparatus illustrated in FIG. 37 with the exception of the scanning optical system.

In the eighth embodiment, a scanning optical system can increase the image size 1.4 times as large as that of the seventh embodiment, but its entire length (the distance between the deflector 4 and the scanned surface 6) is enlarged only 1.1 times as long as that of the seventh embodiment. Thus, a compact construction is achieved in the eighth embodiment.

Table 5 shows lens data representing the construction of the scanning optical system 5 in the eighth embodiment.

Also in this embodiment, similar to the seventh embodiment, the second scanning lens 5b of three scanning lenses 5a, 5b and 5c constituting the scanning optical system 5 is tilted and shifted, and the third scanning lens 5c of three scanning lenses 5a, 5b and 5c is shifted, thereby correcting TV distortion and trapezoid distortion of the image displayed on the scanned surface 6. Here, the second scanning lens 5b is tilted at an angle of 44.38 degrees toward a side (a minus side) on which the light beam from the light source unit 1 obliquely enters the deflector 4 in the perpendicular cross section (the ZY plane), and is shifted by 5.05 mm toward the minus side in the perpendicular cross section. Further, the third scanning lens 5c is shifted by 24.57 mm toward a side (a plus side) opposite to the side on which the light beam from the light source 1 obliquely enters the deflecting unit 4.

Figure 42:
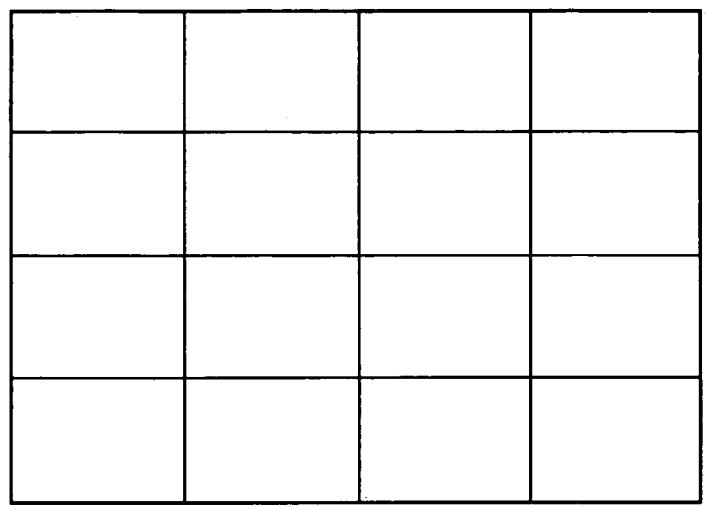
FIG. 42 is a view illustrating a displayed image (grating) in the eighth embodiment.
Figure 43:
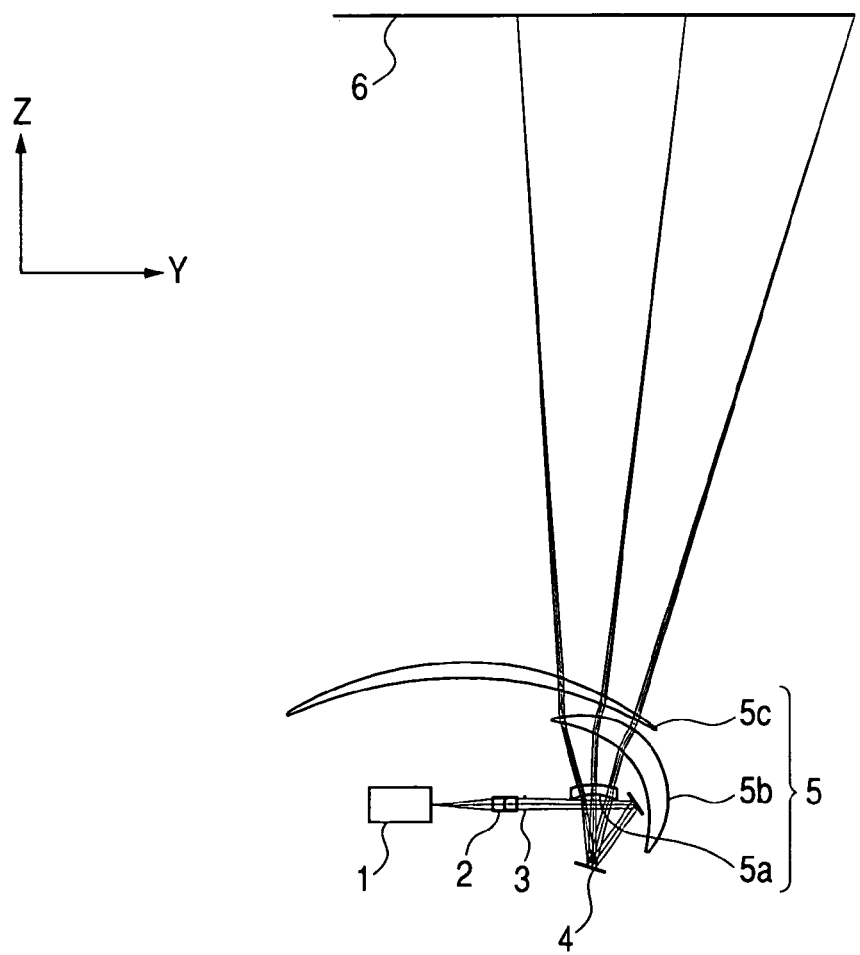
FIG. 43 is a perpendicular cross-sectional view illustrating a two-dimensional scanning apparatus of a ninth embodiment according to the present invention.

FIG. 42 illustrates an image (grating) displayed by the two-dimensional scanning apparatus of the eighth embodiment. Table 6 shows amounts of the TV distortion and the trapezoid distortion in this embodiment.

With respect to the TV distortion of the image in the eighth embodiment, the upper side of the frame is 0.12%, the lower side is 0.24%, the left side is 0.11%, and the right side is 0.11%. The TV distortion is thus corrected preferably, or to a degree with almost no problem. Further, with respect to the trapezoid distortion, both the left side and the right side are 0.06%. The trapezoid distortion is also corrected preferably, or to a degree with almost no problem.

Further, in the event that it is desired that the entire length of the apparatus be made compact with its image size being enlarged, when the TV distortion and the trapezoid distortion are to be corrected, it is likely that the tilt amount of the scanning lens 5b increases, and the amount of astigmatism appearing on the scanned surface 6 due to the tilt of the scanning lens 5b also increases. Therefore, in the eighth embodiment, an optical element having anamorphic power is contained in the scanning optical system. Specifically, all surfaces of both the second scanning lens 5b and the third scanning lens 5c are formed as anamorphic surfaces, and each of these lenses 5b and 5c is thus constructed as an anamorphic lens.

Particularly, optical power of the second scanning lens 5b in the perpendicular cross section (the ZY cross section) is made smaller than its optical power in the horizontal cross section (the ZX cross sectioned), and is made close to non-power such that the tilt of the curvature of field in the perpendicular cross section due to the tilt of the second scanning lens 5b can be reduced. It is thereby possible to preferably correct the TV distortion and the trapezoid distortion by largely tilting the second scanning lens 5b. Further, the astigmatism can be corrected by forming the third scanning lens 5c as the anamorphic lens.

It is preferable that the tilted scanning lens is constructed as a meniscus lens with a concave surface facing the deflecting unit 4, so that the second scanning lens 5b is an anamorphic lens of a meniscus shape having a concave surface facing the side of the deflector 4 in both the horizontal and perpendicular cross sections.

Further, radius of curvature of the second scanning lens 5b in the perpendicular cross section is made gentler (the absolute value of the radius of curvature is made larger) than its radius of curvature in the horizontal cross section such that the TV distortion and the trapezoid distortion can be more effectively corrected.

As discussed above, the astigmatism as well as the TV distortion and the trapezoid can be corrected by tilting and/or shifting the optical elements with anamorphic optical power, and accordingly a two-dimensional scanning apparatus capable of displaying a large high-quality image can be achieved.

Particularly, the tilted optical element is caused to have anamorphic power, and optical power in a first cross section is made smaller than that in a second cross section, and is made close to non-power where the first cross section is a cross section in which the optical element is tilted, and the second cross section is a cross section perpendicular to the first cross section and the optical axis, thereby decreasing influence of the tilt on the curvature of field. Accordingly, effect of the tilt can be concentrated to correction of the TV distortion and the trapezoid, and it is hence possible to independently correct the TV distortion and the trapezoid.

When the tilted and/or shifted scanning lenses 5b and 5c having large unusable portions are used as in the eighth embodiment, the optical system can be contained in an optical box in a compact form by cutting portions other than their use portions.

Ninth Embodiment

FIG. 42 is a perpendicular cross-sectional view illustrating a two-dimensional scanning apparatus of a ninth embodiment according to the present invention.

The ninth embodiment differs from the eighth embodiment in that an image size displayed on the scanned surface 6 is further increased. Fundamental constructions of the ninth embodiment and the eighth embodiment are the same, and hence only different points will be described.

In the ninth embodiment, the size of an image displayed on the scanned surface 6 is set to 4.1 inches, and a scanning optical system capable of achieving the image size 2.86 times as large as that of the eighth embodiment is used.

Table 7 shows lens data representing the construction of the scanning optical system in the ninth embodiment.

In the ninth embodiment, the second scanning lens 5b is constructed as an anamorphic lens of a meniscus shape having a concave surface facing the side of the deflecting unit 4, and each of its opposite surfaces is shaped into a rotational asymmetrical aspherical surface whose aspherical amount in the horizontal cross section (the ZX cross section) is different from that in the vertical cross section (the ZY cross section).

The aspherical surface in this embodiment has the amount of displacement Z in the optical axial direction (the Z-direction) given by the following formula at each position in the horizontal direction (the X-direction) and the vertical direction (the Y-direction)

$$z = \frac{CUXx^2 + CUYy^2}{1 + SQRT\{1 - (1+KX)CUX^2x^2 - (1-KY)CUY^2y^2\} +} \\ AR\{(1-AP)x^2 + (1-AP)y^2\}^2 + BR\{(1-BP)x^2 + (1+BP)y^2\}^3 + \\ CR\{(1-CP)x^2 + (1+CP)y^2\}^4 + DR\{(1-DP)x^2 + (1+DP)y^2\}^5$$

where Z is the sag of a surface parallel to the Z-axis, CUX and CUY are curvatures of x and y, respectively, KX and KY are conic coefficients of x and y (the eccentricity is obtained by a method similar to that of K of an ASP-surface type), respectively, AR, BR, CR and DR represent fourth-order, sixth-order, eighth-order and tenth-order deformed rotational symmetrical portions deformed from a cone, respectively, and AP, BP, CP and DP represent fourth-order, sixth-order, eighth-order and tenth-order deformed rotational asymmetrical portions deformed from a cone, respectively.

In the ninth embodiment, its entire length is 2.77 times as large as that of the eighth embodiment (which is approximately the same magnification as the image size), and the distance from the deflector 4 to the third scanning lens 5c is set to 42.00 mm that is approximately the same distance as that of the eighth embodiment. In other words, the distance from the deflector 4 to the third scanning lens 5c is reduced relatively to the entire length, and the size of the scanning optical system is decreased. In the ninth embodiment, its entire length L is L=175.88 (mm), the distance d from the deflector 4 to the scanning lens 5c disposed closest to the scanned surface 6 is d=42.00 (mm), and hence d/L=0.24. Accordingly, it is possible to provide a very compact two-dimensional scanning optical system capable of achieving a large image size.

In the ninth embodiment, the second scanning lens 5b is tilted at an angle of 53.74 degrees toward the side on which the light beam from the light source 1 obliquely enters the deflector 4, and is shifted by 6.42 mm toward this oblique incidence side. Further, the third scanning lens 5c is tilted at an angle of 2.76 degrees toward the side on which the light beam from the light source 1 obliquely enters the deflector 4, and is shifted by 22.49 mm toward a side opposite to the oblique incidence side.

Figure 44:
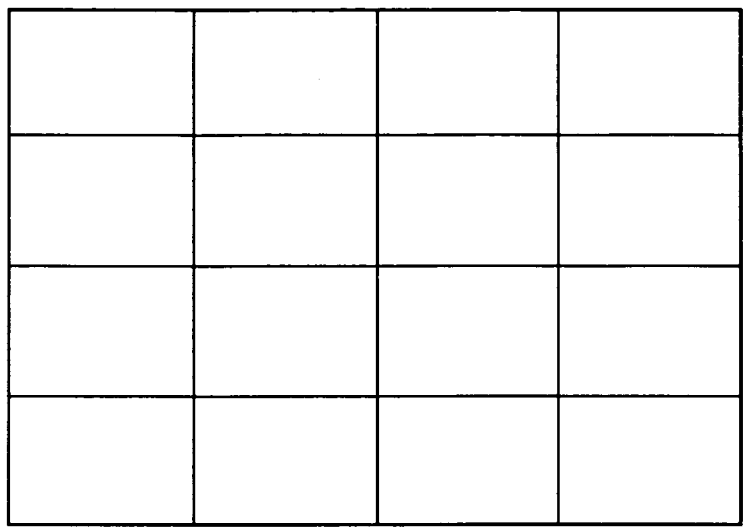
FIG. 44 is a view illustrating a displayed image (grating) in the ninth embodiment.

FIG. 44 illustrates an image (gratings) displayed in the ninth embodiment. Table 8 shows amounts of the TV distortion and the trapezoid distortion in the ninth embodiment.

With respect to the TV distortion of the image in the ninth embodiment, the upper side of the image frame is 0.23%, the lower side is 0.36%, the left side is 0.12%, and the right side is 0.12%. The TV distortion is thus corrected preferably, or to a degree with almost no problem. Further, with respect to the trapezoid distortion, both the left side and the right side are 0.38%. The trapezoid distortion is also corrected preferably, or to a degree with almost no problem.

When a rotational asymmetrical aspherical surface (a refractive surface or a transmission diffraction surface) is used in a tilted optical element as in the ninth embodiment, the TV distortion and the trapezoid distortion can be more effectively corrected. Further, in the ninth embodiment, two transmission optical elements are tilted and shifted, but the construction is not limited thereto. For example, three or more transmission optical elements can be tilted and/or shifted to satisfactorily obtain the same technical advantages.

Tenth Embodiment

Figure 45:
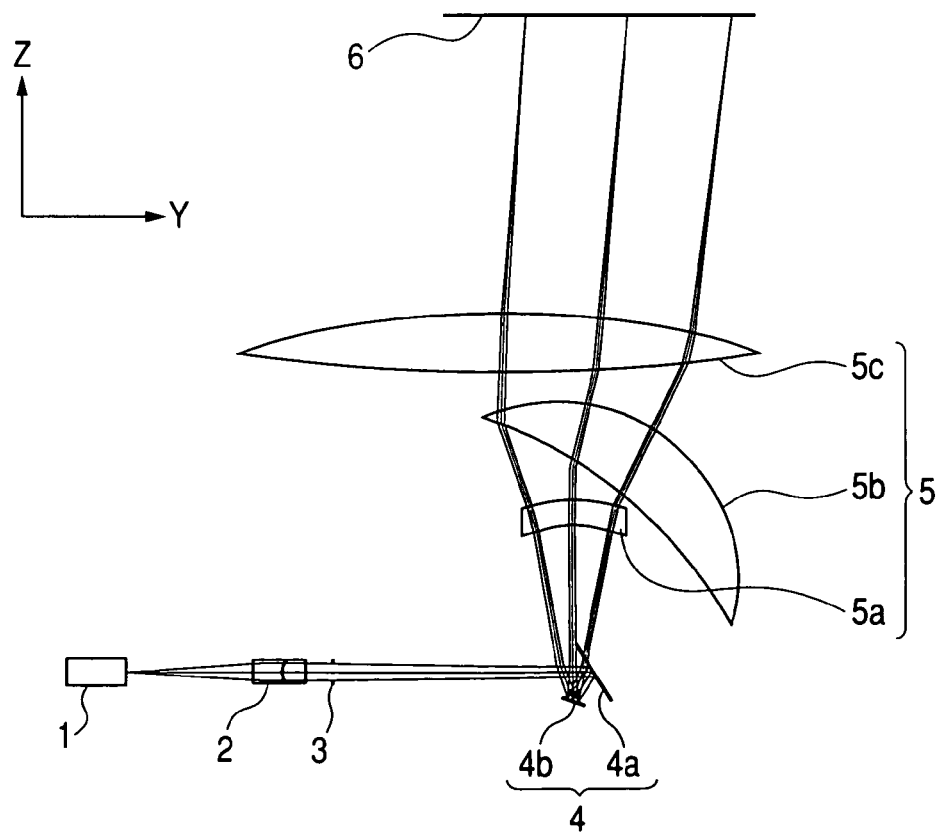
FIG. 45 is a perpendicular cross-sectional view illustrating a two-dimensional scanning apparatus of a tenth embodiment according to the present invention.

FIG. 45 is a perpendicular cross-sectional view illustrating a two-dimensional scanning apparatus of a tenth embodiment according to the present invention.

The tenth embodiment differs from the seventh embodiment in that a two-dimensional deflecting unit is comprised of two one-dimensional deflectors capable of one-dimensional deflection.

In each of the two deflectors in the tenth embodiment, a reflecting surface is supported by a frame through a pair of torsion bars, and each deflector is comprised of the reflecting surface 4a, the first torsion bars 4b and the first frame 4c illustrated in FIG. 36.

In the tenth embodiment, a divergent light beam emitted from a light source 1 is converted into a convergent light beam by a condensing lens 2, and the width of the convergent light beam is restricted by an aperture stop 3. The deflector 4 is comprised of a first one-dimensional deflector 41 capable of one-dimensional deflection in the vertical direction, and a second one-dimensional deflector 42 capable of one-dimensional deflection in the horizontal direction. The light beam from the light source 1 is deflected in the vertical direction by the first deflector 41, and deflected in the horizontal direction by the second deflector 42. The light beam is thus deflected two-dimensionally. The light beam deflected by the deflector 4 is imaged as a light spot on the scanned surface 6 by the scanning optical system 5 including three scanning lenses.

Table 9 shows lens data representing the construction of the scanning optical system in the tenth embodiment.

Also in the tenth embodiment, three scanning lenses constitute the scanning optical system 5, and these lenses are a first scanning lens 5a, a second scanning lens 5b and a third scanning lens 5c disposed in this order from the side of the deflector 4, respectively. The first scanning lens 5a is a meniscus lens having negative optical power and a concave surface facing the side of the deflector 4, the second scanning lens 5b is a meniscus lens which has positive optical power and a concave surface facing the side of the deflector 4, and whose opposite surfaces are anamorphic surfaces, respectively. The third scanning lens 5c is a double-convex lens having positive optical power.

In the tenth embodiment, the light beam from the light source 1 is caused to enter the first deflector 41 capable of deflection in the vertical direction, and then enter the second deflector 42 capable of deflection in the horizontal direction. Here, the light beam from the light source 1 is caused to enter the first deflector 41 in the perpendicular cross section. The rotational central axis of the first deflector 41 lies in the horizontal cross section, and hence the incident light beam and the rotational central axis of the reflecting surface of the deflector lie in different cross sections, respectively On the other hand, the rotational central axis of the second deflector 42 lies in the same vertical cross section as the incident light beam, and therefore the light beam deflected by the first deflector 41 is obliquely incident on the second deflector 42. Accordingly, TV distortion and trapezoid distortion are liable to occur.

In the tenth embodiment, therefore, the second scanning lens 5b is tilted at an angle of 42.27 degrees toward the side (in a clockwise direction in FIG. 45) on which the light beam from the light source 1 obliquely enters the second deflector 42 in the vertical cross section, and is shifted by 4.02 mm toward this oblique incidence side (a right side in FIG. 45) in the vertical cross section. Further, the third scanning lens 5c is shifted by 5.84 mm toward a side opposite to the oblique incidence side of the second scanning lens 5b.

Figure 46:
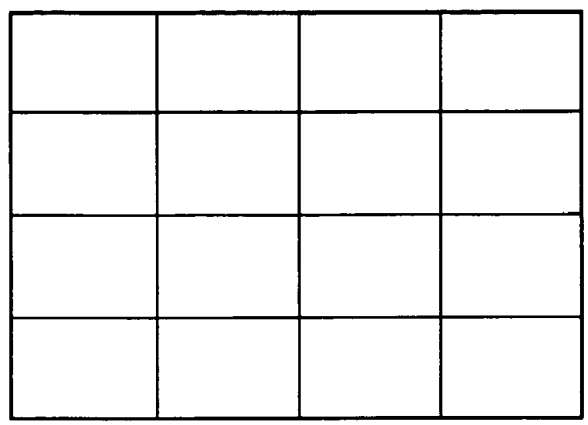
FIG. 46 is a view illustrating a displayed image (grating) in the tenth embodiment.

FIG. 46 illustrates an image (gratings) displayed in the tenth embodiment. Table 10 shows amounts of the TV distortion and the trapezoid distortion in the tenth embodiment.

With respect to the TV distortion of the image in the tenth embodiment, the upper side of the image frame is 0.29%, the lower side is 0.17%, the left side is 0.11%, and the right side is 0.11%. The TV distortion is thus corrected sufficiently, or to a degree with almost no problem. Further, with respect to the trapezoid distortion, both the left side and the right side are 0.18%. The trapezoid distortion is also corrected preferably, or to a degree with almost no problem.

When the two-dimensional deflecting unit using a couple of one-dimensional deflectors is employed, the light beam emitted from the light source unit enters obliquely relative to the central axis (the rotational axis) of the one-dimensional deflector disposed rearward, thereby causing the TV distortion and the trapezoid distortion. The TV distortion and the trapezoid distortion, however, can be corrected when one element without any reflecting surface having optical power out of the transmission optical elements constituting the scanning optical system is tilted, and one element without any reflecting surface having optical power is shifted.

Eleventh Embodiment

Figure 47:
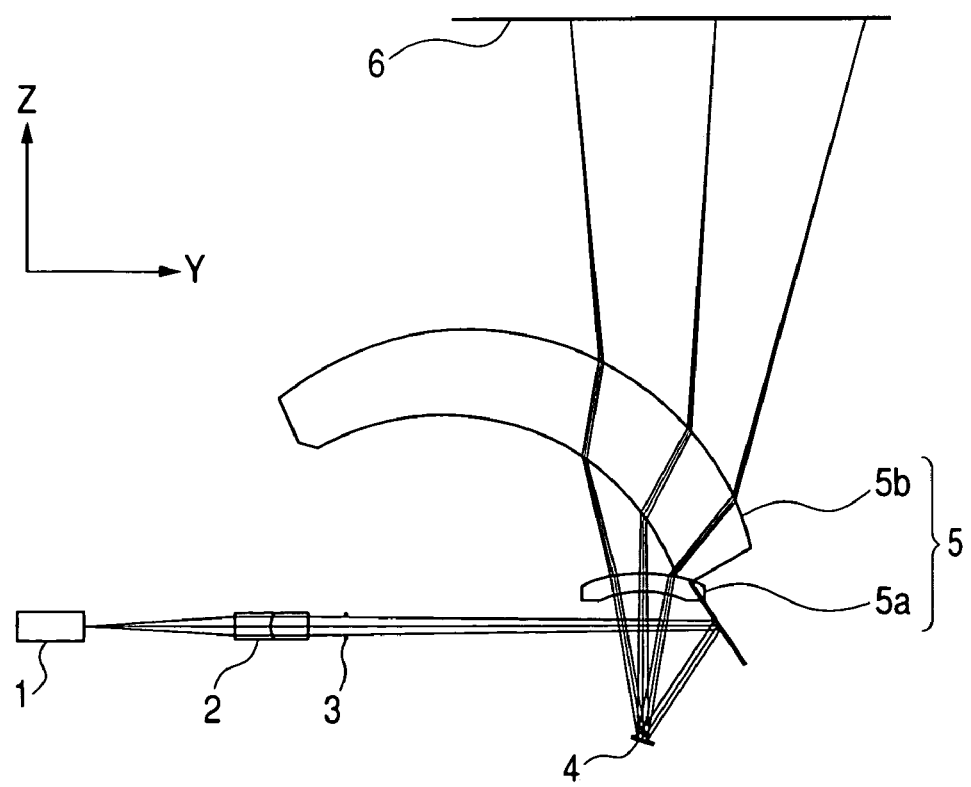
FIG. 47 is a perpendicular cross-sectional view illustrating a two-dimensional scanning apparatus of an eleventh embodiment according to the present invention.

FIG. 47 illustrates a perpendicular cross section of a two-dimensional scanning apparatus of an eleventh embodiment according to the present invention.

The eleventh embodiment is different from the seventh embodiment in that the scanning optical system 5 is comprised of two scanning lenses 5a and 5b.

Table 11 shows lens data representing the construction of the scanning optical system in the eleventh embodiment.

In the eleventh embodiment, opposite surfaces of each of the first scanning lens 5a and the second scanning lens 5b are constructed as rotational asymmetrical aspherical surfaces, respectively. The aspherical surface in the eleventh embodiment has the amount of displacement Z in the optical axial direction (the Z-direction) given by the following formula at each position in the horizontal direction (the X-direction) and the vertical direction (the Y-direction)

$$z = \frac{cr^2}{1 + SQRT[1 - (1+k)c^2r^2]} + \sum_{i=2}^{66} C_j x^m y^n \quad j = [(m+n)^2 + m + 3m]/2 + 1$$

where Z is the sag of a surface parallel to the Z-axis, c is the curvature (CUY) of the vertex, k is the conic coefficient, and Cj is the coefficient of $x^m y^n$.

In the eleventh embodiment, the second scanning lens 5b is tilted at an angle of 21.53 degrees toward the side (in a clockwise direction in FIG. 47) on which the light beam from the light source 1 obliquely enters the deflector 4, and is shifted by 6.06 mm toward a side opposite to this oblique incidence side. Further, the light emergence surface of the second scanning lens 5b is tilted at an angle of 1.60 degrees relative to its light incident surface toward a side (in a counterclockwise direction in FIG. 47) opposite to the oblique incidence side, and is shifted by 0.20 mm toward the side opposite to this oblique incidence side. The TV distortion and the trapezoid distortion in the image displayed on the scanned surface 6 are thereby corrected.

Particularly, in the eleventh embodiment, the second scanning lens 5b is comprised of the rotational asymmetrical aspherical lens, and is tilted and shifted as discussed above such that the TV distortion and the trapezoid distortion can be preferably corrected only by the tilt and the shift of one lens.

Figure 48:
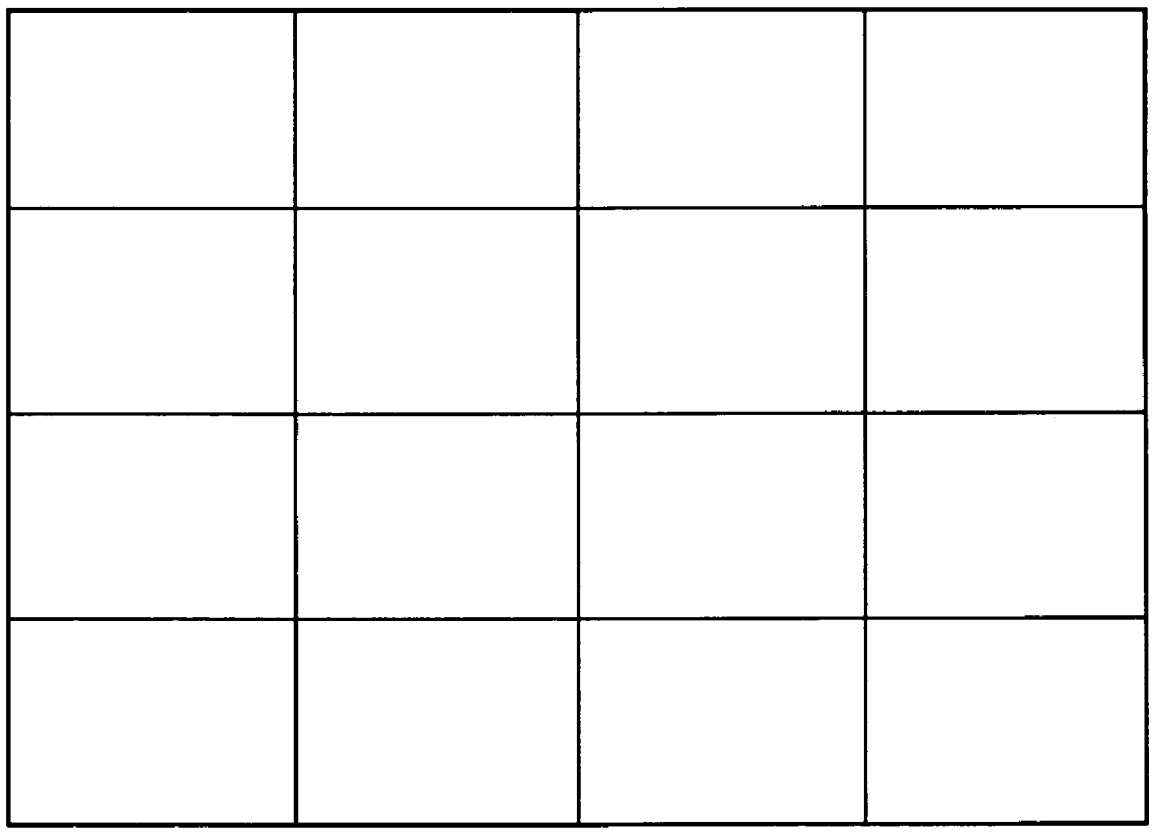
FIG. 48 is a view illustrating a displayed image (grating) in the eleventh embodiment.

FIG. 48 illustrates an image (grating) displayed in the eleventh embodiment. Table 12 shows amounts of the TV distortion and the trapezoid distortion in the eleventh embodiment.

With respect to the TV distortion of the image, the upper side of the image frame is 0.07%, the lower side is 0.01%, the left side is 0.01%, and the right side is 0.01%. The TV distortion is thus corrected very preferably, or to a degree with almost no problem. Further, with respect to the trapezoid distortion, both the left side and the right side are 0.02%. The trapezoid distortion is also corrected very preferably, or to a degree with almost no problem.

When the tilted or shifted optical element without any reflecting surface having optical power out of the transmission optical elements constituting the scanning optical system 5 is comprised of a rotational asymmetrical aspherical lens as in the eleventh embodiment, the TV distortion and the trapezoid distortion can be more effectively corrected. Further, it is possible to correct the TV distortion and the trapezoid distortion by tilting and shifting only one lens of the scanning lenses, and the number of optical elements constituting the scanning optical system 5 can be reduced.

In the eleventh embodiment, aspherical coefficients up to $(m+n) \leq 4$ are used in connection with the rotational asymmetrical aspherical surface of the tilted and shifted scanning lens, but the construction is not limited thereto. When aspherical coefficients in higher orders of $(m+n) \geq 6$ are used, the TV distortion and the trapezoid distortion can be more effectively corrected.

In the above-discussed embodiments (lens data), each optical element is comprised of a glass lens, but it is not limited thereto. For example, when at least one optical element is comprised of a plastic lens formed by injection molding, it can be readily formed and the cost can be lowered.

Furthermore, a two-dimensional colour image can be displayed by providing three colour light emitting portions of blue, green and red in the light source unit. A scanning colour image displaying apparatus can be thus achieved. In this case, three colour light of blue, green and red is directed to the deflector sequentially and/or simultaneously. Alternately, it is possible to combine a light source of white colour, and a rotatable turret provided with three colour filters of blue, green and red, and direct three colour light of blue, green and red to the deflector sequentially and/or simultaneously.

When the two-dimensional colour image is formed by using the deflector and the scanning optical system while three light of blue, green and red from the light source unit is directed to the deflector sequentially and/or simultaneously, the light source unit and the deflecting unit are appropriately controlled in a conventional manner. Description thereof is therefore omitted.

Further, there are provided, as the example of the deflecting unit, the MEMS deflecting device capable of two-dimensional resonant vibration, and MEMS deflecting devices capable of resonant vibration in a one-dimensional direction. In place thereof, a galvanomirror or a polygon mirror can also be satisfactorily used with the same effect.

Further, techniques for electrically correcting TV distortion exist as proposed in the above-noted Japanese Patent Application Laid-Open No. H8(1996)-146320, and the distortion of the image can also be corrected by a combination of such electrical correction and the optical correction achieved by the scanning optical system of the present invention.

When the TV distortion is electrically corrected, the tilt angle of the reflecting surface during the two-dimensional scanning is controlled by a driving circuit (not shown) for controlling the deflector such that residual distortion after the optical correction can be corrected.

The above-discussed embodiments exemplify the image displaying apparatus (for example, a projector) in which an image on the screen or the like provided on the scanned surface is directly observed. The present invention, however, can also be applied to an image displaying apparatus (for example, a finder) in which an image formed on the scanned surface is observed through a relay optical system or the like, for example.

TABLE 1

| | | | | comparative example scanning optical system | | | | | |
|---|---|---|---|---|---|---|---|---|---|
| | | radius of curvature radius of | surface separation surface | position of surface vertex | | | tilt of normal to surface | | glass material |
| optical surface | | | | | | | | | |
| element | surface | curvature (mm) | separation (mm) | position Z (mm) | position X (mm) | position Y (mm) | tilt ZX (deg) | tilt ZY (deg) | glass material |
| deflecting unit 4 | reflecting surface | | 15.000 | 0.000 | 0.000 | 0.000 | | | |
| first scanning lens 5a | incident surface light emergence surface | −13.6778 106.0174 | 2.000 3.002 | 15.000 17.000 | 0.000 0.000 | 0.000 0.000 | 0.000 0.000 | 0.000 0.000 | FD2 |
| second scanning lens 5b | incident surface light emergence surface | 196.5971 −29.4356 | 4.000 4.621 | 20.002 24.002 | 0.000 0.000 | 0.000 0.000 | 0.000 0.000 | 0.000 0.000 | BSC7 |
| third scanning lens 5c | incident surface light emergence surface | 212.4605 −39.5471 | 3.000 28.291 | 28.622 31.622 | 0.000 0.000 | 0.000 0.000 | 0.000 0.000 | 0.000 0.000 | LAF3 |
| scanned surface 6 | | | | 59.913 | 0.000 | 0.000 | 0.000 | 0.000 | |

TABLE 2

| TV distortion | | trapezoid distortion | |
|---|---|---|---|
| upper side | 1.591(%) | upper side | 0.000(%) |
| lower side | 1.928(%) | lower side | 0.000(%) |
| left side | −0.067(%) | left side | 2.112(%) |
| right side | 0.067(%) | right side | −2.112(%) |

TABLE 3 first example scanning optical system

| optical surface | | radius of curvature radius of curvature (mm) | surface separation surface separation (mm) | position of surface vertex | | | tilt of normal to surface | | glass material |
|---|---|---|---|---|---|---|---|---|---|
| element | surface | | | position Z (mm) | position X (mm) | position Y (mm) | tilt ZX (deg) | tilt ZY (deg) | glass material |
| deflecting unit 4 | reflecting surface | | 15.000 | 0.000 | 0.000 | 0.000 | | | |
| first scanning lens 5a | incident surface | −6.7183 | 2.000 | 15.000 | 0.000 | 0.000 | 0.000 | 0.000 | FD4 |
| | light emergence surface | −17.3934 | 0.492 | 17.000 | 0.000 | 0.000 | 0.000 | 0.000 | |
| second scanning lens 5b | incident surface | −18.4399 | 4.000 | 17.492 | 0.000 | −4.635 | 0.000 | −36.105 | FC5 |
| | light emergence surface | −11.1969 | 5.380 | 21.492 | 0.000 | −7.553 | 0.000 | −36.105 | |
| third scanning lens 5c | incident surface | −58.9068 | 3.000 | 26.871 | 0.000 | 2.760 | 0.000 | 0.000 | LAF7 |
| | light emergence surface | −23.2837 | 26.977 | 29.871 | 0.000 | 2.760 | 0.000 | 0.000 | |
| scanned surface 6 | | | 56.849 | 0.000 | 0.000 | 0.000 | 0.000 | | |

TABLE 4

| TV distortion | | trapezoid distortion | |
|---|---|---|---|
| upper side | 0.120(%) | upper side | 0.000(%) |
| lower side | 0.206(%) | lower side | 0.000(%) |

TABLE 4-continued

| TV distortion | | trapezoid distortion | |
|---|---|---|---|
| left side | −0.112(%) | left side | 0.104(%) |
| right side | 0.112(%) | right side | −0.104(%) |

TABLE 5 second example scanning optical system

| optical surface | | radius of curvature | | surface separation | position of surface vertex | | | tilt of normal to surface | | glass material |
|---|---|---|---|---|---|---|---|---|---|---|
| | | Y radius of curvature (mm) | X radius of curvature (mm) | separation (mm) | position Z (mm) | position X (mm) | position Y (mm) | tilt ZX (deg) | tilt ZY (deg) | glass material |
| element | surface | | | | | | | | | |
| deflecting unit 4 | reflecting surface | | | 15.000 | 0.000 | 0.000 | 0.000 | | | |
| first scanning lens 5a | incident surface | −7.0056 | −7.0056 | 2.000 | 15.000 | 0.000 | 0.000 | 0.000 | 0.000 | LAF2 |
| | light emergence surface | −13.4646 | −13.4646 | 4.495 | 17.000 | 0.000 | 0.000 | 0.000 | 0.000 | |
| second scanning lens 5b | incident surface | −20.5117 | −16.2550 | 5.000 | 21.495 | 0.000 | −5.045 | 0.000 | −44.383 | FC5 |
| | light emergence surface | −13.8484 | −12.9678 | 10.125 | 26.495 | 0.000 | −9.938 | 0.000 | −44.383 | |
| third scanning lens 5c | incident surface | −61.2747 | −567.7089 | 3.000 | 36.621 | 0.000 | 24.565 | 0.000 | 0.000 | FD4 |
| | light emergence surface | −52.5625 | −127.2425 | 23.969 | 39.621 | 0.000 | 24.565 | 0.000 | 0.000 | |
| surface to be scanned 6 | | | | 63.590 | 0.000 | 0.000 | 0.000 | 0.000 | | |

TABLE 6

| TV distortion | | trapezoid distortion | |
|---|---|---|---|
| upper side | 0.118(%) | upper side | 0.000(%) |
| lower side | 0.235(%) | lower side | 0.000(%) |

TABLE 6-continued

| TV distortion | | trapezoid distortion | |
|---|---|---|---|
| left side | −0.111(%) | left side | 0.055(%) |
| right side | 0.111(%) | right side | −0.055(%) |

TABLE 7 third example
scanning optical system

| | | radius of curvature | | surface | | | | | | |
|---|---|---|---|---|---|---|---|---|---|---|
| | | Y radius of | X radius of | separation surface | position of surface vertex | | | tilt of normal to surface | | glass material |
| optical surface | | curvature | curvature | separation | position Z | position X | position Y | tilt ZX | tilt ZY | glass |
| element | surface | (mm) | (mm) | (mm) | (mm) | (mm) | (mm) | (deg) | (deg) | material |
| deflecting unit 4 | reflecting surface | | | 15.000 | 0.000 | 0.000 | 0.000 | | | |
| first scanning lens 5a | incident surface | −7.6750 | −7.6750 | 2.000 | 15.000 | 0.000 | 0.000 | 0.000 | 0.000 | LAF2 |
| | light emergence surface | −14.1441 | −14.1441 | 4.586 | 17.000 | 0.000 | 0.000 | 0.000 | 0.000 | |
| second scanning lens 5b | incident surface | −20.1191 | −15.0579 | 5.000 | 21.586 | 0.000 | −6.417 | 0.000 | −53.735 | FC5 |
| | light emergence surface | −16.3564 | −14.4262 | 12.413 | 26.586 | 0.000 | −13.232 | 0.000 | −53.735 | |
| third scanning lens 5c | incident surface | −59.3074 | −154.1169 | 3.000 | 38.998 | 0.000 | 22.491 | 0.000 | −2.760 | FD4 |
| | light emergence surface | −52.7339 | −87.0530 | 133.879 | 41.998 | 0.000 | 22.346 | 0.000 | −2.760 | |
| surface to be scanned 6 | | | | | 175.877 | 0.000 | 0.000 | 0.000 | 0.000 | |

| | | aspherical coefficient | | | | | | | |
|---|---|---|---|---|---|---|---|---|---|
| element | surface | KY | KX | AR | AP | BR | BP | CR | CP |
| second scanning lens 5b | incident surface | −1.2230E−01 | −3.5502E−01 | 9.7408E−06 | −8.5427E−01 | −1.4380E−01 | 3.1781E+00 | 0.0000E+00 | 0.0000E+00 |
| | light emergence surface | 1.1484E−02 | −2.0151E−01 | 4.0775E−01 | −2.0153E+00 | −2.5335E−08 | −5.8725E−01 | 0.0000E+00 | 0.0000E+00 |

TABLE 8

| TV distortion | | trapezoid distortion | |
|---|---|---|---|
| upper side | 0.233(%) | upper side | 0.000(%) |
| lower side | 0.361(%) | lower side | 0.000(%) |
| left side | 0.119(%) | left side | 0.384(%) |
| right side | 0.119(%) | right side | −0.384(%) |

TABLE 9 fourth example
scanning optical system

| | | radius of curvature | | surface | | | | | | |
|---|---|---|---|---|---|---|---|---|---|---|
| | | Y radius of | X radius of | separation surface | position of surface vertex | | | tilt of normal to surface | | glass material |
| optical surface | | curvature | curvature | separation | position Z | position X | position Y | tilt ZX | tilt ZY | glass |
| element | surface | (mm) | (mm) | (mm) | (mm) | (mm) | (mm) | (deg) | (deg) | material |
| first deflector 4a | reflecting surface | | | 3.000 | 2.598 | 0.000 | 1.500 | | | |

TABLE 9-continued fourth example
scanning optical system

| optical surface | | radius of curvature | | surface separation | position of surface vertex | | | tilt of normal to surface | | glass material |
|---|---|---|---|---|---|---|---|---|---|---|
| | | Y radius of curvature | X radius of curvature | separation | position Z | position X | position Y | tilt ZX | tilt ZY | glass |
| element | surface | (mm) | (mm) | (mm) | (mm) | (mm) | (mm) | (deg) | (deg) | material |
| second deflector 4b | reflecting surface | | | 15.000 | 0.000 | 0.000 | 0.000 | | | |
| first scanning lens 5a | incident surface | −7.1232 | −7.1232 | 2.000 | 15.000 | 0.000 | 0.000 | 0.000 | 0.000 | FD1 |
| | light emergence surface | −19.1504 | −19.1504 | 0.374 | 17.000 | 0.000 | 0.000 | 0.000 | 0.000 | |
| second scanning lens 5b | incident surface | −36.4352 | −18.1028 | 6.000 | 17.374 | 0.000 | −4.019 | 0.000 | −42.265 | FC5 |
| | light emergence surface | −14.3173 | −11.6365 | 4.947 | 23.374 | 0.000 | −9.472 | 0.000 | −42.265 | |
| third scanning lens 5c | incident surface | 142.4106 | 142.4106 | 5.000 | 28.321 | 0.000 | 5.834 | 0.000 | 0.000 | LAF2 |
| | light emergence surface | −58.5994 | −58.5994 | 25.000 | 33.321 | 0.000 | 5.834 | 0.000 | 0.000 | |
| surface to be scanned 6 | | | | | 58.321 | 0.000 | 0.000 | 0.000 | 0.000 | |

TABLE 10

| TV distortion | | trapezoid distortion | |
|---|---|---|---|
| upper side | 0.291(%) | upper side | 0.000(%) |
| lower side | 0.166(%) | lower side | 0.000(%) |
| left side | 0.108(%) | left side | 0.181(%) |
| right side | −0.108(%) | right side | −0.181(%) |

TABLE 11 fifth example
scanning optical system

| optical surface | | radius of curvature | | surface separation | position of surface vertex | | | tilt of normal to surface | | glass material |
|---|---|---|---|---|---|---|---|---|---|---|
| | | Y radius of curvature | X radius of curvature | separation | position Z | position X | position Y | tilt ZX | tilt ZY | glass |
| element | surface | (mm) | (mm) | (mm) | (mm) | (mm) | (mm) | (deg) | (deg) | material |
| deflecting unit 4 | reflecting surface | | | 9.000 | 0.000 | 0.000 | 0.000 | 0.000 | 0.000 | |
| first scanning lens 5a | incident surface | −3.4438 | −3.4438 | 1.000 | 9.000 | 0.000 | 0.000 | 0.000 | 0.000 | BSC7 |
| | light emergence surface | −9.2380 | −9.2380 | 8.645 | 10.000 | 0.000 | 0.000 | 0.000 | 0.000 | |
| second scanning lens 5b | incident surface | −38.4362 | −38.4362 | 5.500 | 18.645 | 0.000 | 6.057 | 0.000 | −21.526 | BACD16 |
| | light emergence surface | −13.4924 | −13.4924 | 19.013 | 23.761 | 0.000 | 6.256 | 0.000 | −19.930 | |
| surface to be scanned 6 | | | | | 42.883 | 0.000 | 0.000 | 0.000 | 0.000 | |

| | | aspherical coefficient | | | | | |
|---|---|---|---|---|---|---|---|
| element | surface | K | $X^2$ | $Y^2$ | $X^4$ | $X^2Y^2$ | $Y^4$ |
| first scanning lens 5a | incident surface | 8.0288E−02 | −3.3554E−02 | 5.5609E−02 | −1.0824E−03 | −4.8225E−03 | −2.8966E−03 |
| | light emergence surface | 3.8691E+00 | −5.3241E−02 | 1.4435E−02 | −9.0852E−04 | −4.2472E−03 | −3.1580E−03 |

TABLE 11-continued fifth example

| | | | | | | | |
|---|---|---|---|---|---|---|---|
| second scanning lens 5b | incident surface | 8.1625E+00 | −2.8442E−02 | −3.2084E−02 | −2.0186E−04 | −2.0869E−04 | 7.1152E−06 |
| | light emergence surface | −3.3717E−01 | −3.6170E−03 | −5.0596E−03 | −5.7456E−05 | −4.4622E−05 | 3.6777E−05 |

TABLE 12

| TV distortion | | trapezoid distortion | |
|---|---|---|---|
| upper side | 0.067(%) | upper side | 0.000(%) |
| lower side | 0.014(%) | lower side | 0.000(%) |
| left side | −0.007(%) | left side | 0.017(%) |
| right side | 0.007(%) | right side | −0.017(%) |

As discussed in the foregoing, according to the present invention, it is possible to readily and preferably correct distortions including TV distortion and trapezoid distortion which are likely to occur when a light beam is two-dimensionally deflected and scanned to form a two-dimensional image. Accordingly, it is possible to provide a two-dimensional scanning apparatus and a scanning image displaying apparatus capable of displaying an image with a small distortion and a high quality.

Further, according to the present invention, it is possible to preferably correct TV distortion and trapezoid distortion by tilting and/or shifting an optical element (for example, a spherical lens) without any reflecting surface having optical power in a scanning optical system. Accordingly, it is possible to provide a two-dimensional scanning apparatus capable of preferably correct the TV distortion and the trapezoid distortion, and a scanning image displaying apparatus capable of displaying a high-quality image by using the two-dimensional scanning apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A two-dimensional scanning apparatus, comprising:
   a deflector for two-dimensionally deflecting a light beam emitted from a light source; and
   an optical scanning system for forming an image of the light beam deflected by a reflecting surface of said deflector onto a surface to be scanned,
   wherein in a plane including a one-dimensional direction of the two-dimensional directions, the light beam emitted from the light source is adapted to be incident, obliquely relative to a central axis of a two-dimensional deflection range of the light beam deflected by the deflective surface of the deflector, onto the reflecting surface of the deflector,
   wherein the scanning optical system does not include a reflecting surface having optical power,
   wherein the optical scanning system includes: a first meniscus lens having a negative optical power whose concave surface faces a side of the deflector; and a second meniscus lens having a positive optical power whose concave surface faces a side of the deflector and which is disposed in the surface-to-be-scanned side of the first meniscus lens, and
   wherein the second meniscus lens is tilted, about an axis perpendicular to a plane including the one-dimensional direction serving as a rotation axis, toward a side in which a light beam emitted from the light source is incident on the reflecting surface with respect to the first meniscus lens, and the second meniscus lens is shifted, in a plane including the one-dimensional direction, toward an incident side of the reflecting surface of the light beam emitted from the light source.

2. A two-dimensional scanning apparatus according to claim 1, further comprising a third meniscus lens having a positive optical power whose concave surface faces a side of the deflector and which is disposed in the surface-to-be-scanned side of the second meniscus lens.

3. A two-dimensional scanning apparatus according to claim 2, wherein the third meniscus lens is shifted toward a direction away from the incident side of the reflecting surface of the light beam emitted from the light source in a plane including the one-dimensional direction.

4. A two-dimensional scanning apparatus according to claim 1, wherein the second meniscus lens is an anamorphic lens.

5. An image display apparatus comprising a two-dimensional scanning apparatus, in which an image is displayed onto a surface to be scanned by use of the two-dimensional scanning apparatus, wherein the two-dimensional scanning apparatus comprises:
   a deflector for two-dimensionally deflecting a light beam emitted from a light source; and
   an optical scanning system for forming an image of the light beam deflected by an reflecting surface of said deflector onto a surface to be scanned,
   wherein in a plane including a one-dimensional direction of the two-dimensional directions, the light beam emitted from the light source is adapted to be incident, obliquely relative to a central axis of a two-dimensional deflection range of the light beam deflected by the deflective surface of the deflector, onto the reflecting surface of the deflector,
   wherein the scanning optical system does not include a reflecting surface having optical power,
   wherein the optical scanning system includes: a first meniscus lens having a negative optical power whose concave surface faces a side of the deflector; and a second meniscus lens having a positive optical power whose concave surface faces a side of the deflector and which is disposed in the surface-to-be-scanned side of the first meniscus lens, and
   wherein the second meniscus lens is tilted, about an axis perpendicular to a plane including the one-dimensional direction serving as a rotation axis, toward a side in which a light beam emitted from the light source is incident on the reflecting surface with respect to the first meniscus lens, and the second meniscus lens is shifted, in a plane including the one-dimensional direction, toward an incident side of the reflecting surface of the light beam emitted from the light source.

6. A two-dimensional scanning apparatus, comprising:

a deflector for two-dimensionally deflecting a light beam emitted from a light source; and an optical scanning system for directing the light beam deflected by the deflector onto a surface to be scanned, the optical scanning system is composed of one or two lenses, wherein the light beam emitted from the light source is made incident on the deflector obliquely with respect to at least one of two deflecting axes of the deflector perpendicular to each other, wherein a lens, or a lens of two lenses which is disposed closer to the surface to be scanned, in the optical scanning system is tilted such that an angle between a normal at a surface vertex of an incident surface of the lens and a central axis of a two-dimensional deflecting range of the light beam soon after the light beam is reflected on the deflector is larger than a maximum field angle of the two-dimensional deflecting range and an angle between a normal at a surface vertex of an emergence surface and the central axis is larger than the angle between the normal of the incident surface and the central axis, wherein the surface vertex of the incident surface of the lens or the lens of two lenses which is disposed closer to the surface to be scanned is positioned shifted with respect to the central axis toward a side in which an extension of the normal at the surface vertex of the incident surface toward a light emergence direction extends, wherein the surface vertex of the emergence surface of the lens or the lens of two lenses which is disposed closer to the surface to be scanned is positioned shifted with respect to the central axis toward a side in which the normal at the surface vertex of the emergence surface extends, and wherein the surface to be scanned is tilted in the same direction in which the incident surface and the emergence surface are tilted.

7. A two-dimensional scanning apparatus according to claim 6, wherein a direction in which the incident surface and the emergence surface are tilted is same as a direction of the two deflecting axes perpendicular to each other.

8. A two-dimensional scanning apparatus according to claim 7, wherein field angles in directions of the two deflecting axes perpendicular to each other are different from each other.

9. A two-dimensional scanning apparatus according to claim 6, wherein surface vertexes of the incident surface and the emergence surface are positioned out of the two-dimensional deflection range, and only a half of the incident surface and the emergence surface between the respective surface vertexes and the respective edges is used to direct the light beam deflected by the deflector onto the surface to be scanned.

10. A two-dimensional scanning apparatus according to claim 6, wherein the incident surface and the emergence surface are anamorphic surfaces.

11. A two-dimensional scanning apparatus according to claim 6, wherein the incident surface and the emergence surface are rotationally asymmetrical surfaces.

12. A two-dimensional scanning apparatus according to claim 6, wherein the lens is a meniscus lens whose concave surface faces the deflector side.

13. A two-dimensional scanning apparatus according to claim 6, wherein the light beam incident on the deflector is a condensed light beam.

14. An image display apparatus comprising a two-dimensional scanning apparatus, in which an image is displayed onto a surface to be scanned by use of the two-dimensional scanning apparatus, wherein the two-dimensional scanning apparatus, comprising:

a deflector for two-dimensionally deflecting a light beam emitted from a light source; and an optical scanning system for directing the light beam deflected by the deflector onto a surface to be scanned, the optical scanning system is composed of one or two lenses, wherein the light beam emitted from the light source is made incident on the deflector obliquely with respect to at least one of two deflecting axes of the deflector perpendicular to each other, wherein a lens, or a lens of two lenses which is disposed closer to the surface to be scanned, in the optical scanning system is tilted such that an angle between a normal at a surface vertex of an incident surface of the lens and a central axis of a two-dimensional deflecting range of the light beam soon after the light beam is reflected on the deflector is larger than a maximum field angle of the two-dimensional deflecting range and an angle between a normal at a surface vertex of an emergence surface and the central axis is larger than the angle between the normal of the incident surface and the central axis, wherein the surface vertex of the incident surface of the lens or the lens of two lenses which is disposed closer to the surface to be scanned is positioned shifted with respect to the central axis toward a side in which an extension of the normal at the surface vertex of the incident surface toward a light emergence direction extends, wherein the surface vertex of the emergence surface of the lens or the lens of two lenses which is disposed closer to the surface to be scanned is positioned shifted with respect to the central axis toward a side in which the normal at the surface vertex of the emergence surface extends, and wherein the surface to be scanned is tilted in the same direction in which the incident surface and the emergence surface are tilted.

15. An image display apparatus according to claim 14, wherein a plurality of light beams having wavelengths different from each other emitted from the light source are made incident on the deflector so as to form a color image on the surface to be scanned.

* * * * *